(12) United States Patent
Minelli et al.

(10) Patent No.: US 12,241,421 B1
(45) Date of Patent: Mar. 4, 2025

(54) METHOD OF OPERATING A GAS TURBINE ENGINE

(71) Applicant: ROLLS-ROYCE PLC, London (GB)

(72) Inventors: Andrea Minelli, Derby (GB); Craig W Bemment, Derby (GB); Benjamin J Keeler, Chesterfield (GB); David M Beaven, Nottingham (GB); Kevin R McNally, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/753,264

(22) Filed: Jun. 25, 2024

(30) Foreign Application Priority Data

Dec. 14, 2023 (GB) .................................... 2319140

(51) Int. Cl.
*F02C 7/14* (2006.01)
*F02C 7/06* (2006.01)
*F02C 7/36* (2006.01)

(52) U.S. Cl.
CPC .................. *F02C 7/36* (2013.01); *F02C 7/06* (2013.01); *F02C 7/14* (2013.01); *F05D 2260/213* (2013.01); *F05D 2260/4031* (2013.01)

(58) Field of Classification Search
CPC ...... F02C 7/12; F02C 7/14; F02C 7/16; F02C 7/22; F02C 7/224; F02C 2329/26; F02C 2329/263; F02C 2329/36; F02C 2329/38; F05D 2260/98
See application file for complete search history.

(56) References Cited

U.S. PATENT DOCUMENTS

| | | | | |
|---|---|---|---|---|
| 4,020,632 A | * | 5/1977 | Coffinberry | F02C 7/14 60/773 |
| 9,051,056 B2 | * | 6/2015 | Leese | B64D 37/34 |
| 11,261,792 B2 | * | 3/2022 | Niergarth | F02C 7/16 |
| 11,492,969 B2 | * | 11/2022 | Bosak | F04B 23/04 |

* cited by examiner

*Primary Examiner* — Todd E Manahan
*Assistant Examiner* — Sean V Meiller
(74) *Attorney, Agent, or Firm* — Oliff PLC

(57) ABSTRACT

A method of operating a gas turbine engine comprising an engine core comprising a turbine, a compressor, a combustor arranged to combust a fuel, and a core shaft connecting the turbine to the compressor; a fan located upstream of the engine core; a gearbox that receives an input from the core shaft and outputs drive to the fan; an oil loop system arranged to supply oil to the gearbox; and a heat exchange system comprising an air-oil heat exchanger through which the oil flows, a fuel-oil heat exchanger through which the oil and the fuel flow; and a valve arranged to allow a proportion of the oil sent via at least one of the heat exchangers to be varied, is disclosed, the method comprising controlling the valve such that, under cruise conditions, an oil flow ratio of:

$$\frac{\text{rate of oil flow into air} - \text{oil heat exchanger}}{\text{rate of oil flow into fuel} - \text{oil heat exchanger}}$$

is in the range from 0 to 0.59.

15 Claims, 13 Drawing Sheets

METHOD OF OPERATING A GAS TURBINE ENGINE

CROSS-REFERENCE TO RELATED APPLICATIONS

This specification is based upon and claims the benefit of priority from UK Patent Application Number 2319140.6 filed on 14 Dec. 2023, the entire contents of which are incorporated herein by reference.

BACKGROUND

Field of the Disclosure

The present disclosure relates to aircraft propulsions systems, and to methods of operating aircraft involving the management of different fluids and heat transfer therebetween, and in particular to management of oil and/or air flows within an aircraft engine.

Description of the Related Art

There is an expectation in the aviation industry of a trend towards the use of fuels different from the traditional kerosene-based jet fuels generally used at present. The fuels may have differing fuel characteristics relative to petroleum-based hydrocarbon fuels. Thus, there is a need to take account of fuel properties for these new fuels, and to adjust both the gas turbine engines themselves and the methods of operating gas turbine engines.

SUMMARY

According to a first aspect, there is provided a method of operating a gas turbine engine of an aircraft, the gas turbine engine comprising:
  an engine core comprising a turbine, a compressor, a combustor arranged to combust a fuel, and a core shaft connecting the turbine to the compressor;
  a fan located upstream of the engine core;
  a gearbox that receives an input from the core shaft and outputs drive to the fan so as to drive the fan at a lower rotational speed than the core shaft;
  an oil loop system arranged to supply oil to the gearbox; and
  a heat exchange system comprising:
    an air-oil heat exchanger through which the oil in the oil loop system flows;
    a fuel-oil heat exchanger through which the oil in the oil loop system and the fuel flow such that heat is transferred between the oil and the fuel; and
    at least one valve arranged to allow a proportion of the oil sent via at least one of the heat exchangers to be varied.

The method comprises controlling the at least one valve such that, under cruise conditions, an oil flow ratio of:

$$\frac{\text{rate of oil flow into air}-\text{oil heat exchanger } (m^3 s^{-1} \text{ or } kgs^{-1})}{\text{rate of oil flow into fuel}-\text{oil heat exchanger} (m^3 s^{-1} \text{ or } kgs^{-1})}$$

is in the range from 0 to 0.59.

The inventors have appreciated that the use of fuels different from the traditional kerosene-based jet fuels, such as sustainable aviation fuels, may result in different fuel properties, and that parameters at cruise conditions may be adjusted to make use of the different fuel properties. In particular, some fuels may be heated to higher temperatures in one or more fuel-oil heat exchangers than traditional fuels, without significantly increasing the deposition of fuel breakdown products, e.g. by coking or lacquering. This may allow for a method providing improved oil cooling (as the fuel is able to take more heat) and may also improve the overall thermal efficiency/thermodynamic efficiency of the engine, with less heat being lost to the surroundings and potentially also more power being recovered in the thermodynamic cycle. Being able to control oil flow within the engine has a key role to play in managing the heat transfer. The inventors appreciated that these principles can be applied to both engines with branching oil loop pathways with different heat exchangers on different branches (parallel arrangements) and to engines with substantially linear, series, arrangements of heat exchangers and in which use of one or more bypass pipes may be made as an alternative to a branched main pathway. The introduction of one or more controllable oil valves, and/or the improved control of extant oil valves, may therefore allow for a method providing improved oil cooling (as the fuel to be used may be able to take more heat than traditional fuels) and may also improve the overall thermal efficiency of the engine. The one or more controllable oil valves allow the oil flow ratio to be adjusted as appropriate for a given fuel.

Whilst the oil flow ratio is dimensionless, units (metres cubed per second or kilograms per second) are shown above by way of example. The numerator and denominator must have the same units to provide a dimensionless ratio. The flow rates used may therefore either be volumetric flow rates or gravimetric flow rates (i.e. mass flow rates), provided that the numerator and denominator are consistent.

The oil loop system may branch such that a proportion of the oil can flow along each branch. The air-oil and fuel-oil heat exchangers may be arranged in a parallel configuration on different branches of the oil loop system. The at least one valve arranged to allow the proportion of the oil sent via at least one of the heat exchangers to be varied may be or comprise a modulation valve arranged to allow the proportion of the oil sent via each branch to be varied.

The oil loop system may comprise at least one bypass pipe arranged to allow a proportion of the oil to bypass at least one of the air-oil heat exchanger and the fuel-oil heat exchanger. The at least one valve arranged to allow the proportion of the oil sent via at least one of the heat exchangers to be varied may be or comprise a bypass valve arranged to allow a proportion of the oil to bypass the at least one heat exchanger. The heat exchange system may comprise multiple bypass pipes each arranged to allow oil to bypass one heat exchanger—in such implementations, the step of controlling the at least one valve may be or comprise controlling at least two bypass valves. In particular, the oil loop system may comprise at least one bypass pipe arranged to allow a proportion of the oil to bypass the air-oil heat exchanger.

The air-oil and fuel-oil heat exchangers of implementations with one or more bypass pipes may be arranged in series in the oil loop system (such that a main oil flow pathway goes through both, one after the other) or in parallel in the oil loop system (such that a main oil flow pathway splits, with one branch going through each). In implementations in which the air-oil and fuel-oil heat exchangers are arranged in parallel, on different branches of the oil loop system, the method step of controlling the at least one valve may comprise controlling both one or more bypass valves and a modulation valve arranged to allow the proportion of the oil sent via each branch to be varied.

The method may comprise controlling the at least one valve such that, under cruise conditions, the oil flow ratio is in the range from 0 to 0.50, optionally from 0 to 0.40, and further optionally from 0 to 0.30, from 0 to 0.20, or optionally from 0 to 0.10.

The step of controlling the at least one valve so as to adjust the oil flow ratio may comprise decreasing the amount of oil sent via the at least one air-oil heat exchanger when the oil flow ratio is too high. Additionally or alternatively, the amount of oil sent via the at least one fuel-oil heat exchanger may be increased when the oil flow ratio is too high.

The method may comprise determining the fuel temperature downstream of the fuel-oil heat exchanger (and optionally on entry to the combustor) and adjusting the control of the oil flow ratio-if required-based on that fuel temperature. The method may comprise controlling the at least one valve under cruise conditions such that:
(i) the oil flow ratio is in the range from 0 to 0.4, optionally from 0 to 0.3, and further optionally from 0 to 0.25, provided that the fuel temperature downstream of the fuel-oil heat exchanger is at least 140° C.;
(ii) the oil flow ratio is in the range from 0 to 0.3, optionally from 0 to 0.2, and further optionally from 0 to 0.15, provided that the fuel temperature downstream of the fuel-oil heat exchanger is at least 160° C.; and/or
(iii) the oil flow ratio is in the range from 0 to 0.2, optionally from 0 to 0.1, and further optionally from 0 to 0.075, provided that the fuel temperature downstream of the fuel-oil heat exchanger is at least 180° C.

The method may comprise determining one or more fuel characteristics and adjusting the control of the oil flow ratio-if required-based on the one or more determined fuel characteristics. For example, the method may comprise controlling the at least one valve such that the oil flow ratio is in the range from 0 to 0.3, optionally in the range from 0 to 0.2, and further optionally from 0 to 0.15, provided that the fuel is at least 70% sustainable aviation fuel (SAF). The SAF proportion (X %) may be volumetric.

The heat exchange system may comprise a refrigeration cycle apparatus arranged to provide thermal lift by transferring additional heat from the oil to the fuel beyond that transferred by the fuel-oil heat exchanger. The method may comprise controlling the refrigeration cycle apparatus so as to adjust the amount of additional heat transferred to the fuel. In such implementations, the fuel temperature may be raised to above the oil temperature.

According to a second aspect, there is provided a gas turbine engine for an aircraft comprising:
an engine core comprising a turbine, a compressor, and a core shaft connecting the turbine to the compressor;
a fan located upstream of the engine core; and
a gearbox that receives an input from the core shaft and outputs drive to the fan so as to drive the fan at a lower rotational speed than the core shaft;
an oil loop system arranged to supply oil to the gearbox; and
a heat exchange system comprising:
an air-oil heat exchanger through which the oil in the oil loop system flows;
a fuel-oil heat exchanger through which the oil in the oil loop system and the fuel flow such that heat is transferred between the oil and the fuel; and
at least one valve arranged to allow a proportion of the oil sent via at least one of the heat exchangers to be varied.

The at least one valve is arranged to be controlled such that, under cruise conditions, an oil flow ratio of:

$$\frac{\text{rate of oil flow into air}-\text{oil heat exchanger }(m^3s^{-1} \text{ or } kgs^{-1})}{\text{rate of oil flow into fuel}-\text{oil heat exchanger}(m^3s^{-1} \text{ or } kgs^{-1})}$$

is in the range from 0 to 0.59.

The gas turbine engine may further comprise a controller arranged to control the valve. The gas turbine engine may further comprise one or more oil flow rate sensors. The controller may be arranged to receive outputs from the one or more oil flow rate sensors and to make control decisions based on those outputs. Oil flow rate may be sensed directly, or may be inferred from one or more other measurements, e.g. using pressure drop measurements at an orifice.

The heat exchange system may further comprise a refrigeration cycle apparatus arranged to provide thermal lift by transferring further heat from the oil to the fuel, optionally such that the fuel temperature is raised above the oil temperature.

The heat exchange system may further comprise branching fuel return pathways and at least one valve controlling a split of fuel flow, the branching pathways being arranged to return fuel from the heat exchange system to at least two different places along a main fuel path from where fuel enters the gas turbine engine to the combustor.

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

The engine of the second aspect may be arranged to perform the method of the first aspect, and may have any of the features described with respect to the first aspect.

According to a third aspect, there is provided a method of operating a gas turbine engine for an aircraft, the gas turbine engine comprising:
an engine core comprising a turbine, a compressor, a combustor arranged to combust a fuel, and a core shaft connecting the turbine to the compressor;
a fan located upstream of the engine core;
a gearbox that receives an input from the core shaft and outputs drive to the fan so as to drive the fan at a lower rotational speed than the core shaft;
an oil loop system arranged to supply oil to the gearbox; and
a heat exchange system comprising:
an air-oil heat exchanger through which the oil in the oil loop system flows;
a fuel-oil heat exchanger through which the oil in the oil loop system and the fuel flow such that heat is transferred between the oil and the fuel; and
at least one valve arranged to allow a proportion of the oil sent via at least one of the heat exchangers to be varied.

The method comprises controlling the at least one valve such that, under idle conditions, an oil flow ratio of:

$$\frac{\text{rate of oil flow into air}-\text{oil heat exchanger }(m^3s^{-1} \text{ or } kgs^{-1})}{\text{rate of oil flow into fuel}-\text{oil heat exchanger}(m^3s^{-1} \text{ or } kgs^{-1})}$$

is in the range from 0.62 to 5.29.

As discussed for the first aspect, the inventors have appreciated that the use of fuels different from the traditional kerosene-based jet fuels, such as sustainable aviation fuels, may result in different fuel properties, and that parameters in operation may be adjusted to make use of the different fuel properties. In particular, some fuels may be heated to higher temperatures in one or more fuel-oil heat exchangers than traditional fuels, without significantly increasing the deposition of fuel breakdown products, e.g. by coking or lacquering. This may allow for a method providing improved oil cooling (as the fuel is able to take more heat) and may also improve the overall thermal efficiency of the engine, with less heat being lost to the surroundings. The one or more controllable oil valves have a key role to play in managing the oil flow ratio. Further, the inventors appreciated that whilst cruise conditions generally make up a much larger proportion of an aircraft engine's time in operation, operation at idle is also significant. As the fuel mass flow rate is much lower at idle than at cruise, even a relatively small heat load to the fuel can result in a high temperature increase—the use of non-traditional fuels may therefore have an even greater effect on optimal approaches to heat management under idle conditions—e.g. at ground idle, whilst the aircraft is starting up, running whilst stationary during boarding, and taxiing (towards a runway or hangar, or between other ground-based locations), or at flight idle, such as on commencing descent. As the operating conditions are very different between cruise and idle—particularly in terms of desired thrust output from the engine-different control of the oil flow is appropriate.

As for the first and second aspects, whilst the oil flow ratio is dimensionless, units (metres cubed per second or kilograms per second) are shown above by way of example and to demonstrate that the numerator and denominator must have the same units. Idle operation whilst the aircraft is operating on the ground may be referred to as 'ground idle'. Idle operation whilst the aircraft is airborne may be referred to as 'flight idle'. All options described below for this aspect may be assumed relevant to ground idle conditions, unless otherwise specified. Flight idle is generally at a slightly higher thrust than ground idle. In some implementations only the less restrictive ranges may apply to flight idle for a particular engine. In other implementations, all options described below for this aspect may also apply to flight idle conditions.

The oil loop system may branch such that a proportion of the oil can flow along each branch. The air-oil and fuel-oil heat exchangers may be arranged in a parallel configuration on different branches of the oil loop system. The at least one valve arranged to allow the proportion of the oil sent via at least one of the heat exchangers to be varied may be or comprise a modulation valve arranged to allow the proportion of the oil sent via each branch to be varied.

The oil loop system may comprise at least one bypass pipe arranged to allow a proportion of the oil to bypass at least one of the air-oil heat exchanger and the fuel-oil heat exchanger. The at least one valve arranged to allow the proportion of the oil sent via at least one of the heat exchangers to be varied may be or comprise a bypass valve arranged to allow a proportion of the oil to bypass the at least one heat exchanger. The heat exchange system may comprise multiple bypass pipes each arranged to allow oil to bypass one heat exchanger—in such implementations, the step of controlling the at least one valve may be or comprise controlling at least two bypass valves.

The air-oil and fuel-oil heat exchangers of implementations with one or more bypass pipes may be arranged in series in the oil loop system (such that a main oil flow pathway goes through both, one after the other) or in parallel in the oil loop system (such that a main oil flow pathway splits, with one branch going through each). In implementations in which the air-oil and fuel-oil heat exchangers are arranged in parallel, on different branches of the oil loop system, the method step of controlling the at least one valve may comprise controlling both one or more bypass valves and a modulation valve arranged to allow the proportion of the oil sent via each branch to be varied.

The method may comprise controlling the at least one valve such that, under idle conditions, the oil flow ratio is below 5.50, optionally below 5.0, optionally below 4.5, and further optionally below 4.0.

The step of controlling the at least one valve so as to adjust the oil flow ratio may comprise decreasing the amount of oil sent via the at least one air-oil heat exchanger when the oil flow ratio is too high.

The method may comprise determining the fuel temperature downstream of the fuel-oil heat exchanger, and optionally on entry to the combustor, and adjusting the control of the oil flow ratio-if required-based on that fuel temperature. The method may comprise controlling the at least one valve under idle conditions such that:
  (i) the oil flow ratio is in the range from 0.62 to 4.00 when the fuel temperature downstream of the fuel-oil heat exchanger is above 140° C.;
  (ii) the oil flow ratio is in the range from 0.62 to 3.00 when the fuel temperature downstream of the fuel-oil heat exchanger is above 160° C.; and/or
  (iii) the oil flow ratio is in the range from 0.62 to 2.00 when the fuel temperature downstream of the fuel-oil heat exchanger is above 180° C.

The method may comprise determining one or more fuel characteristics and adjusting the control of the oil flow ratio-if required-based on the one or more determined fuel characteristics. For example, the method may comprise, under idle conditions, controlling the at least one valve such that the oil flow ratio is in the range from 0.62 to 3.67 provided that the fuel is at least 70% sustainable aviation fuel (SAF).

The heat exchange system may comprise a refrigeration cycle apparatus arranged to provide thermal lift by transferring additional heat from the oil to the fuel beyond that transferred by the fuel-oil heat exchanger. The method may comprise controlling the refrigeration cycle apparatus so as to adjust the amount of additional heat transferred to the fuel. In such implementations, the fuel temperature may be raised to above the oil temperature.

The methods of the first and third aspects may be complementary, and may be performed together in various implementations. The method of the third aspect may be performed using the engine of the second aspect.

According to a fourth aspect, there is provided a gas turbine engine for an aircraft, the gas turbine engine comprising:
  an engine core comprising a turbine, a compressor, and a core shaft connecting the turbine to the compressor;
  a fan located upstream of the engine core; and
  a gearbox that receives an input from the core shaft and outputs drive to the fan so as to drive the fan at a lower rotational speed than the core shaft;
  an oil loop system arranged to supply oil to the gearbox; and a heat exchange system comprising:
- an air-oil heat exchanger through which the oil in the oil loop system flows;
- a fuel-oil heat exchanger through which the oil in the oil loop system and the fuel flow such that heat is transferred between the oil and the fuel; and
- at least one valve arranged to allow a proportion of the oil sent via at least one of the heat exchangers to be varied.

The at least one valve is arranged to be controlled such that, under idle conditions, an oil flow ratio of:

$$\frac{\text{rate of oil flow into air} - \text{oil heat exchanger } (m^3 s^{-1} \text{ or } kgs^{-1})}{\text{rate of oil flow into fuel} - \text{oil heat exchanger } (m^3 s^{-1} \text{ or } kgs^{-1})}$$

is in the range from 0.62 to 5.29.

The heat exchange system may further comprise a refrigeration cycle apparatus arranged to provide thermal lift by transferring further heat from the oil to the fuel, optionally such that the fuel temperature is raised above the oil temperature.

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

The heat exchange system may further comprise branching fuel return pathways and at least one valve controlling a split of fuel flow, the branching pathways being arranged to return fuel from the heat exchange system to at least two different places along a main fuel path from where fuel enters the gas turbine engine to the combustor.

The engine of the fourth aspect may be arranged to perform the method of the first and/or third aspect, and may have any of the features described with respect to the first, second, or third aspect.

According to a fifth aspect, there is provided a method of operating a gas turbine engine of an aircraft, the gas turbine engine comprising:
- an engine core comprising a turbine, a compressor, a combustor arranged to combust a fuel, and a core shaft connecting the turbine to the compressor;
- a fan located upstream of the engine core;
- a gearbox that receives an input from the core shaft and outputs drive to the fan so as to drive the fan at a lower rotational speed than the core shaft;
- an oil loop system arranged to supply oil to the gearbox; and
- a heat exchange system comprising:
  - an air-oil heat exchanger through which the oil in the oil loop system flows;
  - a fuel-oil heat exchanger through which the oil in the oil loop system and the fuel flow such that heat is transferred between the oil and the fuel; and
  - an air valve arranged to control a flow rate of air through the air-oil heat exchanger.

The method comprises:
determining at least one fuel characteristic of the fuel arranged to be combusted by the combustor; and
controlling the air valve based on the at least one fuel characteristic so as to adjust the flow rate of air through the air-oil heat exchanger.

The inventors have appreciated that the use of fuels different from the traditional kerosene-based jet fuels, such as sustainable aviation fuels, may result in different fuel properties, and that operational parameters may be adjusted to make use of the different fuel properties. In particular, some fuels may be heated to higher temperatures in one or more fuel-oil heat exchangers than traditional fuels, without significantly increasing the deposition of fuel breakdown products, e.g. by coking or lacquering, allowing the fuel to take more heat and so reducing a need for air-cooling. This may improve combustion efficiency of the fuel, and may also improve overall efficiency of the engine, with less heat being lost to the environment (via the air-oil heat exchanger). Higher fuel temperatures on entry to the combustor, where the fuel characteristics allow, may therefore allow for a method providing improved oil cooling. For example, fuel thermal stability (a fuel characteristic) affects how much heat the fuel can accept/to what temperature the fuel can be raised without forming deposits within pipes, burners, and/or a hydromechanical unit or other engine component. Taking the fuel thermal stability into account and reducing the air flow rate through the air-oil heat exchanger (optionally to zero) when the thermal stability of the fuel is higher may therefore provide a more thermally efficient engine whilst avoiding coking or excessive lacquering, so improving aircraft performance. Using the fuel to take more heat from the oil, rather than relying on heat transfer from the oil to the environment/surrounding air (in the air-oil heat exchanger) may therefore both provide a more thermodynamically efficient engine and improve the cooling of the oil before it is returned to the rest of the turbine engine.

In a transitional period, with available aviation fuels changing with time during the lifespan of a gas turbine engine, as well as depending on geographical location of a refuelling point (among other variables) it is important for a relevant fuel characteristic to be determined, and control of the air flow rate to be performed based on the specific fuel in use. As such, gas turbine operation can be tailored to get the best out of a wide variety of fuels. The controllable air flow valve arranged to adjust the rate of air flow through the air-oil heat exchanger has a key role to play in this tailoring of engine performance.

The method may comprise, subject to suitability of the at least one determined fuel characteristic, controlling the air valve at idle conditions such that:
(i) the rate of air flow into the air-oil heat exchanger is reduced to less than 60% of what the flow rate would be with the valve fully open when the engine is operating at idle conditions; and/or
(ii) the rate of air flow into the air-oil heat exchanger is reduced to less than 40% of what the flow rate would be with the valve fully open when the engine is operating at idle conditions.

The method may comprise, subject to suitability of the at least one determined fuel characteristic, controlling the air valve at cruise conditions, such that:
(i) the rate of air flow into the air-oil heat exchanger is reduced to less than 20%, and optionally less than 17%, of what the flow rate would be with the valve fully open when the engine is operating at cruise conditions; and/or
(ii) the rate of air flow into the air-oil heat exchanger is reduced to at least substantially zero when the engine is operating at cruise conditions.

Suitability of the at least one determined fuel characteristic may be determined by comparing one of more fuel characteristics to a threshold value set for the respective fuel characteristic(s). For example, a fuel with a SAF content (% SAF) of over 60%, 65%, 70%, 75%, or 80% may be deemed suitable for a reduction in air flow rate as compared to traditional aviation fuels. Multiple fuel characteristics may be reviewed in conjunction in some implementations—for example with a lower threshold for one fuel characteristic being used when another fuel characteristic is within a specific range. The fuel characteristics may be considered independently/in isolation in other implementations.

The methods of the first, third and fifth aspects may be complementary, and any two or more of them may be performed together in various implementations. For example, both oil flow and air flow rate may be controlled, at cruise and/or at idle. The method of the fifth aspect may be performed using the engine of the second or fourth aspect.

The at least one determined fuel characteristic may be or comprise thermal stability. In such implementations, the rate of air flow into the air-oil heat exchanger may be reduced, at cruise, to less than 15% of what the flow rate would be with the valve fully open provided that the fuel is stable in operation at temperatures above 160° C. Alternatively or additionally, the rate of air flow into the air-oil heat exchanger may be reduced, at cruise, to less than 5% of what the flow rate would be with the valve fully open provided that the fuel is stable in operation at temperatures above 180° C. In some implementations, the air flow rate may be reduced with increasing thermal stability, optionally linearly.

The at least one determined fuel characteristic may be or comprise aromatic hydrocarbon content of the fuel. In such implementations, the rate of air flow into the air-oil heat exchanger may be reduced, at cruise, to less than 5% of what the flow rate would be with the valve fully open provided that the fuel has a molar percentage of aromatic hydrocarbons below 12%, and optionally below 10% or below 5%.

The at least one determined fuel characteristic may be or comprise percentage of sustainable aviation fuel—SAF—in the fuel (% SAF). In such implementations, the rate of air flow into the air-oil heat exchanger may be reduced, at cruise, to less than 5% of what the flow rate would be with the valve fully open provided that the fuel has a SAF content above 60%. Alternatively or additionally, the rate of air flow into the air-oil heat exchanger may be reduced, at cruise, to less than 2% of what the flow rate would be with the valve fully open provided that the fuel has a SAF content above 80%. In some implementations, the air flow rate may be reduced, optionally linearly, with increasing % SAF once the fuel exceeds 60%, 65%, 70%, 75%, or 80% SAF.

The at least one determined fuel characteristic may be or comprise calorific value of the fuel. In such implementations, the rate of air flow into the air-oil heat exchanger may be reduced, at cruise, to less than 4% of what the flow rate would be with the valve fully open provided that the fuel has a calorific value of at least 43.5 MJ/kg. The at least one determined fuel characteristic may be or comprise thermal stability of the fuel.

Options for the fuel characteristics, and also for the determinations thereof, are provided below. These options are provided by way of example only, and are not intended to be limiting.

According to a sixth aspect, there is provided a gas turbine engine for aircraft, the gas turbine engine comprising:
an engine core comprising a turbine, a compressor, and a core shaft connecting the turbine to the compressor;
a fan located upstream of the engine core;
a gearbox that receives an input from the core shaft and outputs drive to the fan so as to drive the fan at a lower rotational speed than the core shaft;
an oil loop system arranged to supply oil to the gearbox; and
a heat exchange system comprising:
an air-oil heat exchanger through which the oil in the oil loop system flows;
a fuel-oil heat exchanger through which the oil in the oil loop system and the fuel flow such that heat is transferred between the oil and the fuel; and
an air valve arranged to control a flow rate of air through the air-oil heat exchanger; and
a fuel composition determination module arranged to determine at least one fuel characteristic of the fuel arranged to be combusted by the combustor.

The air valve is arranged to be controlled based on the at least one fuel characteristic so as to adjust the flow rate of air through the air-oil heat exchanger.

A controller may be provided to control the valve.

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

The heat exchange system may further comprise branching fuel return pathways and at least one valve controlling a split of fuel flow, the branching pathways being arranged to return fuel from the heat exchange system to at least two different places along a main fuel path from where fuel enters the gas turbine engine to the combustor.

The engine of the sixth aspect may be arranged to perform the method of the first, third, and/or fifth aspect, and may have any of the features described with respect to any preceding aspect.

According to a seventh aspect, there is provided a method of operating a gas turbine engine of an aircraft, the gas turbine engine comprising:
an engine core comprising a turbine, a compressor, a combustor arranged to combust a fuel, and a core shaft connecting the turbine to the compressor;
a fan located upstream of the engine core;
a gearbox that receives an input from the core shaft and outputs drive to the fan so as to drive the fan at a lower rotational speed than the core shaft;
an oil loop system arranged to supply oil to the gearbox;
a heat exchange system comprising:
an air-oil heat exchanger through which the oil in the oil loop system flows;
a fuel-oil heat exchanger through which the oil in the oil loop system and the fuel flow such that heat is transferred between the oil and the fuel; and
at least one valve arranged to allow at least one of oil flow rate and air flow rate through at least one of the fuel-oil heat exchanger and the air-oil heat exchanger to be varied; and
a temperature sensor arranged to provide an indication of fuel temperature downstream of the fuel-oil heat exchanger (optionally on entry to the combustor), the method comprising:
determining if the fuel temperature has increased above a set threshold at cruise conditions, based on an output from the temperature sensor; and in response to determining that the fuel temperature has increased above the set threshold at cruise conditions, controlling the at least one valve so as to change the at least one flow rate through the at least one heat exchanger.

For example, the at least one valve may be or comprise a valve arranged to allow a proportion of the oil sent via the fuel-oil heat exchanger to be varied, and the method may comprise, in response to determining that the fuel temperature has increased above a set threshold at cruise conditions, controlling the at least one valve so as to send less oil through the fuel-oil heat exchanger.

The inventors appreciated that it is important for the oil temperature to remain in a desired range as well as for the fuel temperature not to exceed a limit, so in some implementations the focus for flow rate adjustment may be the air-oil heat exchanger. The at least one valve may therefore be or comprise a valve arranged to allow a proportion of the oil sent via the air-oil heat exchanger to be varied, and the method may comprise, in response to determining that the fuel temperature has increased above a set threshold at cruise conditions, controlling the at least one valve so as to send more oil through the air-oil heat exchanger.

A lack of an oil bypass on the air-oil heat exchanger could result in over-cooling of the oil (e.g. congealing, or, in less extreme cases, over-cooling may result in less efficient operation of the gearbox, e.g. with more heat losses, and in general there is an efficiency penalty to the overall engine cycle) in some conditions. A bypass pipe may therefore be provided for both heat exchangers. At least a portion of the oil may bypass both heat exchangers in some implementations.

The at least one valve may be or comprise a valve arranged to control air flow rate through the air-oil heat exchanger. The method may comprise sending more air through the air-oil heat exchanger in response to determining that the fuel temperature has increased above the set threshold at cruise conditions.

The method may comprise controlling multiple valves in some implementations, for example:
controlling oil flow through each of the fuel-oil heat exchanger and the air-oil heat exchanger separately; and/or
controlling both air flow and oil flow.

As described for the preceding aspects, the inventors have appreciated that the use of fuels different from the traditional kerosene-based jet fuels, such as sustainable aviation fuels, may result in different fuel properties, and that parameters at may be adjusted to make use of the different fuel properties. In particular, some fuels may be heated to higher temperatures in one or more fuel-oil heat exchangers than traditional fuels, without significantly increasing the deposition of fuel breakdown products, e.g. by coking or lacquering, allowing the fuel to take more heat and so reducing a need for air-cooling of oil and improving engine efficiency. However, allowing unsuitable fuels to reach these higher temperatures could be deleterious to engine performance, and even cause blockages of fuel injection nozzles (or other components such as small screen filters, orifices, and any small passages, such as those generally present within the hydromechanical unit and/or fuel heat exchangers) in some cases. Checks and balances are therefore desired to ensure that engine performance is optimised for a given fuel. The method of this seventh aspect involves monitoring fuel temperature to check for any excessively high fuel temperatures, and taking action to reduce heating of the fuel when appropriate. The fuel temperatures downstream of the fuel-oil heat exchanger (e.g. on entry to the combustor) at cruise conditions may be defined as an average over at least 1, 2, 3 4, or 5 minutes, and optionally over ten minutes, twenty minutes, or thirty minutes, under steady state cruise conditions. These average temperatures do not include transient spikes in temperature, which may be defined as fluctuations in temperature of the fuel during operation, often elevation of the temperature. A transient spike—for example a spike lasting only a few seconds or minutes—to a higher temperature may therefore not be sufficient to trigger a change in oil flow.

In a transitional period, with available aviation fuels changing with time during the lifespan of a gas turbine engine, as well as depending on geographical location of a refuelling point (among other variables) it is important for the level of heating of the fuel to be decided based on the specific fuel in use. Sending less oil through the fuel-oil heat exchanger results in less heat being transferred to the fuel, so providing a lower fuel temperature on approach to the combustor. As such, gas turbine operation can be tailored to get the best out of a wide variety of fuels. The controllable oil flow valve arranged to adjust the rate of oil flow through the fuel-oil heat exchanger has a key role to play in this tailoring of engine performance.

The inventors appreciated that these principles can be applied to both engines with branching oil loop pathways with different heat exchangers on different branches (parallel arrangements) and to engines with substantially linear, series, arrangements of heat exchangers and in which use of one or more bypass pipes may be made as an alternative to a branched main pathway.

The oil loop system may branch such that a proportion of the oil can flow along each branch, and the air-oil and fuel-oil heat exchangers may be arranged in a parallel configuration on different branches of the oil loop system. In such implementations, the at least one valve arranged to allow the proportion of the oil sent via the fuel-oil heat exchanger to be varied may be or comprise a modulation valve arranged to allow the proportion of the oil sent via each branch to be varied.

The oil loop system may comprise at least one bypass pipe arranged to allow a proportion of the oil to bypass at least one of the fuel-oil heat exchanger and the air-oil heat exchanger. In such implementations, the at least one valve may be or comprise at least one bypass valve arranged to allow a proportion of the oil to bypass the respective heat exchanger/to control the proportion of oil sent via the bypass pipe. In such implementations, the air-oil and fuel-oil heat exchangers may be arranged in series in the oil loop system, or in parallel. In implementations in which the air-oil and fuel-oil heat exchangers are arranged in parallel, on different branches of the oil loop system, and in which there is additionally at least one bypass pipe, the method may comprise controlling both the bypass valve and a modulation valve arranged to allow the proportion of the oil sent via each branch to be varied.

In implementations in which the method is arranged to adjust the flow rate of oil through the fuel-oil heat exchanger, at least some of the oil diverted away from the fuel-oil heat exchanger may be sent to the air-oil heat exchanger. In some such implementations, air flow through the air-oil heat exchanger may be increased when more oil is sent via the air-oil heat exchanger.

In implementations in which the method is arranged to adjust the flow rate of oil through the fuel-oil heat exchanger or the air-oil heat exchanger, at least some of the oil diverted away from the respective heat exchanger may be sent via a bypass pipe around the respective heat exchanger.

The method may further comprise determining the set threshold based on at least one fuel characteristic of the fuel. In such implementations, the at least one fuel characteristic of the fuel may be or comprise at least one of: thermal stability of the fuel, nitrogen content of the fuel, sulphur content of the fuel, and sustainable aviation fuel-SAF-content of the fuel.

The step of determining the set threshold may comprise increasing the set threshold, optionally linearly, with increasing thermal stability of the fuel.

The step of determining the set threshold may comprise increasing the set threshold, optionally linearly, with increasing SAF content of the fuel, for fuels with a SAF content of above 70%.

The method may further comprise determining the at least one fuel characteristic of the fuel, optionally by any of the methods described below.

The heat exchange system may comprise an air valve arranged to control air flow rate into the air-oil heat exchanger. The method may further comprise, in response to determining that the fuel temperature has increased above a set threshold at cruise conditions, controlling the air valve so as to send more air through the air-oil heat exchanger.

The heat exchange system may comprise a refrigeration cycle apparatus arranged to provide thermal lift by transferring additional heat from the oil to the fuel beyond that transferred by the fuel-oil heat exchanger. The method may further comprise controlling the refrigeration cycle apparatus so as to reduce the amount of additional heat transferred to the fuel in response to determining that the fuel temperature has increased above a set threshold at cruise conditions. For example, the refrigeration cycle apparatus may be turned off/deactivated.

The heat exchange system may comprise at least one bypass pipe, and the at least one valve may be or comprise a bypass valve arranged to control flow rate through that bypass pipe. The heat exchange system may comprise multiple bypass pipes each arranged to allow oil to bypass one heat exchanger (e.g. the fuel-oil heat exchanger or air-oil heat exchanger described above, or a secondary fuel-oil heat exchanger, an oil-oil heat exchanger arranged to transfer heat between two separate oil loops of the heat exchange system, or any other appropriate heat exchanger). The method may comprise controlling at least two bypass valves—for example, a bypass valve for the air-oil heat exchanger may be adjusted to send more oil to the air-oil heat exchanger when the bypass valve for the fuel-oil heat exchanger is adjusted to send less oil to the fuel-oil heat exchanger. The same valve (e.g. a three-way valve) may adjust oil flow to both heat exchangers in some implementations.

The set threshold may be in the range from 140° C. to 300° C., and optionally from 250° C. to 300° C. The set threshold may be 140° C., 180° C., 200° C., 210° C., 220° C., 230° C., 240° C., 250° C., 260° C., 270° C., 275° C., 280° C., 290° C., or 300° C.

The determining step may be performed at regular intervals during aircraft operation at cruise.

The methods of the first, third, fifth and seventh aspects may be complementary, and any two or more of them may be performed together in various implementations. The method of the seventh aspect may be performed using the engine of the second, fourth or sixth aspect.

According to an eighth aspect, there is provided a gas turbine engine for an aircraft, the gas turbine engine comprising:
 an engine core comprising a turbine, a compressor, and a core shaft connecting the turbine to the compressor;
 a fan located upstream of the engine core;
 a gearbox that receives an input from the core shaft and outputs drive to the fan so as to drive the fan at a lower rotational speed than the core shaft;
 an oil loop system arranged to supply oil to the gearbox;
 a heat exchange system comprising:
  an air-oil heat exchanger through which the oil in the oil loop system flows;
  a fuel-oil heat exchanger through which the oil in the oil loop system and the fuel flow such that heat is transferred between the oil and the fuel; and
  at least one valve arranged to allow at least one of oil flow rate and air flow rate through at least one of the fuel-oil heat exchanger and the air-oil heat exchanger to be varied;
 a temperature sensor arranged to provide an indication of fuel temperature downstream of the fuel-oil heat exchanger (optionally on entry to the combustor); and
 a controller arranged to receive an output from the temperature sensor at cruise conditions, determine if the fuel temperature has increased above a set threshold based on that output, and in response to determining that the fuel temperature has increased above a set threshold at cruise conditions, control the at least one valve so as to change the at least one flow rate through the at least one heat exchanger.

For example, the at least one valve may be arranged to allow a proportion of the oil sent via the fuel-oil heat exchanger to be varied; and the controller may be arranged to:
 receive an output from the temperature sensor at cruise conditions;
 determine if the fuel temperature has increased above a set threshold based on that output; and
 in response to determining that the fuel temperature has increased above a set threshold at cruise conditions, control the at least one valve so as to send less oil through the fuel-oil heat exchanger.

The controller, or another processing module, may be arranged to determine the set threshold based on one or more fuel characteristics of the fuel.

The heat exchange system may comprise a refrigeration cycle apparatus arranged to provide thermal lift by transferring further heat from the oil to the fuel, beyond that transferred by the fuel-oil heat exchanger. Optionally, the refrigeration apparatus may allow the fuel temperature to be raised above the oil temperature. The controller may be arranged to deactivate the refrigeration cycle apparatus in response to determining that the fuel temperature has increased above a set threshold at cruise conditions.

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

The heat exchange system may further comprise branching fuel return pathways and at least one valve controlling a split of fuel flow, the branching pathways being arranged to return fuel from the heat exchange system to at least two different places along a main fuel path from where fuel enters the gas turbine engine to the combustor.

The engine of the eighth aspect may be arranged to perform the method of the first, third, fifth, and/or seventh aspect, and may have any of the features described with respect to any preceding aspect.

According to a ninth aspect, there is provided a method of operating a gas turbine engine, the gas turbine engine comprising:
- an engine core comprising a turbine, a compressor, a combustor arranged to combust a fuel, and a core shaft connecting the turbine to the compressor;
- a fan located upstream of the engine core;
- an oil loop system arranged to supply oil to cool at least one engine component;
- a fuel-oil heat exchanger through which the oil in the oil loop system and the fuel flow such that heat is transferred from the oil to the fuel; and
- a refrigeration cycle apparatus through which the oil in the oil loop system and the fuel flow, the refrigeration cycle apparatus being arranged to transfer further heat from the oil to the fuel.

The method comprises controlling the refrigeration cycle apparatus such that fuel temperature on entry to the combustor is higher than a maximum oil temperature within the oil loop system.

The inventors have appreciated that the use of fuels different from the traditional kerosene-based jet fuels, such as sustainable aviation fuels, may result in different fuel properties, and that parameters at cruise conditions may be adjusted to make use of the different fuel properties. In particular, some fuels may be heated to higher temperatures than traditional fuels, without significantly increasing the deposition of fuel breakdown products, e.g. by coking or lacquering, and thermal lift to raise the fuel above the temperature of the oil may be utilised to get the most out of the fuel performance-wise in some cases. This may additionally allow for a method providing improved oil cooling (as use of a refrigeration cycle apparatus allows heat to be pumped away from the oil even once the oil is lowered to the fuel temperature) and may also improve the overall thermal efficiency of the engine, with hotter fuel being combusted. Control of the refrigeration cycle apparatus allows thermal lift to be provided, and optionally also the level of thermal lift provided to be adjusted as appropriate for the fuel and engine operating conditions.

As used herein, the maximum oil temperature within the oil loop system indicates the highest temperature of oil at any location within the oil loop system at a certain moment in time—i.e. at the time at which the comparison to the fuel temperature is made. It will be appreciated that the oil temperature generally increases as it passes through the one or more engine components to be cooled by the oil, and then decreases as it passes through the at least one fuel-oil heat exchanger (and through any other heat exchanger arranged to transfer heat away from the oil—e.g. an air-oil heat exchanger). A temperature sensor arranged to provide an indication of the maximum oil temperature within the oil loop system may therefore be located downstream of the engine component(s) to be cooled and upstream of the fuel-oil heat exchanger(s) (and of any other heat exchanger(s) arranged to transfer heat away from the oil). The fuel and oil temperatures may both be judged as described above; in particular with transient spikes being disregarded. An average may be taken over a period of time, e.g. of a minute or a few minutes.

The engine component(s) to be cooled may comprise one or more of: a main power gearbox—i.e. a gearbox that receives an input from the core shaft and outputs drive to the fan, an auxiliary gearbox, one or more bearings (e.g. shaft bearings, for example for the core shaft), one or more generators, electrical wiring, and/or one or more pumps. It will be appreciated that any structure within the engine which is desired to be cooled may be classed as such an engine component.

The engine may comprise a gearbox that receives an input from the core shaft and outputs drive to the fan so as to drive the fan at a lower rotational speed than the core shaft, and the oil loop system may supply oil to the gearbox. The refrigeration cycle apparatus may therefore be used to provide supplementary cooling to the main power gearbox in a geared engine.

The refrigeration cycle apparatus may contain a refrigerant fluid, the refrigerant fluid being arranged to transfer heat from the oil to the fuel. The refrigerant fluid may be 1,1,1,2-tetrafluoroethane.

The refrigeration cycle apparatus may comprise an evaporator, a refrigerant compressor, and a condenser. The method may comprise:
- transferring heat from the oil to the refrigerant fluid using the evaporator so as to evaporate liquid in the refrigerant fluid to form a saturated vapour;
- compressing the saturated vapour to from a superheated vapour using the refrigerant compressor, and sending the superheated vapour to the condenser; and
- transferring heat from the superheated vapour to the fuel using the condenser, at least partially converting the superheated vapour to a liquid in the process.

The refrigerant compressor may also act as a pump, circulating the refrigerant fluid around the refrigeration cycle apparatus. A separate refrigerant pump may be provided in some implementations.

The method may comprise converting the superheated vapour into a saturated liquid in the condenser (a saturated liquid, in the context of thermodynamics/refrigeration cycles, being a liquid that contains as much thermal energy as it can without boiling). The condenser may form a near-saturated liquid in some implementations.

The refrigeration cycle apparatus may further comprise an expansion valve located between the condenser and the evaporator. The method may comprise using the expansion valve to convert the liquid from the condenser (which may be a saturated liquid) into a reduced temperature liquid and vapour mixture (i.e. a mixture of liquid and gas at a lower temperature than the liquid output by the condenser). The refrigerant may then be returned to the evaporator, and the cycle may recommence.

The engine may further comprise a temperature sensor arranged to sense the temperature of fuel downstream of the refrigeration cycle apparatus. The fuel temperature sensor may be located at or near an entry to the combustor. The engine may further comprise a temperature sensor arranged to provide an indication of the maximum temperature of oil within the oil loop system. The oil temperature sensor may be located at or near an entry to the fuel-oil heat exchanger, or at or near an outlet from the one or more engine components to be cooled. The method may further comprise comparing the oil and fuel temperatures and adjusting the control of the refrigeration cycle apparatus based on the comparison.

The method may comprise controlling one or more additional components of a heat exchange system of the engine as well as controlling the refrigeration cycle apparatus—the multiple components may work together to raise the fuel temperature to the desired level.

For example, the method may comprise controlling fluid flow through the fuel-oil heat exchanger so as to increase heat transfer to the fuel by:
(i) increasing oil flow rate through the fuel-oil heat exchanger, e.g. by control of a bypass valve modulation valve, or recirculation valve as described elsewhere herein, or by controlling the pump speed of an oil pump of the oil loop system; and/or
(ii) recirculating fuel through the fuel-oil heat exchanger, e.g. by using a recirculation valve as described elsewhere herein.

In some implementations, the engine further comprises an air-oil heat exchanger located upstream of the fuel-oil heat exchanger with respect to oil flow. In such implementations, the method may comprise increasing heat transfer from the oil to the fuel in the fuel-oil heat exchanger by reducing air-cooling of the oil before the oil enters the fuel-oil heat exchanger.

The method may be performed at cruise. The engine may be controlled so as to run with a fuel temperature on entry to the combustor higher than the maximum oil temperature for at least 10%, 20%, or 30% of the time at cruise.

The method may comprise controlling the refrigeration cycle apparatus such that the fuel temperature on entry to the combustor is higher than the maximum oil temperature within the oil loop system by at least 2° C., 5° C., 10° C., 15° C., 20° C. or 25° C. The method may comprise controlling the refrigeration cycle apparatus such that fuel temperature on entry to the combustor is higher than the maximum oil temperature within the oil loop system by between 2° C. and 50° C.

The method may comprise controlling the refrigeration cycle apparatus such that the fuel temperature on entry to the combustor is higher than the maximum oil temperature within the oil loop system by a margin determined based on at least one fuel characteristic of the fuel.

The methods of the first, third, fifth, seventh, and ninth aspects may be complementary, and any two or more of them may be performed together in various implementations. The method of the ninth aspect may be performed using the engine of the second, fourth, sixth, or eighth aspect.

According to a tenth aspect, there is provided a gas turbine engine for an aircraft comprising: an engine core comprising a turbine, a compressor, a combustor arranged to combust a fuel, and a core shaft connecting the turbine to the compressor;
a fan located upstream of the engine core;
an oil loop system arranged to supply oil to cool at least one engine component;
a fuel-oil heat exchanger through which the oil in the oil loop system and the fuel flow such that heat is transferred from the oil to the fuel; and
a refrigeration cycle apparatus through which the oil in the oil loop system and the fuel flow, the refrigeration cycle apparatus being arranged to transfer further heat from the oil to the fuel.

The fuel-oil heat exchanger and the refrigeration cycle apparatus are arranged to transfer heat to the fuel such that fuel temperature on entry to the combustor is higher than a maximum oil temperature within the oil loop system.

The gas turbine engine may further comprise a gearbox that receives an input from the core shaft and outputs drive to the fan so as to drive the fan at a lower rotational speed than the core shaft. The gas turbine engine may therefore be a geared gas turbine engine. The oil loop system may be arranged to supply oil to the gearbox.

The turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

The gas turbine engine may further comprise branching fuel return pathways and at least one valve controlling a split of fuel flow along the branching fuel return pathways. The branching pathways may be arranged to return fuel from the fuel-oil heat exchanger to at least two different places along a main fuel path from where fuel enters the gas turbine engine to the combustor.

The engine of the tenth aspect may be arranged to perform the method of the first, third, fifth, seventh and/or ninth aspect, and may have any of the features described with respect to any preceding aspect.

In any of the above aspects:

In implementations in which one or more fuel characteristics of the fuel are used, the at least one fuel characteristic of the fuel may comprise at least one of:
i. percentage of sustainable aviation fuel in the fuel (% SAF);
ii. heteroatomic species concentration of the fuel;
iii. aromatic hydrocarbon content of the fuel;
iv. multi-aromatic hydrocarbon content of the fuel;
v. percentage of nitrogen-containing species in the fuel;
vi. presence or percentage of a tracer species or trace element in the fuel;
vii. hydrogen to carbon ratio of the fuel;
viii. hydrocarbon distribution of the fuel;
ix. level of non-volatile particulate matter emissions on combustion;
x. naphthalene content of the fuel;
xi. sulphur content of the fuel;
xii. cycloparaffin content of the fuel;
xiii. oxygen content of the fuel;
xiv. thermal stability of the fuel (e.g. thermal breakdown temperature; thermal stability may be assigned a numerical value at any temperature by taking the inverse of a fuel breakdown product deposition rate at the given temperature);
xv. level of coking of the fuel, or, more generally, level of deposition of fuel breakdown products;
xvi. an indication that the fuel is a fossil fuel;
xvii. at least one of density, viscosity, calorific value, and heat capacity.

The method may further comprise chemically or physically detecting one or more parameters relevant to the fuel in the fuel tank after refuelling. The detected parameters may be fuel characteristics, or may be used to calculate or infer fuel characteristics—for example, the detected parameters may be shaft speed and mass flow rate of fuel, from which calorific value (a fuel characteristic) may be determined, or the detected parameters may be fuel density and/or the presence of a tracer, both of which are themselves fuel characteristics. The determining at least one fuel characteristic may comprise obtaining stored fuel characteristic data. The chemically and/or physically determining one or more parameters of the fuel in the fuel tank may be performed by extracting a sample of the fuel from the fuel tank for off-wing testing.

The determining the at least one fuel characteristic of the fuel may comprise obtaining at least one fuel characteristic of any fuel already present in the fuel tank prior to refuelling; determining at least one fuel characteristic of a fuel added to the fuel tank on refuelling; and calculating at least one fuel characteristic of the resultant fuel in the fuel tank after refuelling (based on that information).

The determining the at least one fuel characteristic may be performed based on detection of at least one fuel property. The fuel property may be the fuel characteristic, or may be used to calculate or otherwise determine (e.g. by retrieval from a look-up table) the fuel characteristic. The detection may be performed on-wing.

The determining the at least one fuel characteristic may be performed based on received fuel composition data. The fuel composition data may be provided to the aircraft on refuelling. The fuel composition data may be manually entered.

At least one fuel characteristic may be inferred from performance of the gas turbine engine during at least one of taxi, take-off and climb of the aircraft.

It will be appreciated that a feature described with respect to one aspect may be used in combination with any other aspect, mutatis mutandis.

As noted elsewhere herein, the present disclosure may apply to any relevant configuration of gas turbine engine. Such a gas turbine engine may be, for example, a turbofan gas turbine engine, an open rotor gas turbine engine (in which the propeller is not surrounded by a nacelle), a turboprop engine or a turbojet engine. Any such engine may or may not be provided with an afterburner. Such a gas turbine engine may be, for example, configured for land or marine-based power generation applications.

A gas turbine engine in accordance with any aspect of the present disclosure may comprise an engine core comprising a turbine, a combustor, a compressor, and a core shaft connecting the turbine to the compressor. Such a gas turbine engine may comprise a fan (having fan blades). Such a fan may be located upstream of the engine core. Alternatively, in some examples, the gas turbine engine may comprise a fan located downstream of the engine core, for example where the gas turbine engine is an open rotor or a turboprop engine (in which case the fan may be referred to as a propeller).

Where the gas turbine engine is an open rotor or a turboprop engine, the gas turbine engine may comprise two contra-rotating propeller stages attached to and driven by a free power turbine via a shaft. The propellers may rotate in opposite senses so that one rotates clockwise and the other anti-clockwise around the engine's rotational axis. Alternatively, the gas turbine engine may comprise a propeller stage and a guide vane stage configured downstream of the propeller stage. The guide vane stage may be of variable pitch. Accordingly, high pressure, intermediate pressure, and free power turbines respectively may drive high and intermediate pressure compressors and propellers by suitable interconnecting shafts.

Thus, the propellers may provide the majority of the propulsive thrust.

Where the gas turbine engine is an open rotor or a turboprop engine, one or more of the propeller stages may be driven by a gearbox. The gearbox may be of the type described herein.

An engine according to the present disclosure may be a turbofan engine. Such an engine may be a direct-drive turbofan engine in which the fan is directly connected to the fan-drive turbine, for example without a gearbox, via a core shaft. In such a direct-drive turbofan engine, the fan may be said to rotate at the same rotational speed as the fan-drive turbine. Purely by way of example, the fan-drive turbine may be a first turbine, the core shaft may be a first core shaft, and the gas turbine engine may further comprise a second turbine and a second core shaft connecting the second turbine to the compressor. The second turbine, the compressor, and second core shaft may be arranged to rotate at a higher rotational speed than the first core shaft. In such an arrangement, the second turbine may be positioned axially upstream of the first turbine.

An engine according to the present disclosure may be a geared turbofan engine. In such an arrangement, the engine has a fan that is driven via a gearbox. Accordingly, such a gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. Such a gearbox may be a single stage. Alternatively, such a gearbox may be a compound gearbox, for example a compound planetary gearbox (which may have the input on the sun gear and the output on the ring gear, and thus be referred to as a "compound star" gearbox), for example having two stages of reduction.

The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a reduction ratio in the range of from 3.1 or 3.2 to 3.8. Purely by way of further example, the gearbox may be a "star" gearbox having a reduction ratio in the range 3.0 to 3.1. Purely by way of further example, the gearbox may be a "planetary" gearbox having a reduction ratio in the range 3.6 to 4.2. In some arrangements, the gear ratio may be outside these ranges.

In any gas turbine engine as described and/or claimed herein, fuel of a given composition or blend is provided to a combustor, which may be provided downstream of the fan and compressor(s) with respect to the flowpath (for example axially downstream). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other. For example, the gas turbine engine may be a direct-drive turbofan gas turbine engine comprising 13 or 14 compressor stages (in addition to the fan). Such an engine may, for example, comprise 3 stages in the first (or "low pressure") compressor and either 10 or 11 stages in the second (or "high pressure") compressor. By way of further example, the gas turbine engine may be a "geared" gas turbine engine (in which the fan is driven by a first core shaft via a reduction gearbox) comprising 11, 12 or 13 compressor stages (in addition to the fan). Such an engine may comprise 3 or 4 stages in the first (or "low pressure") compressor and 8 or 9 stages in the second (or "high pressure") compressor. By way of further example, the gas turbine engine may be a "geared" gas turbine engine having 4 stages in the first (or "low pressure") compressor and 10 stages in the second (or "high pressure") compressor.

The or each turbine (for example the first turbine and second turbine as described above) may comprise any number of stages, for example multiple stages. Each stage may comprise a row of rotor blades and a row of stator vanes, or vice versa, as required. The respective rows of rotor blades and stator vanes may be axially offset from each other. The second (or "high pressure") turbine may comprise 2 stages in any arrangement (for example regardless of whether it is a geared or direct-drive engine). The gas turbine engine may be a direct-drive gas turbine engine comprising a first (or "low pressure") turbine having 5, 6 or 7 stages. Alternatively, the gas turbine engine may be a "geared" gas turbine engine comprising a first (or "low pressure") turbine having 3 or 4 stages.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32 or 0.29 to 0.30. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform. The radius of the fan may be measured between the engine centreline and the tip of a fan blade at its leading edge. The fan diameter (which may simply be twice the radius of the fan) may be greater than (or on the order of) any of: 140 cm, 170 cm, 180 cm, 190 cm, 200 cm, 210 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches), 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 210 cm to 240 cm, or 250 cm to 280 cm, or 320 cm to 380 cm. Purely by way of non-limitative example, the fan diameter may be in the range of from 170 cm to 180 cm, 190 cm to 200 cm, 200 cm to 210 cm, 210 cm to 230 cm, 290 cm to 300 cm or 340 cm to 360 cm.

The rotational speed of the fan may vary in use. Generally, the rotational speed is lower for fans with a higher diameter. Purely by way of non-limitative example, the rotational speed of the fan at cruise conditions may be less than 3500 rpm, for example less than 2600 rpm, or less than 2500 rpm, or less than 2300 rpm. Purely by way of further non-limitative example, the rotational speed of the fan at cruise conditions for a "geared" gas turbine engine having a fan diameter in the range of from 200 cm to 210 cm may be in the range of from 2750 to 2900 rpm. Purely by way of further non-limitative example, the rotational speed of the fan at cruise conditions for a "geared" gas turbine engine having a fan diameter in the range of from 210 cm to 230 cm may be in the range of from 2500 to 2800 rpm. Purely by way of further non-limitative example, the rotational speed of the fan at cruise conditions for a "geared" gas turbine engine having a fan diameter in the range of from 340 cm to 360 cm may be in the range of from 1500 to 1800 rpm. Purely by way of further non-limitative example, the rotational speed of the fan at cruise conditions for a direct drive engine having a fan diameter in the range of from 190 cm to 200 cm may be in the range of from 3600 to 3900 rpm. Purely by way of further non-limitative example, the rotational speed of the fan at cruise conditions for a direct drive engine having a fan diameter in the range of from 300 cm to 340 cm may be in the range of from 2000 to 2800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3 (for example for a geared gas turbine engine).

Gas turbine engines in accordance with the present disclosure may have any desired bypass ratio (BPR), where the bypass ratio is defined as the ratio of the mass flow rate of the flow through the bypass duct to the mass flow rate of the flow through the core. In some arrangements the bypass ratio at cruise conditions may be greater than (or on the order of) any of the following: 9. 9.5, 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio at cruise conditions may be in an inclusive range bounded by any two of the values in the previous sentence (i.e. the values may form upper or lower bounds), for example in the range of from 12 to 16, 13 to 15, or 13 to 14. Purely by way of non-limitative example, the bypass ratio at cruise conditions of a direct-drive gas turbine engine according to the present disclosure may be in the range of from 9:1 to 11:1. Purely by way of further non-limitative example, the bypass ratio at cruise conditions of a geared gas turbine engine according to the present disclosure may be in the range of from 12:1 to 15:1 The bypass duct may be at least substantially annular. The bypass duct may be radially outside the core engine. The radially outer surface of the bypass duct may be defined by a nacelle and/or a fan case.

The overall pressure ratio (OPR) of a gas turbine engine as described and/or claimed herein may be defined as the ratio of the stagnation pressure at the exit of the highest pressure compressor (before entry into the combustor) to the stagnation pressure upstream of the fan. By way of non-limitative example, the overall pressure ratio of a gas turbine engine as described and/or claimed herein at cruise conditions may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70. Purely by way of non-limitative example, the overall pressure ratio at cruise conditions of a geared gas turbine engine having a fan diameter in the range of from 200 cm to 210 cm may be in the range of from 40 to 45. Purely by way of non-limitative example, the overall pressure ratio at cruise conditions of a geared gas turbine engine having a fan diameter in the range of from 210 cm to 230 cm may be in the range of from 45 to 55. Purely by way of non-limitative example, the overall pressure ratio at cruise conditions of a geared gas turbine engine having a fan diameter in the range of from 340 cm to 360 cm may be in the range of from 50 to 60. Purely by way of non-limitative example, the overall pressure ratio at cruise conditions of a direct-drive gas turbine engine having a fan diameter in the range of from 300 cm to 340 cm may be in the range of from 50 to 60.

Specific thrust of an engine may be defined as the net thrust of the engine divided by the total mass flow through the engine. In some examples, specific thrust may depend, for a given thrust condition, upon the specific composition of fuel provided to the combustor. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines. Purely by way of non-limitative example, the specific thrust of a geared gas turbine engine having a fan diameter in the range of from 200 cm to 210 cm may be in the range of from 90 $Nkg^{-1}s$ to 95 $Nkg^{-1}s$. Purely by way of non-limitative example, the specific thrust of a geared gas turbine engine having a fan diameter in the range of from 210 cm to 230 cm may be in the range of from 80 $Nkg^{-1}s$ to 90 $Nkg^{-1}s$. Purely by way of non-limitative example, the specific thrust of a geared gas turbine engine having a fan diameter in the range of from 340 cm to 360 cm may be in the range of from 70 $Nkg^{-1}s$ to 90 $Nkg^{-1}s$. Purely by way of non-limitative example, the specific thrust of a direct drive gas turbine engine having a fan diameter in the range of from 300 cm to 340 cm may be in the range of from 90 $Nkg^{-1}s$ to 120 $Nkg^{-1}s$.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 100 kN, 110 kN, 120 kN, 130 kN, 135 kN, 140 kN, 145 kN, 150 kN, 155 kN, 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of non-limitative example, a gas turbine as described and/or claimed herein may be capable of producing a maximum thrust in the range of from 155 kN to 170 kN, 330 kN to 420 kN, or 350 kN to 400 kN. Purely by way of non-limitative example, the maximum thrust of a geared gas turbine engine having a fan diameter in the range of from 200 cm to 210 cm may be in the range of from 140 kN to 160 kN. Purely by way of non-limitative example, the maximum thrust of a geared gas turbine engine having a fan diameter in the range of from 210 cm to 230 cm may be in the range of from 150 kN to 200 kN. Purely by way of non-limitative example, the maximum thrust of a geared gas turbine engine having a fan diameter in the range of from 340 cm to 360 cm may be in the range of from 370 kN to 500 kN. Purely by way of non-limitative example, the maximum thrust of a direct drive gas turbine engine having a fan diameter in the range of from 300 cm to 340 cm may be in the range of from 370 kN to 500 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. In some examples, TET may depend, for a given thrust condition, upon the specific composition of fuel provided to the combustor. At cruise conditions, the TET may be at least (or on the order of) any of the following: 1400K, 1450K, 1500K, 1520K, 1530K, 1540K, 1550K, 1600K or 1650K. Thus, purely by way of non-limitative example, the TET at cruise conditions of a geared gas turbine engine having a fan diameter in the range of from 200 cm to 210 cm may be in the range of from 1540K to 1600K. Purely by way of non-limitative example, the TET at cruise conditions of a geared gas turbine engine having a fan diameter in the range of from 210 cm to 230 cm may be in the range of from 1590K to 1650K. Purely by way of non-limitative example, the TET at cruise conditions of a geared gas turbine engine having a fan diameter in the range of from 340 cm to 360 cm may be in the range of from 1600K to 1660K. Purely by way of non-limitative example, the TET at cruise conditions of a direct drive gas turbine engine having a fan diameter in the range of from 300 cm to 340 cm may be in the range of from 1590K to 1650K. Purely by way of non-limitative example, the TET at cruise conditions of a direct drive gas turbine engine having a fan diameter in the range of from 300 cm to 340 cm may be in the range of from 1570K to 1630K.

The TET at cruise conditions may be in an inclusive range bounded by any two of the values in the previous sentence (i.e. the values may form upper or lower bounds), for example 1530K to 1600K. The maximum TET in use of the engine may be, for example, at least (or on the order of) any of the following: 1700K, 1750K, 1800K, 1850K, 1900K, 1950K, 2000K, 2050K, or 2100K. Thus, purely by way of non-limitative example, the maximum TET of a geared gas turbine engine having a fan diameter in the range of from 200 cm to 210 cm may be in the range of from 1890K to 1960K. Purely by way of non-limitative example, the maximum TET of a geared gas turbine engine having a fan diameter in the range of from 210 cm to 230 cm may be in the range of from 1890K to 1960K. Purely by way of non-limitative example, the maximum TET of a geared gas turbine engine having a fan diameter in the range of from 340 cm to 360 cm may be in the range of from 1890K to 1960K. Purely by way of non-limitative example, the maximum TET of a direct drive gas turbine engine having a fan diameter in the range of from 300 cm to 340 cm may be in the range of from 1935K to 1995K. Purely by way of non-limitative example, the maximum TET of a direct drive gas turbine engine having a fan diameter in the range of from 300 cm to 340 cm may be in the range of from 1890K to 1950K. The maximum TET may be in an inclusive range bounded by any two of the values in the previous sentence (i.e. the values may form upper or lower bounds), for example in the range of from 1800K to 1950K, or 1900K to 2000K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre composite. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades. Where the fan blades have a carbon fibre composite body, there may be 16 or 18 fan blades. Where the fan blades have a metallic body (for example aluminium-lithium or titanium-alloy), there may be 18, 20 or 22 fan blades.

As used herein, the terms idle, taxi, take-off, climb, cruise, descent, approach, and landing (or one or more portions thereof) have the conventional meaning and would be readily understood by the skilled person. Thus, for a given gas turbine engine for an aircraft, the skilled person would immediately recognise each term to refer to the entirety, or one or more portions, of an operating phase of the engine within a given mission of an aircraft to which the gas turbine engine is designed to be attached.

In this regard, ground idle may refer to an operating phase of the engine where the aircraft is stationary and in contact with the ground, but where there is a requirement for the engine to be running. During idle, the engine may be producing between 3% and 9% of the available thrust of the engine. In further non-limitative examples, the engine may be producing between 5% and 8% of available thrust. In further non-limitative examples, the engine may be producing between 6% and 7% of available thrust. Taxi may refer to an operating phase of the engine where the aircraft is being propelled along the ground by the thrust produced by the engine. During taxi, the engine may be producing between 5% and 15% of available thrust. In further non-limitative examples, the engine may be producing between 6% and 12% of available thrust. In further non-limitative examples, the engine may be producing between 7% and 10% of available thrust. Take-off may refer to an operating phase of the engine where the aircraft is being propelled by the thrust produced by the engine. At an initial stage within the take-off phase, the aircraft may be propelled whilst the aircraft is in contact with the ground. At a later stage within the take-off phase, the aircraft may be propelled whilst the aircraft is not in contact with the ground. During take-off, the engine may be producing between 90% and 100% of available thrust. In further non-limitative examples, the engine may be producing between 95% and 100% of available thrust. In further non-limitative examples, the engine may be producing 100% of available thrust.

Climb may refer to an operating phase of the engine where the aircraft is being propelled by the thrust produced by the engine. During climb, the engine may be producing between 75% and 100% of available thrust. In further non-limitative examples, the engine may be producing between 80% and 95% of available thrust. In further non-limitative examples, the engine may be producing between 85% and 90% of available thrust. In this regard, climb may refer to an operating phase within an aircraft flight cycle between take-off and the arrival at cruise conditions, the arrival at cruise conditions thus defining the onset of the cruise phase, or a portion thereof, of the aircraft flight. Additionally or alternatively, climb may refer to a nominal point in, or one or more nominal periods during, an aircraft flight cycle between take-off and landing, where a relative increase in altitude is required, which may require an additional thrust demand of the engine.

As used herein, cruise conditions, which may define the cruise phase (or a portion thereof) of the aircraft flight, have the conventional meaning and would be readily understood by the skilled person. In some examples, for a given gas turbine engine for an aircraft, cruise conditions may refer to an the operating point of the engine at mid-cruise of a given mission (which may be referred to in the industry as the "economic mission") of an aircraft to which the gas turbine engine is designed to be attached. In this regard, mid-cruise may be regarded as the point in an aircraft flight cycle at which 50% of the total fuel that is burned between top of climb and start of descent has been burned (which may be approximated by the midpoint—in terms of time and/or distance-between top of climb and start of descent). Cruise conditions may thus define an operating point, phase, or portion thereof, of the flight that provides a thrust that would ensure steady state operation (i.e. maintaining a constant altitude and/or a constant Mach Number), or at least a substantially steady state operation (i.e. maintaining an at least substantially constant altitude and/or an at least substantially constant Mach Number) of an aircraft to which it is designed to be attached, taking into account the number of engines provided to that aircraft. For example, where an engine is designed to be attached to an aircraft that has two engines of the same type, at cruise conditions the engine may provide half of the total thrust that would be required for steady state operation, or at least a substantially steady state operation, of that aircraft at mid-cruise.

In other words, for a given gas turbine engine for an aircraft, cruise conditions may be defined as the operating point of the engine that provides a specified thrust (required to provide—in combination with any other engines on the aircraft—a steady state operation, or at least a substantially steady state operation, of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions may be clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to a forward Mach number of 0.8 and standard atmospheric conditions (according to the International Standard Atmosphere) at an altitude of 35000 ft (10668 m). At such cruise conditions, the engine may provide a known required net thrust level. The known required net thrust level is, of course, dependent on the engine and its intended application and may be, for example, a value in the range of from 20 kN to 40 kN.

Purely by way of further example, the cruise conditions may correspond to a forward Mach number of 0.85 and standard atmospheric conditions (according to the International Standard Atmosphere) at an altitude of 38000 ft (11582 m). At such cruise conditions, the engine may provide a known required net thrust level. The known required net thrust level is, of course, dependent on the engine and its intended application and may be, for example, a value in the range of from 35 kN to 65 kN. In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

Furthermore, the skilled person would immediately recognise either or both of descent and approach to refer to an operating phase within an aircraft flight cycle between cruise and landing of the aircraft, with approach in particular forming part of the landing and take-off (LTO) phase. During either or both of descent and approach, the engine may be producing between 0% and 50% of available thrust. In further non-limitative examples, the engine may be producing between 25% and 40% of available thrust. In further non-limitative examples, the engine may be producing between 30% and 35% of available thrust. Additionally or alternatively, descent may refer to a nominal point in an aircraft flight cycle between take-off and landing, where a relative decrease in altitude is required, and which may require a reduced thrust demand of the engine.

According to an aspect, there is provided an aircraft comprising a gas turbine engine as described and/or claimed herein. The aircraft according to this aspect is the aircraft for which the gas turbine engine has been designed to be attached. Accordingly, cruise conditions according to this aspect may correspond to an operating point, phase, or portion thereof, of the aircraft flight, as defined elsewhere herein.

According to an aspect, there is provided a method of operating a gas turbine engine as described and/or claimed herein. The operation may be at any suitable condition, which may be as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at any suitable condition, for example the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter contained or described herein may be applied to any aspect and/or combined with any other feature or parameter contained or described herein.

Except where mutually exclusive, any parameter or value contained or described herein may be applied to and/or combined with any one or more further parameters and/or or values contained or described herein. For example, a first parameter or value contained or described herein (for example, parameter A) may be applied to and/or combined with any one or more further parameters and/or values contained or described herein (for example, any one or more of parameter B; parameter C; and parameter D, and so on) to express a product of their relationship. For example, the Skilled Person would understand that where parameter A is disclosed in separation to parameter B, a product of their relationship may be expressed as, for example, A/B, B/A, B*A, or any such further application, combination, or function of parameter A relative to parameter B, as required.

BRIEF DESCRIPTION OF THE DRAWINGS

Embodiments will now be described by way of example only, with reference to the Figures, in which.

DETAILED DESCRIPTION OF THE DISCLOSURE

Figure 1:
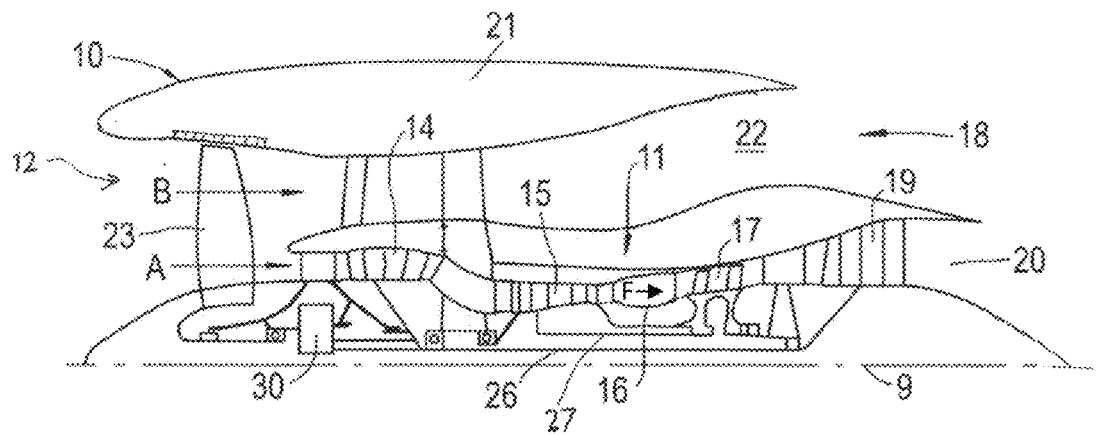
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally acts to impart increased pressure to the bypass airflow B flowing through the bypass duct 22, such that the bypass airflow B is exhausted through the bypass exhaust nozzle 18 to generally provide the majority of the propulsive thrust. The epicyclic gearbox 30 is a reduction gearbox.

Figure 2:
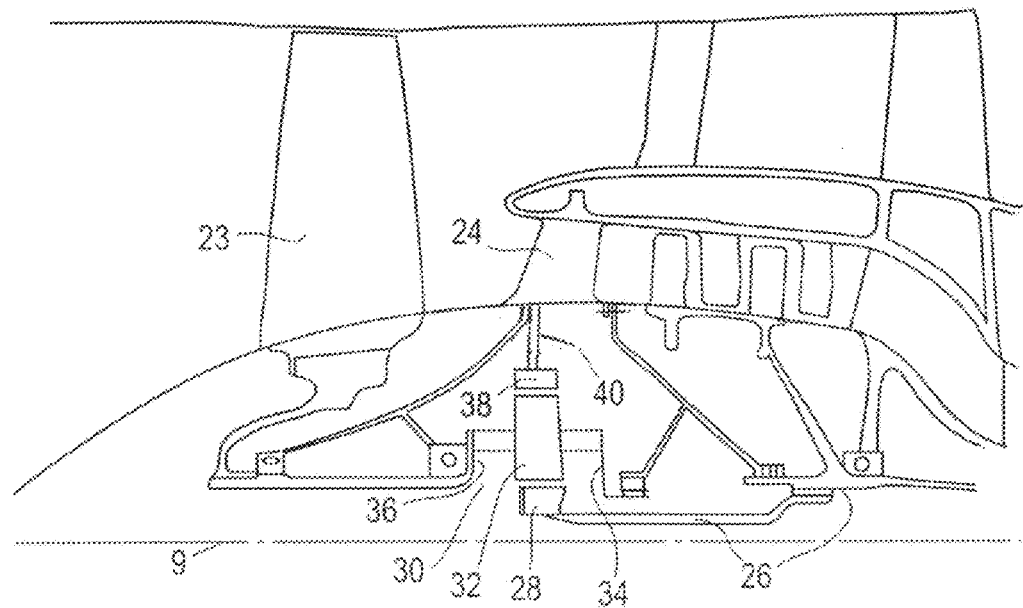
FIG. 2 is a close up sectional side view of an upstream portion of a geared gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
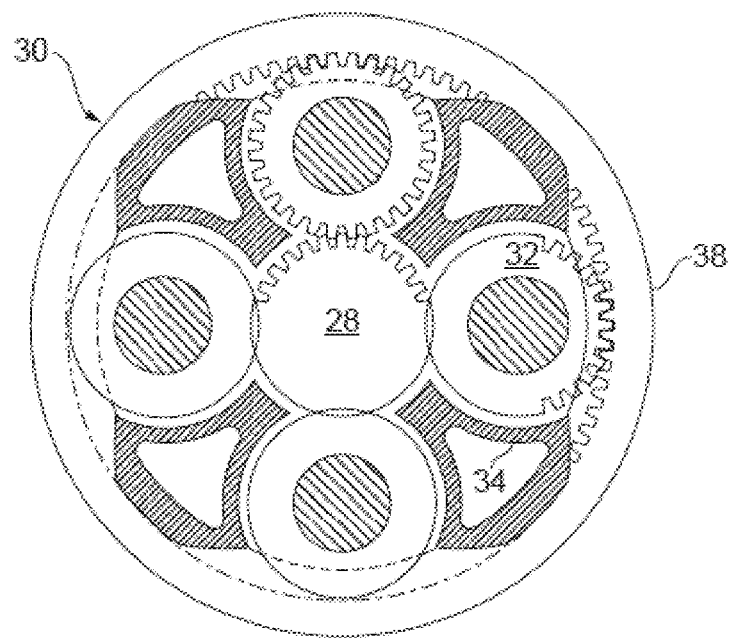
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

By way of further example, other gas turbine engines to which the present disclosure may be applied may have no gearbox for the main shaft(s), instead being direct drive engines.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The fuel F provided to the combustion equipment 16 may comprise a fossil-based hydrocarbon fuel, such as Kerosene. Thus, the fuel F may comprise molecules from one or more of the chemical families of n-alkanes, iso-alkanes, cycloalkanes, and aromatics. Additionally or alternatively, when blended with, mixed with, or replaced by an alternative fuel, the fuel F may comprise renewable hydrocarbons produced from biological or non-biological resources, otherwise known as sustainable aviation fuel (SAF). In each of the provided examples, the fuel F may comprise one or more trace elements including, for example, sulphur, nitrogen, oxygen, inorganics, and metals.

SAF is understood by the Skilled Person to refer to, for example, a biofuel, renewable aviation fuel, renewable jet fuel, alternative fuel or biojet fuel, produced from biological or non-biological resources. SAF is understood to be commonly synthesised from carbon-containing gasses drawn out of the atmosphere and/or captured from industrial processes; or from a wide range of sustainable feedstocks such as, for example, waste oil and fats; municipal solid waste; cellulosic waste (such as corn stalks); cover crops such as camelina, *carinata*, and pennycress; non-biogenic alternative fuels; jatropha; halophytes and algae, rather than from fossil-based hydrocarbons. SAF is understood as not encompassing fossil fuels.

Functional performance of a given fuel composition, or blend of fuel F for use in a given mission, may be defined, at least in part, by the ability of the fuel to service the Brayton cycle of the gas turbine engine 10. Parameters defining functional performance may include, for example, specific energy; energy density; thermal stability; and, emissions including gaseous and/or particulate matter. In this regard, particulate matter emissions may include soot particles created by the combustion of said fuel F, also known as non-volatile particulate matter (nvPM). Any reference herein to soot or smoke may apply equally to other types of particulate matter emissions known within the art. Gaseous emissions may include any one or more of nitrogen oxides (NOx); carbon monoxide (CO); carbon dioxide ($CO_2$); unburned hydrocarbons (UHC); sulphur oxides (SO) including, for example, sulphur dioxide ($SO_2$) and/or sulphur trioxide ($SO_3$); and, volatile organic compounds (VOC) created by the combustion of said fuel F. Any reference herein to gaseous emissions may apply equally to other types of gaseous emissions known within the art.

A relatively higher specific energy (i.e. energy per unit mass), expressed as MJ/kg, may at least partially reduce take-off weight, thus potentially providing a relative improvement in fuel efficiency. A relatively higher energy density (i.e. energy per unit volume), expressed as MJ/L, may at least partially reduce take-off fuel volume, which may be particularly important for volume-limited missions or military operations involving refuelling. A relatively higher thermal stability (i.e. inhibition of fuel to degrade or coke under thermal stress) may permit the fuel to sustain elevated temperatures in the engine and fuel injectors, thus potentially providing relative improvements in combustion efficiency. Reduced emissions, including particulate matter, may permit reduced contrail formation, whilst reducing the environmental impact of a given mission.

Other properties of the fuel may also be key to functional performance. For example, a relatively lower freeze point (° C.) may allow long-range missions to optimise flight profiles; minimum aromatic concentrations (%) may ensure sufficient swelling of certain materials used in the construction of o-rings and seals that have been previously exposed to fuels with high aromatic contents; and, a maximum surface tension (mN/m) may ensure sufficient spray break-up and atomisation of the fuel.

The ratio of the number of hydrogen atoms to the number of carbon atoms in a molecule may influence the specific energy of a given composition, or blend of fuel. Fuels with higher ratios of hydrogen atoms to carbon atoms may have higher specific energies in the absence of bond strain. For example, fossil-based hydrocarbon fuels may comprise molecules with approximately 7 to 18 carbons, with a significant portion of a given composition stemming from molecules with 9 to 15 carbons, with an average of 12 carbons.

A number of sustainable aviation fuel blends have been approved for use. For example, some approved blends comprise blend ratios of up to 10% sustainable aviation fuel, whilst other approved blends comprise blend ratios of between 10% and 50% sustainable aviation fuel (the remainder comprising one or more fossil-based hydrocarbon fuels, such as Kerosene), with further compositions awaiting approval. However, there is an anticipation in the aviation industry that sustainable aviation fuel blends comprising up to (and including) 100% sustainable aviation fuel (SAF) will be eventually approved for use.

Sustainable aviation fuels may comprise one or more of n-alkanes, iso-alkanes, cyclo-alkanes, and aromatics, and may be produced, for example, from one or more of synthesis gas (syngas); lipids (e.g. fats, oils, and greases); sugars; and alcohols. Thus, sustainable aviation fuels may comprise either or both of a lower aromatic and sulphur content, relative to fossil-based hydrocarbon fuels. Additionally or alternatively, sustainable aviation fuels may comprise either or both of a higher iso-alkane and cyclo-alkane content, relative to fossil-based hydrocarbon fuels. In some examples, sustainable aviation fuels may comprise either or both of a density of between 90% and 98% that of kerosene and a calorific value of between 101% and 105% that of kerosene.

In some examples, the sustainable aviation fuel(s), or blend(s) provided to the combustion equipment 16 may be relatively lower in aromatic and/or other non-paraffinic content than that of kerosene. The sustainable aviation fuel may comprise an aromatic content of e.g. 30%, 20%, 15%, 10%, 8%, 5%, or less than 5%; e.g. 4%, 3%, 2%, 1%, or less than 1%; e.g. 0.75%, 0.5%, 0.25%, or less than 0.25%; e.g. 0.2%, 0.1%, or less than 0.1%; e.g. 0.01%, 0.001%, or 0%. The aromatic content of the sustainable aviation fuel may be in an inclusive figure or range bounded by or within any two of the values in the previous sentence (i.e. the values may form upper or lower bounds), e.g. 13.5%, 8.5%, 2.5%, 0.35%, 0.15%, 0.05%, 0.005%, or 0%; or 0% to 0.75%, 0% to 0.5%, or 0.1% to 0.25%; or 0.15% to 0.65%, 0.35% to 0.55%, or 0.035% to 0.055%; according to one or more of preference, fuel stock or supplier, and compositional variation therein.

Owing at least in part to the molecular structure of sustainable aviation fuels, sustainable aviation fuels may provide benefits including, for example, one or more of a higher specific energy (despite, in some examples, a lower energy density); higher specific heat capacity; higher thermal stability; higher lubricity; lower viscosity; lower surface tension; lower freeze point; lower soot emissions; lower NOx; and, lower $CO_2$ emissions, relative to fossil-based hydrocarbon fuels (e.g. when combusted in the combustion equipment 16). Accordingly, relative to fossil-based hydrocarbon fuels, such as Kerosene, sustainable aviation fuels may lead to either or both of a relative decrease in specific fuel consumption, and a relative decrease in maintenance costs.

Figure 4:
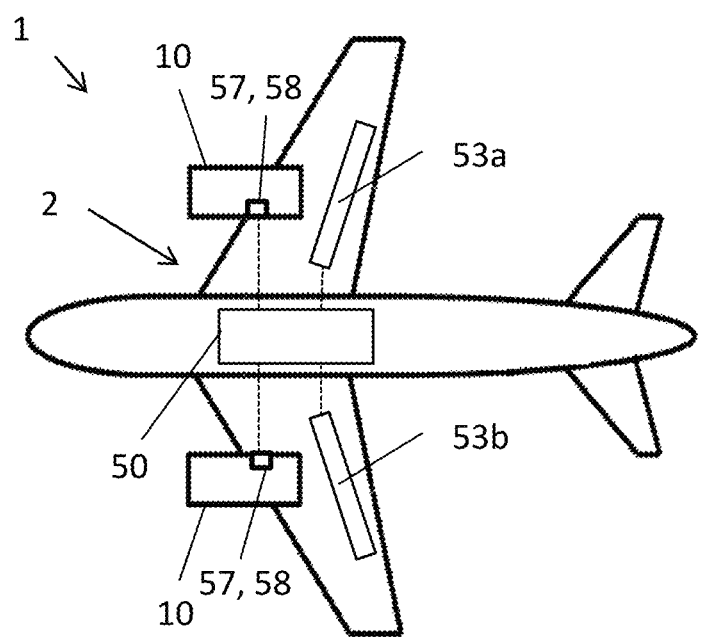
FIG. 4 is a representation of an aircraft with a propulsion system including two gas turbine engines.

As depicted in FIG. 4, an aircraft 1 may comprise multiple fuel tanks 50, 53; for example a larger, primary fuel tank 50 located in the aircraft fuselage, and a smaller fuel tank 53a, 53b located in each wing. In other examples, an aircraft 1 may have only a single fuel tank 50, and/or the wing fuel tanks 53 may be larger than the central fuel tank 50, or no central fuel tank may be provided (with all fuel instead being stored in the aircraft's wings)—it will be appreciated that many different tank layouts are envisaged and that the examples pictured are provided for ease of description and not intended to be limiting.

FIG. 4 shows an aircraft 1 with a propulsion system 2 comprising two gas turbine engines 10. The gas turbine engines 10 are supplied with fuel from a fuel supply system onboard the aircraft 1. The fuel supply system 1000 of the example pictured comprises a single fuel source. For the purposes of the present application the term "fuel source" means either 1) a single fuel tank or 2) a plurality of fuel tanks which are fluidly interconnected. Each fuel source is arranged to provide a separate source of fuel i.e. a first fuel source may contain a first fuel having a different characteristic or characteristics from a second fuel contained in a second fuel source. First and second fuel sources are therefore not fluidly coupled to each other so as to separate the different fuels (at least under normal running conditions). The use of multiple fuel sources allows an aircraft 1 to carry multiple different fuels, and to change which fuel is being used during operation, and optionally even whilst at cruise or when changing between different stages of operation in flight.

In the present example, the first (and, in these examples, only) fuel source comprises a centre fuel tank 50, located primarily in the fuselage of the aircraft 1 and a plurality of wing fuel tanks 53a, 53b, where at least one wing fuel tank is located in the port wing and at least one wing fuel tank is located in the starboard wing for balancing. All of the tanks 50, 53 are fluidly interconnected in the example shown, so forming a single fuel source. Each of the centre fuel tank 50 and the wing fuel tanks 53 may comprise a plurality of fluidly interconnected fuel tanks.

In another example, the wing fuel tanks 53a, 53b may not be fluidly connected to the central tank 50, so forming a separate, second fuel source. For balancing purposes, one or more fuel tanks in the port wing may be fluidly connected to one or more fuel tanks in the starboard wing. This may be done either via a centre fuel tank (if that tank does not form part of the other fuel source), or bypassing the centre fuel tank(s), or both (for maximum flexibility and safety). In another example, the first fuel source comprises wing fuel tanks 53 and a centre fuel tank 50, while a second fuel source comprises a further separate centre fuel tank.

Fluid interconnection between wing fuel tanks and the centre fuel tank of the first fuel source may be provided for balancing of the aircraft 1. In aircraft 1 with multiple fuel sources, two or more of the fuel sources may therefore contain different fuels from each other, such that the aircraft 1 can change fuel in flight. Being able to determine which fuel is being provided to the combustor 16 may therefore be more complex than simply recording a single identity of a fuel onboard the aircraft 1, or checking once at start-up.

In some examples, the allocation of fuel tanks 50, 53 available on the aircraft 1 may be constrained such that the first fuel source and the second fuel source are each substantially symmetrical with respect to the aircraft centre line. In cases where an asymmetric fuel tank allocation is permitted, a suitable means of fuel transfer is generally provided between fuel tanks of the first fuel source and/or between fuel tanks of the second fuel source such that the position of the aircraft's centre of mass can be maintained within acceptable lateral limits throughout the flight.

Aircraft generally refuel at multiple different airports, for example at the beginning and end of a long-distance flight. Whilst there are standards with which all aviation fuels must be compliant, as mentioned above, different aviation fuels have different compositions, for example depending on their source (e.g. different petroleum sources, biofuels or other synthetic aviation fuels (often described as sustainable aviation fuels-SAFs), and/or mixtures of petroleum-based fuels, and other fuels) and on any additives included (e.g. such as antioxidants and metal deactivators, biocides, static reducers, icing inhibitors, corrosion inhibitors) and any impurities. As well as varying between airports and fuel suppliers, fuel composition of the available aviation fuel may vary between batches even for a given airport or fuel supplier. Further, fuel tanks 50, 53 of aircraft 1 are usually not emptied before being topped up for a subsequent flight, resulting in mixtures of different fuels within the tanks-effectively a fuel with a different composition resulting from the mixture.

The inventors appreciated that, as different fuels can have different properties, whilst still conforming to the standards, knowledge of the fuel(s) available to an aircraft 1 can allow more efficient, tailored, control of the aircraft 1, and more specifically of the aircraft's propulsion system 2 (i.e. the one or more gas turbine engines 10 of the aircraft 1, and associated controls and components). Knowledge of the fuel can therefore be used as a tool to improve aircraft performance, so determining or monitoring fuel composition can provide benefits. In particular, determining one or more fuel characteristics of the fuel to be supplied to the combustor 16—be that a fuel from a single fuel source, or a mixture of one or more fuels from different fuel sources, is therefore important in determining engine operation. A key feature of engine operation is heat management-engine heat management is primarily performed using heat transfer to and from oil and fuel in the engine, so control of a heat exchange system 3000—for example by controlling oil flow, controlling fuel flow, controlling air flow, and/or controlling one or more heat exchangers 1004, 1006, 2020, 2030 or other heat exchange components in other ways—may allow the performance of the engine 10 to be optimised for a fuel with particular fuel characteristics.

As used herein, the term "fuel characteristics" refers to intrinsic or inherent fuel properties such as fuel composition, not variable properties such as volume or temperature. One or more fuel characteristics may be determined, and that data used in adjusting control of the engine 10, and in particular of the heat management system 3000. Examples of fuel characteristics include one or more of:

i. the percentage of sustainable aviation fuel (SAF) in the fuel, or an indication that the fuel is a fossil fuel, for example fossil kerosene, or that the fuel is a pure SAF fuel;

ii. parameters of a hydrocarbon distribution of the fuel, such as:
   the aromatic hydrocarbon content of the fuel, and optionally also/alternatively the multi-aromatic hydrocarbon content of the fuel;
   the hydrogen to carbon ratio (H/C) of the fuel;
   % composition information for some or all hydrocarbons present;

iii. the presence or percentage of a particular element or species, such as:
   nitrogen content of the fuel/the percentage of nitrogen-containing species in the fuel;
   the presence or percentage of a tracer species or trace element in the fuel;
   naphthalene content of the fuel;
   sulphur content of the fuel/the percentage of sulphur-containing species in the fuel;
   cycloparaffin content of the fuel;
   oxygen content of the fuel;

iv. one or more properties of the fuel in use in a gas turbine engine 10, such as:
   level of non-volatile particulate matter (nvPM) emissions or $CO_2$ emissions on combustion;
   level of coking or lacquering of the fuel (or another measure of fuel breakdown product deposition);

v. one or more properties of the fuel itself, independent of use in an engine 10 or combustion, such as:
   thermal stability of the fuel (e.g. thermal breakdown temperature); and
   one or more physical properties such as density, viscosity, calorific value, freeze temperature, and/or heat capacity.

The fuel characteristic(s) to be determined may be selected based on which properties of the fuel are most relevant to changes which may be made to the heat management system 3000. The determination of fuel characteristics may include obtaining fuel characteristics of any fuel already present in the fuel tank 50, 53 prior to refuelling and an indication of the amount of fuel remaining, and then combining that information with information regarding a new fuel added to the tank 50, 53 on refuelling.

The obtaining fuel characteristics of any fuel already present in the fuel tank 50, 53 prior to refuelling, and/or obtaining fuel characteristics of a fuel provided on refuelling, may comprise one or more of the following:

(i) physically and/or chemically detecting one or more features or parameters of the composition of the fuel (this may allow direct detection of the fuel characteristics, and/or may allow the fuel characteristics to be determined using the detection results), and/or detecting one or more tracer elements or compounds added to the fuel to facilitate its identification (e.g. a dye);

(ii) retrieving fuel characteristic information from an onboard memory/data store; and/or (iii) receiving data, for example from an input provided at a user interface, or data transmitted to the aircraft 1.

In some examples, one or more fuel characteristics may be determined in operation of the gas turbine engine 10, for example by inferring fuel characteristics of fuel provided to the combustor 16 in operation from engine performance metrics, or by performing on-wing detection.

In some examples, multiple different methods may be performed to obtain the fuel characteristics—for example, different methods may be used for different characteristics, and/or different methods may be used for the same characteristic as a check. For example, stored or otherwise provided fuel characteristic data may be compared against the results of chemically or physically detecting one or more parameters of the fuel. If there is a mis-match between the stored fuel characteristic and the corresponding detected parameter, an alert may be provided.

Fuel characteristics may be determined by physically and/or chemically detecting one or more features of the composition of the fuel (e.g. in a testing unit off-wing, or as the fuel is transported to a fuel tank on-wing, or indeed in use in the gas turbine engine 10), so allowing direct detection of the fuel characteristics or providing data from which they can be determined, as mentioned above, and/or detecting one or more tracer elements or compounds added to the fuel to facilitate its identification (e.g. a dye); or by receiving data, for example from an input provided at a user interface, or data transmitted to the aircraft, e.g. by scanning a barcode associated with the fuel delivery.

When physical and/or chemical determination is used, fuel characteristics may be detected in various ways, both direct (e.g. from sensor data corresponding to the fuel characteristic in question) and indirect (e.g. by inference or calculation from other characteristics or measurements, or by reference to data for a specific detected tracer in the fuel). The characteristics may be determined as relative values as compared to another fuel, or as absolute values. For example, one or more of the following detection methods may be used:

The aromatic or cycloparaffin content of the fuel can be determined based on measurements of the swell of a sensor component made from a seal material such as a nitrile seal material.

Trace substances or species, either present naturally in the fuel or added to act as a tracer, may be used to determine fuel characteristics such as the percentage of sustainable aviation fuel in the fuel or whether the fuel is kerosene.

Measurements of the vibrational mode of a piezoelectric crystal exposed to the fuel can be used as the basis for the determination of various fuel characteristics including the aromatic content of the fuel, the oxygen content of the fuel, and the thermal stability or the coking/lacquering level of the fuel—for example by measuring the build-up of surface deposits on the piezoelectric crystal which will result in a change in vibrational mode.

Various fuel characteristics may be determined by collecting performance parameters of the gas turbine engine 10 during a first period of operation (such as during take-off), and optionally also during a second period of operation (e.g. during cruise), and comparing these collected parameters to expected values if using fuel of known properties.

Various fuel characteristics including the aromatic hydrocarbon content of the fuel can be determined based on sensor measurements of the presence, absence, or degree of formation of a contrail by the gas turbine 10 during its operation.

Fuel characteristics including the aromatic hydrocarbon content can be determined based on a UV-Vis spectroscopy measurement performed on the fuel.

Various fuel characteristics including the sulphur content, naphthalene content, aromatic hydrogen content and hydrogen to carbon ratio may be determined by measurement of substances present in the exhaust gases emitted by the gas turbine engine 10 during its use.

Calorific value of the fuel may be determined in operation of the aircraft 1 based on measurements taken as the fuel is being burned—for example using fuel flow rate and shaft speed or change in temperature across the combustor 16.

Various fuel characteristics may be determined by making an operational change arranged to affect operation of the gas turbine engine 10, sensing a response to the operational change; and determining the one or more fuel characteristics of the fuel based on the response to the operational change.

Various fuel characteristics may be determined in relation to fuel characteristics of a first fuel by changing a fuel supplied to the gas turbine engine 10 from the first fuel to a second fuel, and determining the one or more fuel characteristics of the second fuel based on a change in a relationship between T30 and one of T40 and T41 (the relationship being indicative of the temperature rise across the combustor 16). The characteristics may be determined as relative values as compared to the first fuel, or as absolute values, e.g. by reference to known values for the first fuel.

As used herein, T30, T40 and T41, and any other numbered pressures and temperatures, are defined using the station numbering listed in standard SAE AS755, in particular:

T30=High Pressure Compressor (HPC) Outlet Total Temperature;

T40=Combustion Exit Total Temperature;

T41=High Pressure Turbine (HPT) Rotor Entry Total Temperature.

Any suitable approach known in the art may be used, and fuel characteristic determination will not be discussed further herein.

The aircraft 1 may therefore comprise a fuel composition determination module 57 arranged to determine at least one fuel characteristic of the fuel. The determination may be performed by obtaining a value from a data store (e.g. from data provided to the aircraft 1 on refuelling), or by performing one or more calculations based on data provided by one or more sensors or other engine components, using any of the methods described above. In the example shown in FIG. 4, one fuel composition determination module 57 is provided as part of each engine 10, where the fuel enters the engine 10. In other implementations, the module 57 may be differently-located within the engine 10, or located elsewhere on the aircraft 1, e.g. in, on, or adjacent to a fuel tank 50, 53. In implementations with a fuel composition determination module 57, the module 57 may be arranged to provide an output to an Electronic Engine Controller (EEC), or the module 57 may be provided as part of an EEC. The one or more fuel characteristics determined by the fuel composition determination module 57 may therefore be used to influence control of the engine 10. A dedicated controller 58 may be provided to process output of the fuel composition determination module 57 and to provide control instructions to controllable engine components based on the fuel characteristic information. In other implementations, the control functionality 58 may be provided by the EEC and no separate unit or module may be provided.

Figure 5:
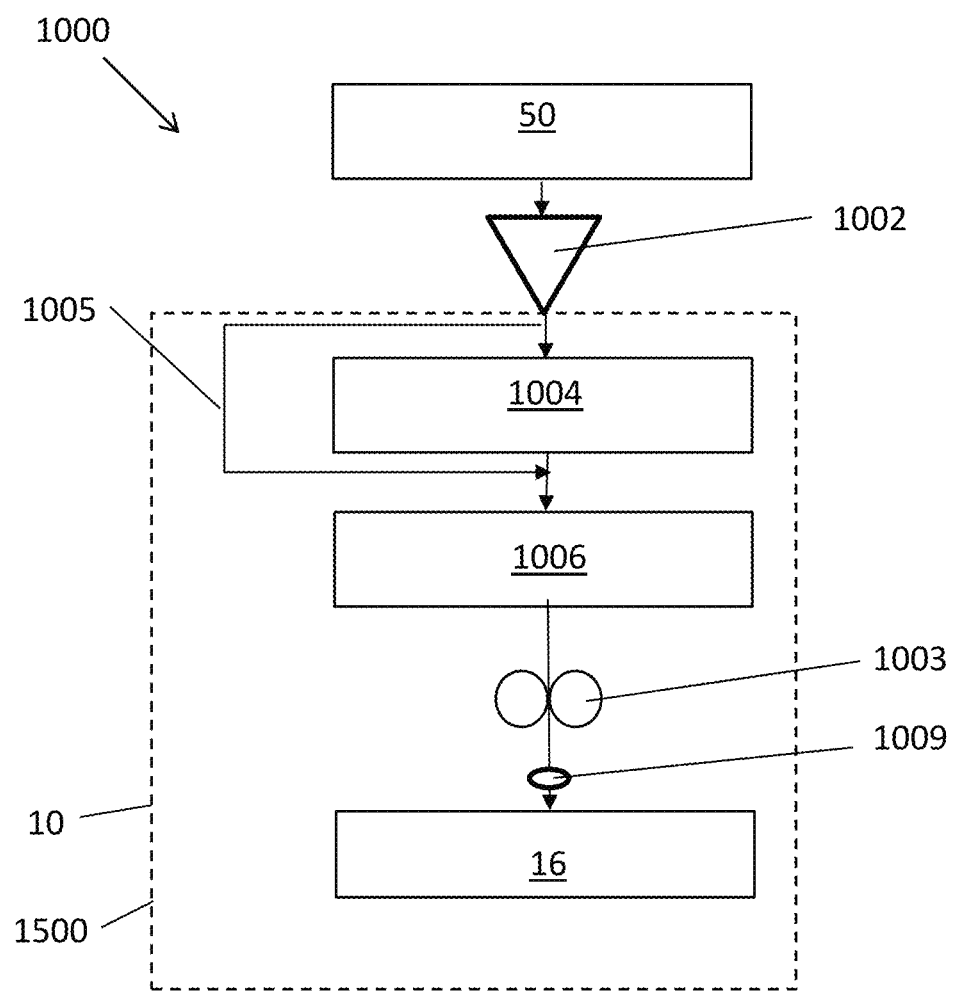
FIG. 5 is a representation of an example fuel system.

An example fuel system 1000 for a geared gas turbine engine 10 is shown in FIG. 5, the fuel system 1000 comprising a fuel flow path from the fuel tank 50 to the combustor 16 of the gas turbine engine 10 of the aircraft 1. Fuel system 1000 comprises both the fuel supply system 50, 1002 (which supplies fuel to the engine 10) and the fuel management system 1500 (which operates within the engine 10) of the aircraft 1. The fuel management system 1500 has a role in managing fuel temperature as well as fuel flow, directing the fuel via one or more heat exchangers 1004, 1006 of the engine's heat exchange system 3000. The heat exchange system 3000 comprises parts the fuel management system 1500, and also the recirculating oil system 2000, 2000' (which is described in more detail below). The heat exchange system 3000 is the general term used for the systems and components used to transfer heat between fluids (in particular, oil and fuel) within the engine 10, and comprises heat exchangers, valves, connecting pipework, and associated components, e.g. pumps, refrigeration apparatus, etc.

Returning to the fuel system 1000, fuel is pumped from the fuel tank 50 to the gas turbine engine 10 by a low pressure fuel supply pump 1002. The fuel then flows through a secondary fuel-oil heat exchanger 1004 and a primary fuel-oil heat exchanger 1006. The primary fuel-oil heat exchanger 1006 may be described as a main fuel-oil heat exchanger as the oil flowing therethrough may be used to cool and lubricate the main gearbox 30 of the engine 10. The gas turbine engine 10 of the implementations being described further comprise a generator (in particular, an integrated drive generator) and a secondary oil loop system arranged to provide oil to the generator.

The secondary fuel-oil heat exchanger 1004 may be described as an integrated drive generator fuel-oil heat exchanger, as the oil flowing therethrough may be used to cool and/or lubricate one or more components of the integrated drive generator (IDG) of the engine 10. In other implementations, a different kind of generator may be used in place of an IDG—e.g. a Variable Frequency Generator (VFG) or a Variable Frequency Starter Generator (VFSG). The fuel system 1000 of such implementations may be otherwise equivalent.

The engine 10 of the example being described therefore comprises two fuel-oil heat exchangers 1004, 1006. More or fewer fuel-oil heat exchangers may be provided in other implementations. The fuel management system 1500 pictured is arranged so that the fuel reaches the secondary fuel-oil heat exchanger 1004 before the primary fuel-oil heat exchanger 1006. After leaving the primary fuel-oil heat exchanger 1006, the fuel then passes through an engine fuel pump 1003, and then on to the combustor 16. The engine fuel pump 1003 may be described as a main fuel pump. In other implementations, the engine fuel pump 1003 may be upstream of one or more of the heat exchangers 1004, 1006.

In the example shown in FIG. 5, the fuel system 1000 further comprises a temperature sensor 1009 arranged to sense the temperature of the fuel approaching or reaching the combustor 16. The temperature sensor 1009 is shown adjacent to an inlet of the combustor 16 in the example pictured, but in various examples the sensor 1009 can be located anywhere downstream of the primary fuel-oil heat exchanger 1006 (or of whichever fuel-oil heat exchanger is furthest downstream in other implementations), on the fuel side, so as to provide a measure of fuel temperature. In gas turbine engines 10 such as that described herein, the fuel passes through fuel spray nozzles before entering the combustion chamber itself—these nozzles can be very susceptible to fuel thermal breakdown leading to blockages in the relatively narrow passages (e.g. metering slots); placing the sensor 1009 as close as reasonably possible to the inlet to the nozzles is therefore advised in some implementations. Multiple temperature sensors 1009 may be used in some implementations. The one or more temperature sensors 1009 are arranged to provide an output (temperature data) to a controller 58.

The primary fuel-oil heat exchanger 1006 and the secondary fuel-oil heat exchanger 1004 are configured such that a flow of oil is conveyed through each in addition to the flow of fuel therethrough. The primary fuel-oil heat exchanger 1006 and secondary fuel-oil heat exchanger 1004 are configured such that heat may be transferred between the oil and the fuel flowing therethrough. In standard operation of the engine 10, for example at cruise conditions, the average temperature of the flow of oil entering the primary fuel-oil heat exchanger 1006 is higher than the average temperature of the fuel entering the primary fuel-oil heat exchanger 1006, and the average temperature of the flow of oil entering the secondary fuel-oil heat exchanger 1004 is higher than the average temperature of the fuel entering the secondary fuel-oil heat exchanger 1004. In this way, the primary fuel-oil heat exchanger 1006 and the secondary fuel-oil heat exchanger 1004 are each configured to transfer thermal energy from a flow of oil to a flow of fuel flowing therethrough in operation.

The two flows of oil (oil flow through the primary heat exchanger and oil flow through the secondary heat exchanger) may be separate-physically separated and optionally also chemically distinct oils, and/or having a different flow rate. Different oil may therefore flow through the primary fuel-oil heat exchanger 1006 from that flowing through the secondary fuel-oil heat exchanger 1004. Each heat exchanger 1004, 1006 may be on a separate closed-loop oil system 2000, 2000'.

In general, at least the majority of the fuel which passes through the secondary fuel-oil heat exchanger 1004 also passes through the main fuel-oil heat exchanger 1006. The two heat exchangers 1004, 1006 may therefore be described as being in series with each other, with respect to fuel flow, and as being along a main fuel flow path from the tank 50 to the combustor 16. However, either, or each, heat exchanger 1004, 1006 may be provided with a bypass to allow some of the fuel to avoid passing through the respective heat exchanger, for example in the form of a bypass pipe 1005 as shown in FIG. 5. A valve (not shown) may determine what proportion of the fuel passes through the heat exchanger 1004 and what proportion through the bypass pipe 1005. In various implementations, a bypass pipe may be provided for each heat exchanger 1004, 1006, allowing a portion of the fuel to avoid either or both heat exchangers. Additionally or alternatively, one or more bypass pipes 2005, 2005' may be provided for the oil for either or both fuel-oil heat exchangers 1004, 1006, allowing a portion of the oil to avoid one or more heat exchangers. A valve arranged to control the flow of a fluid through a bypass pipe 1005 may be referred to as a bypass valve.

The secondary (IDG) fuel-oil heat exchanger 1004 and the main fuel-oil heat exchanger 1006 are therefore configured such that a flow of oil is conveyed through each in addition to the flow of fuel—the oil flowing through one is different from the oil flowing through the other in the implementation being described, although it will be appreciated that the same oil may flow through one fuel-oil heat exchanger and then through the other fuel-oil heat exchanger in other implementations.

The two heat exchangers 1004, 1006 are therefore in separate closed loop systems 2000, 2000', (FIGS. 7, 8) with respect to oil flow, in the implementation being described, i.e. the oils flowing through the primary and secondary fuel-oil heat exchangers are fluidly separate, and may be chemically distinct from each other. The two oil loop systems 2000, 2000' serve to circulate oil through their respective fuel-oil heat exchangers 1006, 1004, and optionally also through one or more further heat exchangers, e.g. air-oil or oil-oil heat exchangers as described below. The two oil loop systems 2000, 2000' together may be described as providing a recirculating oil system for the engine 10.

Figure 6:
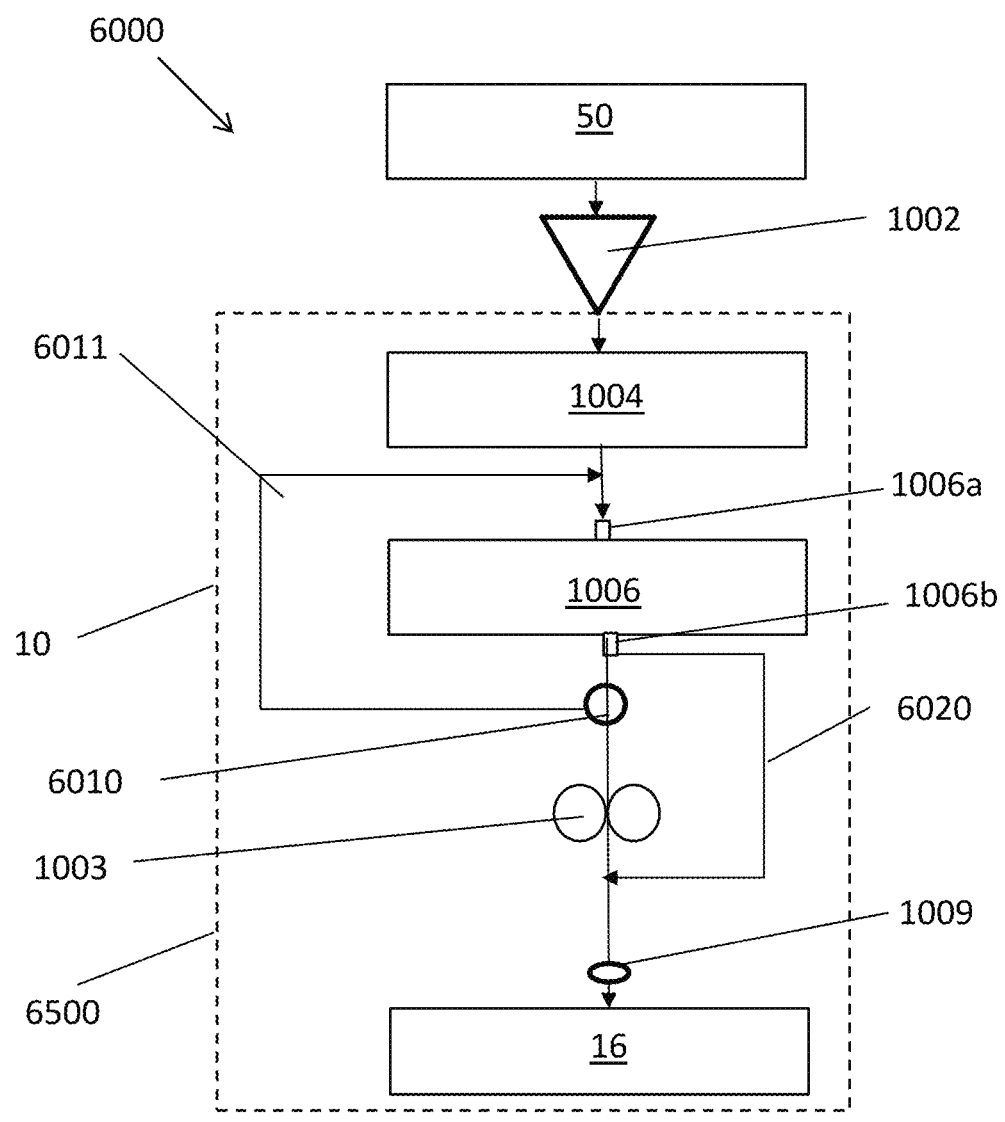
FIG. 6 is a representation of an alternative example fuel system.
Figure 10:
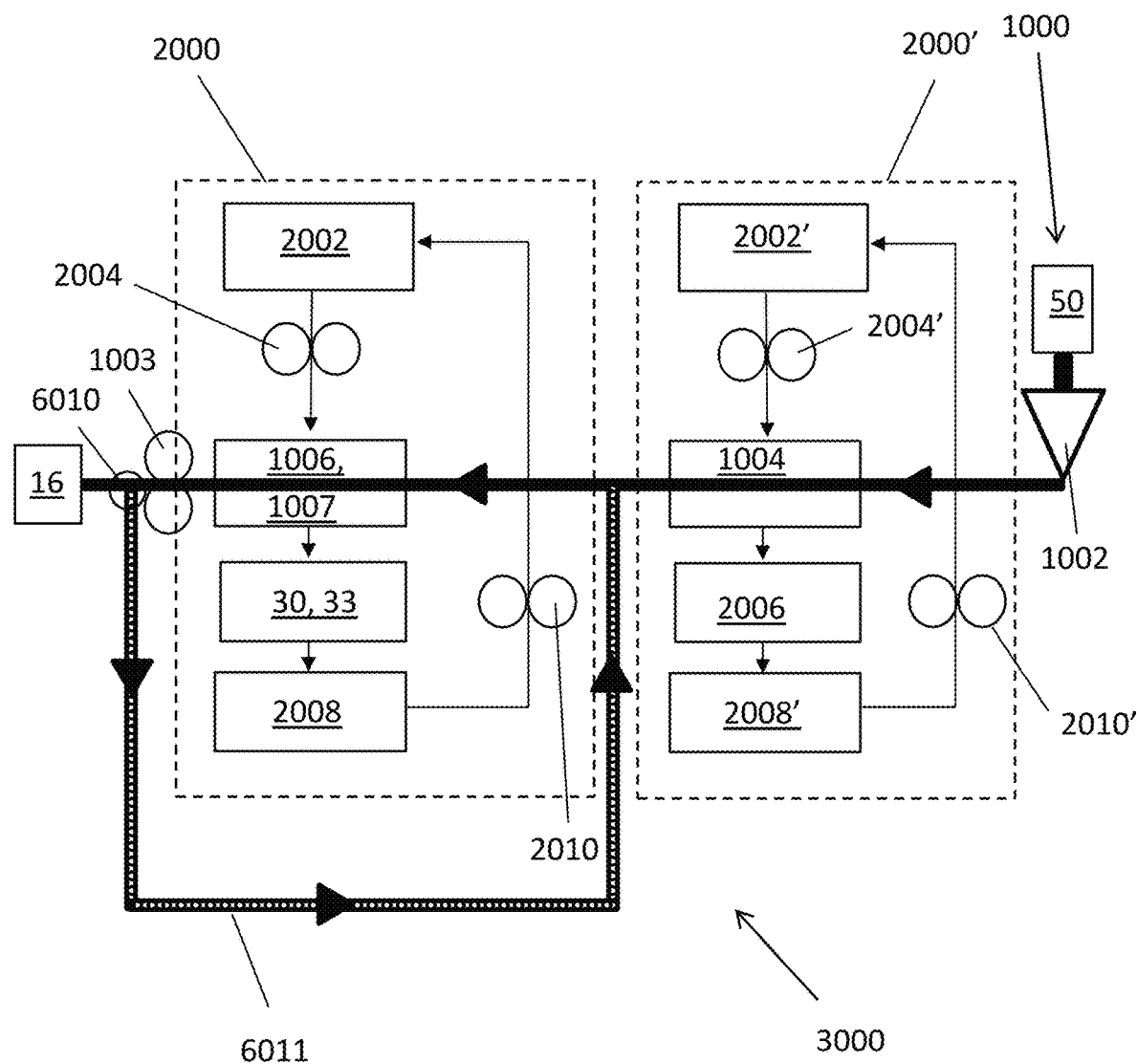
FIG. 10 is a representation of a portion of the example fuel system of FIG. 5 and the example recirculating oil system of FIGS. 7 and 8.

FIG. 6 shows an alternative example fuel system 6000, comprising a fuel supply system and fuel management system 6500 comprising a fuel flow path from the fuel tank 50 to the combustor 16 of the gas turbine engine 10 of the aircraft 1. As with fuel system 1000, fuel is pumped from the fuel tank 50 by the low pressure fuel supply pump 1002. The fuel then flows through a secondary fuel-oil heat exchanger 1004 and then a primary fuel-oil heat exchanger 1006 before reaching an engine fuel pump 1003, which pumps the fuel along its flow path to the combustor 16. Fuel system 6000 differs from fuel system 1000 in that fuel system 6000 comprises a recirculation valve 6010 located downstream of the primary fuel-oil heat exchanger 1006 and arranged to recirculate at least a portion of the fuel which has left the primary fuel-oil heat exchanger back to the inlet 1006a of the primary fuel-oil heat exchanger 1006, allowing further heat transfer between the oil of the primary loop system and the fuel. The fuel temperature sensor 1009 is located downstream of the take-off point for the recirculation valve 6010, and ideally adjacent to the combustor 16, so as to provide a more accurate indication of the temperature at the inlet to the combustor 16 (another temperature sensor may be provided between the heat exchanger outlet and the take-off point for the recirculation valve 6010 in some implementations). The recirculation valve 6010 may determine what proportion of the fuel is recirculated, via the recirculation pipe 6011, and what proportion continues more directly to the combustor 16. In the illustrated example, the recirculation valve 6010 is located downstream of the primary fuel-oil heat exchanger 1006. In the illustrated example, the recirculation valve 6010 is positioned upstream of the engine fuel pump 1003. An additional recirculation pump (not shown) may be provided in some implementations in which the recirculation valve 6010 is positioned upstream of the engine fuel pump 1003, to provide a positive pressure gradient. A fuel return to tank (FRTT) pump may be present and also assist in the recirculation in some implementations. The recirculation valve 6010 is arranged to allow a controlled amount of fuel to be returned to the inlet 1006a of the primary heat exchanger 1006, so flowing through the primary heat exchanger 1006 multiple times before reaching the pump 1003 and the combustor 16. It is envisaged that the recirculation valve could be positioned downstream of the engine fuel pump 1003 in alternative implementations, for example as shown in FIG. 10. In such implementations, the recirculation valve 6010 would be arranged to allow a controlled amount of fuel to be returned to the inlet 1006a of the primary heat exchanger 1006, so flowing through the primary heat exchanger 1006 and the pump 1003 multiple times before reaching the combustor 16. This recirculation provides a mechanism for controlling the fuel flow within the fuel management system 6500, and also within the heat management system 3000, without changing fuel flow from the tank 50 to the engine 10.

A pipe 6011, which may be referred to as a recirculation pipe as it transports fuel from one point along the main flow-path through the engine 10 to an earlier point along that flow-path so the fuel has to pass through the portion of the flow-path in between again, may therefore be provided, leading from the recirculation valve to a point on the flow-path upstream of the inlet 1006a to the primary heat exchanger 1006. In some implementations, a recirculation pipe 6011 and a bypass pipe 1005 may be provided for any given heat exchanger 1004, 1006. In some implementations, the same pipe 1005, 6011 may serve as both a recirculation pipe and a bypass pipe—one or more valves may be used to control the direction of fluid flow therethrough.

In the illustrated example of FIG. 10, unlike that of FIG. 6, the recirculation valve 6010 is located downstream of the pump 1003, such that the recirculated fuel has already passed through both the primary heat exchanger 1006 and the pump 1003, rather than just the primary heat exchanger 1006. The recirculation pipe 6011 returns the recirculated fuel to a point on the flow-path upstream of both the main pump 1003 and the primary heat exchanger 1006, such that the recirculated fuel passes through both of those components an additional time. Recirculating fuel through the pump may allow for more adjustable control of fuel flow rate to the combustor 16 for a given shaft speed of the engine 10, noting that pump speed (or a limited group of pump speed options) is often set by shaft speed.

Controlling the fuel flow in the fuel system 6000—by recirculation through and/or bypassing of one or more heat exchangers—can assist in heat management (such as influencing fuel temperature on entry to the combustor 16 or pump 1003, or amount of heat transferred to the fuel). Part of control of the heat exchange system 3000 may therefore be control of one or more valves controlling oil and/or fuel flow through one or more recirculation and/or bypass pipes 6011, 1005.

The gas turbine engine 10 of the aircraft 1 being described comprises a recirculating oil system arranged to supply oil to lubricate, and to remove heat from, a plurality of components. In the implementation being described, the recirculating oil system comprises a primary oil loop system 2000 and a secondary oil loop system 2000', each of which is a closed loop oil system. An example of a primary closed loop oil system 2000 is shown schematically in FIG. 7—as for the heat exchangers, this oil loop system is referred to as "primary" as it is responsible for oiling and cooling the main gearbox 30, and generally is responsible for the main/primary cooling load of the engine 10. The primary closed loop oil system 2000 comprises an oil tank 2002 suitable for containing a volume of oil. In some implementations, gasses are removed from oil within the oil tank 2002 by a de-aerator. A feed pump 2004 is configured to pump oil from the oil tank 2000 to the main fuel-oil heat exchanger 1006. The average temperature of the oil entering the main fuel-oil heat exchanger 1006, at cruise conditions, is higher than the average temperature of fuel entering the main fuel-oil heat exchanger 1006. In the main fuel-oil heat exchanger 1006, thermal energy is transferred from the flow of oil to the flow of fuel. In this way, the average temperature of the flow of oil leaving the main fuel-oil heat exchanger 1006 is lower than the average temperature of the flow of oil entering the main fuel-oil heat exchanger 1006, so it is cooled before re-use as a lubricant and/or coolant, allowing the cooled oil to remove more heat from the system to be lubricated and/or cooled. Also in this way, the average temperature of the fuel leaving the main fuel-oil heat exchanger 1006 is higher than the average temperature of fuel entering the main fuel-oil heat exchanger 1006.

Figure 7:
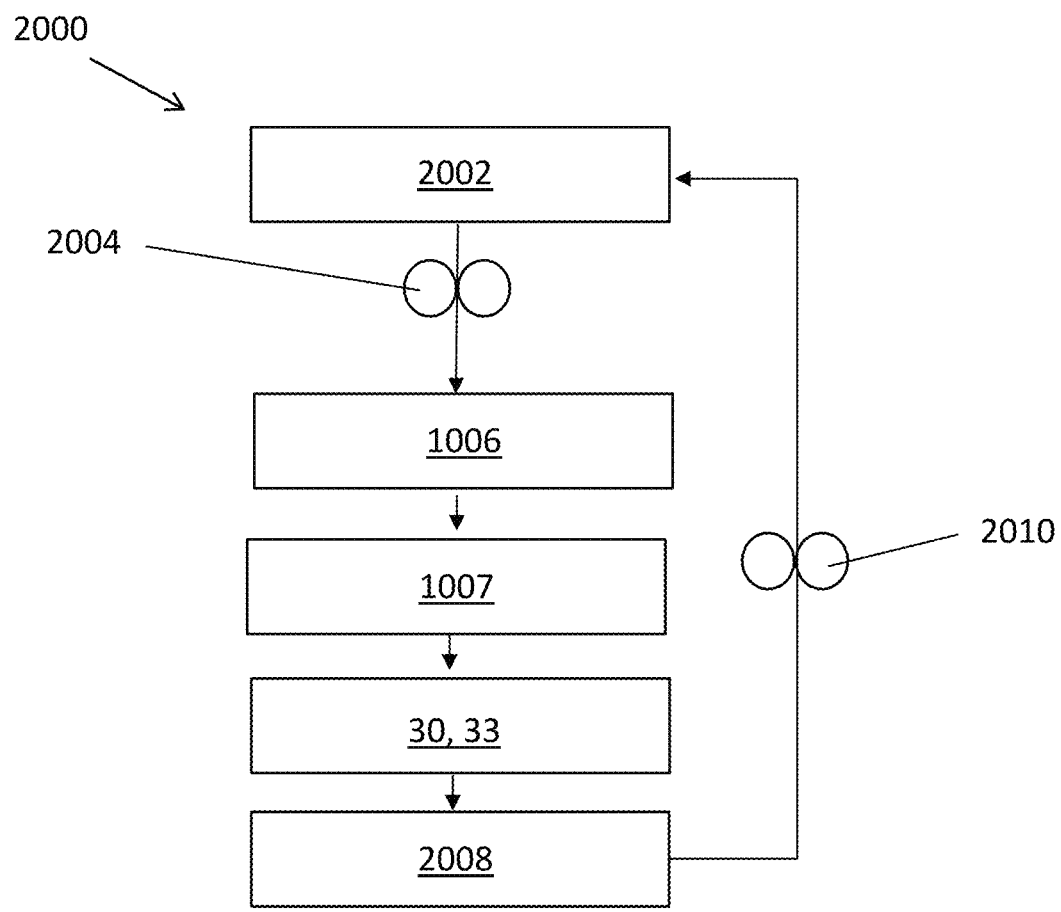
FIG. 7 is a representation of a portion of an example recirculating oil system (a primary oil loop system)

In a standard heat exchanger 1006, the fundamental limiting factor on the level of cooling provided is the temperature of the coolant (in this case, the fuel)—the oil's temperature on leaving the heat exchanger 1006 cannot be lowered below the temperature of the fuel entering the heat exchanger 1006 (and nor can the fuel's temperature be raised higher than that of the oil entering the heat exchanger) even if an effectively infinite flow rate of fuel or oil were used. Equilibration of temperatures is the limit, as defined in the second law of thermodynamics. In some implementations, as illustrated in FIG. 7, a refrigeration cycle apparatus 1007 is therefore provided. The refrigeration cycle apparatus 1007 is arranged to provide thermal lift by transferring further heat from the oil to the fuel such that the fuel temperature is raised by more than it would be on simply passing through the heat exchanger, and in some cases to above the oil temperature. The refrigeration cycle apparatus 1007 may take the form of an additional closed-loop circuit with a refrigerant fluid, with an evaporator between oil and the refrigerant (to transfer heat from the oil to the refrigerant) and a condenser between fuel and refrigerant (to transfer heat from the refrigerant to the fuel. The refrigeration cycle apparatus 1007 may additionally comprise a pump, a compressor, and/or an expansion valve/meter, and may be made to any suitable design known in the art. It will be appreciated that the refrigeration cycle apparatus 1007 may also be referred to as a heat pump—it pumps heat from the oil to the fuel, so cooling the oil and heating the fuel.

Figure 18:
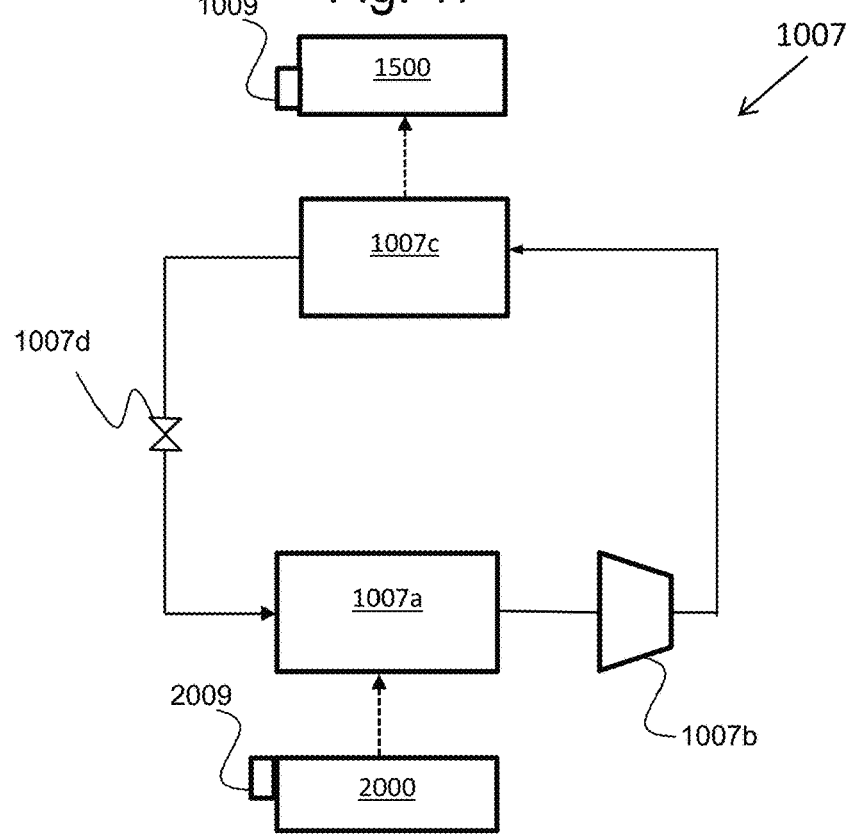
FIG. 18 illustrates a refrigeration cycle apparatus incorporated into a gas turbine engine.

FIG. 18 shows an example refrigeration cycle apparatus 1007 in more detail. The refrigeration cycle apparatus 1007 pictured contains a refrigerant fluid, which is circulated through the apparatus 1007 in use. In the implementation being described, the flow rate of the refrigerant can be adjusted to vary the amount of heat transferred, and the refrigeration cycle apparatus 1007 may be turned off by stopping refrigerant flow. In other implementations, the refrigeration cycle apparatus 1007 may have a single operation speed, and controlling it may simply consist of turning the refrigeration cycle apparatus 1007 on and off. The refrigerant fluid may be 1,1,1,2-tetrafluoroethane (known commercially as refrigerant R134a), although other refrigerant fluids can be used.

During operation, heat from the oil in the oil loop system 2000 is transferred to the refrigerant fluid in an evaporator 1007a—the evaporator 1007a evaporates liquid in the refrigerant fluid (the refrigerant fluid may be a liquid-gas mixture or may be a pure liquid at this point in the refrigeration cycle) to form a vapour, and in particular a saturated vapour. The evaporator 1007a is located on the oil loop system 2000, at or near where the oil is hottest-generally immediately after the last engine component to be cooled by the oil on a single pass around the oil loop system 2000 (this may be the gearbox 30). One or more thermally-conductive plates may be provided between the oil and the refrigerant (generally as part of the evaporator 1007a) to increase heat transfer; optionally, internal passages for oil and/or refrigerant flow may be provided within a heat-conductive plate or other structure to improve heat transfer.

From the evaporator 1007a, the saturated vapour is then passed to a refrigerant compressor 1007b. The refrigerant compressor 1007b may also function as a pump, circulating the refrigerant around the refrigeration cycle apparatus 1007. Control of the compressor 1007b may therefore be used to reduce, increase, or stop the flow of refrigerant around the apparatus 1007. Advantageously, the refrigeration cycle apparatus 1007 can therefore meet a variable oil cooling/fuel heating demand due to the ability to modulate the cooling flow rate using the refrigerant compressor 1007b. A separate/additional pump for the refrigeration cycle apparatus 1007 may be provided in some implementations, but using the compressor 1007b to circulate the refrigerant may reduce the number of required components, and hence apparatus 1007 size and weight.

The compressor 1007b compresses the saturated vapour to a superheated vapour and sends it to a condenser 1007c, which functions as a refrigerant-fuel heat exchanger 1007c. The condenser 1007c transfers heat from the compressed vapour to the fuel (in the fuel management system 1500), condensing at least some of the superheated vapour to a liquid. In general, the condenser 1007c may convert the compressed vapour refrigerant to a saturated liquid. The condenser 1007c is located on the fuel pathway 1500 through the engine 10, downstream of any or all fuel-oil heat exchangers 1004, 1006—generally near the combustor 16. The condenser 1007c may be the last engine component though which the fuel flows before reaching the combustor 16 (not counting pipes/fuel flow passageways). The condenser 1007c may be the furthest downstream component of the heat exchange system 3000 with respect to fuel flow.

The refrigeration cycle apparatus 1007 of the implementation pictured in FIG. 18 further comprises an expansion valve 1007d located between the condenser 1007c and the evaporator 1007a. The expansion valve 1007d is arranged to allow the refrigerant to expand, so cooling the refrigerant. For example, the action of the expansion valve 1007d may convert the saturated liquid to a reduced-temperature liquid and vapour mixture. The expanded/cooled refrigerant is then returned to the evaporator 1007a, ready to receive more heat from the oil.

The refrigeration cycle apparatus 1007 may further include a refrigerant reservoir (not shown) in some implementations. Such a refrigerant reservoir may serve to compensate for any volumetric changes of the refrigerant due to temperature and density changes such that the refrigerant flow can perform its cooling/heat pumping function reliably and consistently during all engine operation conditions.

In the implementations shown in the figures, the engine 10 comprises a gearbox 30 that receives an input from the core shaft 26 and outputs drive to the fan 23 so as to drive the fan at a lower rotational speed than the core shaft, and the oil loop system 2000 is arranged to supply oil to the gearbox 30. However, it will be appreciated that the implementation shown in FIG. 18 does not require the oil loop system 2000 to comprise a gearbox 30, and that the same refrigeration cycle apparatus 1007, and control thereof, may be implemented in a direct drive engine (with no gearbox for the main shaft).

FIG. 18 illustrates the connection of the refrigeration cycle apparatus 1007 to both the oil system 2000 and the fuel system 1500 within the engine 10. The refrigerant acts as an intermediate heat transfer fluid, pumping heat from the oil to the fuel. Heat is transferred from the oil system 2000 to the refrigerant in the evaporator 1007a, and that heat is then transferred from the refrigerant to the fuel system 1500 in the condenser 1007c. FIG. 18 also schematically indicates two temperature sensors—an oil temperature sensor 2009 arranged to provide an indication of the maximum temperature of oil within the oil loop system 2000, and a fuel temperature sensor 1009 arranged to provide an indication of the temperature of the fuel downstream of the refrigeration cycle apparatus 1007/on approach to the combustor 16. Data from these sensors 1009, 2009 may be used in controlling the refrigeration cycle apparatus 1007—for example in controlling one or more of refrigerant flow rate, oil flow rate, and fuel flow rate through the relevant part(s) of the refrigeration cycle apparatus 1007.

An oil valve may control how much oil flows through the refrigeration cycle apparatus 1007 (and in particular, through the evaporator 1007a), and a fuel valve may control how much fuel flows through the refrigeration cycle apparatus 1007 (and in particular, through the condenser 1007c). The refrigeration cycle apparatus 1007 is powered, generally electrically or mechanically (e.g. via a linkage to a rotating shaft), to provide this further, forced, heat transfer. The refrigeration cycle apparatus 1007 is shown in association with the main (primary) fuel-oil heat exchanger 1006 in the implementation pictured, so providing a boost to the fuel temperature after the fuel has passed through both fuel-oil heat exchangers 1004, 1006, and providing further cooling the oil of the primary oil system 2000 before it is returned to the gearbox 30. A bypass or recirculation pipe for the oil and/or for the fuel may be provided around the refrigeration cycle apparatus 1007 in various implementations.

The flow of oil in the primary oil loop system 2000 is then conveyed to a power gearbox 30, which may also be described as a main gearbox 30 of the gas turbine engine 10. The power gearbox 30 is arranged to receive an input from the core shaft 26 and to output drive to the fan 23 via the fan shaft 42 and comprises gears 28, 32, 38 and bearings (e.g. journal bearings) which may be lubricated and cooled by the oil. The engine 10 may also comprise one or more additional bearings to support the shafts 26, 42, which may be journal bearings. The oil may additionally be used to lubricate and/or cool the journal bearings, and generally increases in temperature significantly in use at cruise conditions, so assisting with cooling the bearings and gearbox 30 as the flow of oil transports heat away from the bearings and gearbox 30. The oil may also be used to lubricate one or more further engine components 33, e.g. an auxiliary gearbox (AGB) and/or one or more bearing chambers. The AGB 33, also known as an accessory drive, where present, is a gearbox that forms part of the gas turbine engine 10, although is not a part of the engine's core 11 and does not drive the fan 23. The AGB instead drives the engine accessories, e.g. fuel pumps, and generally handles large loads. A relatively large amount of heat may therefore be dumped into the oil from the AGB. One or more bearing chambers may be lubricated by the same oil, and may similarly dump heat into the oil. Per unit of oil flowing therethrough, the AGB and bearing chambers may add more heat to the oil than the main gearbox 30 does in many implementations. The flow of oil may be split into two or more parallel flows, for example one flow through the main gearbox 30 and one flow through the other engine components, or multiple parallel flows through the main gearbox 30 (e.g. via different components of the gearbox) and separate flows through the AGB and the or each bearing chamber 33.

From the power gearbox 30 (and/or other engine components 33 such as the AGB, where present), the oil collects in a sump 2008. A scavenge pump 2010 is configured to pump oil from the sump 2008 back into the oil tank 2002, ready for re-use.

Figure 8:
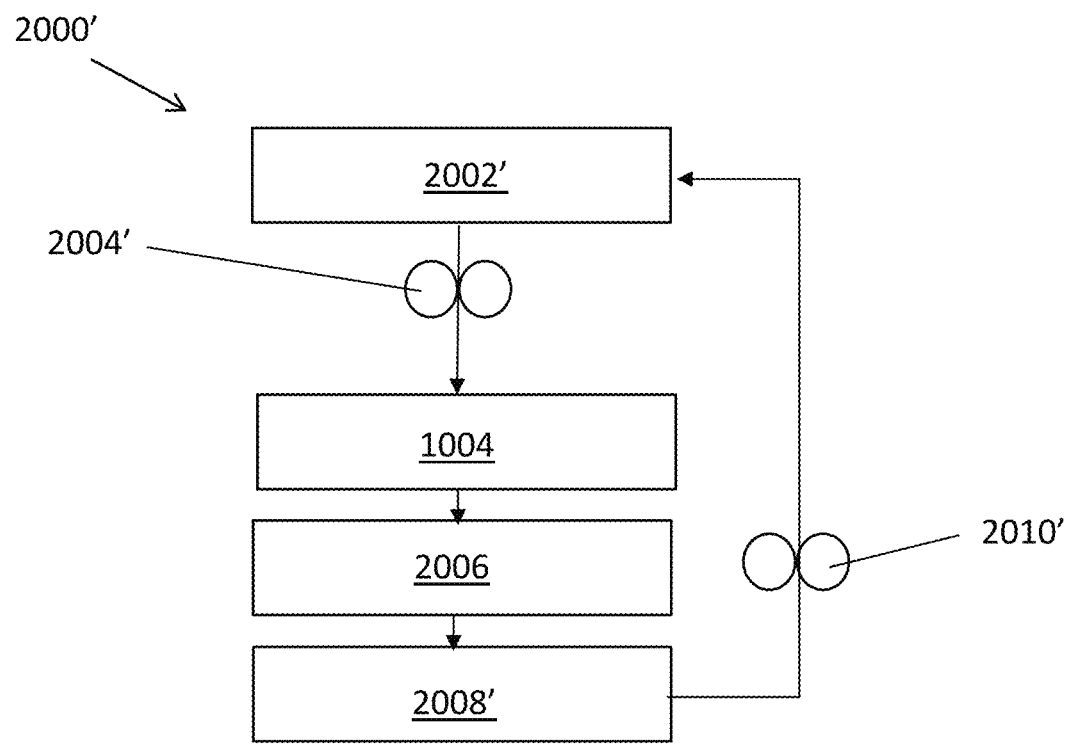
FIG. 8 is a representation of a further portion of an example recirculating oil system (a secondary oil loop system)

FIG. 8 illustrates the secondary oil loop system 2000', which is another closed loop oil system 2000'. The secondary closed loop oil system 2000' comprises a secondary oil tank 2002' suitable for containing a volume of oil. In some implementations, gasses are removed from oil within the oil tank 2002' by a de-aerator. A secondary feed pump 2004' is configured to pump oil from the secondary oil tank 2002' to the secondary fuel-oil heat exchanger 1004, which in the implementation shown is the IDG fuel-oil heat exchanger 1004. The average temperature of the oil entering the IDG fuel-oil heat exchanger 1004, at cruise conditions, is higher than the average temperature of fuel entering the IDG fuel-oil heat exchanger 1004. In the IDG fuel-oil heat exchanger 1004, thermal energy is transferred from the flow of oil to the flow of fuel. In this way, the average temperature of the flow of oil leaving the IDG fuel-oil heat exchanger 1004 is lower than the average temperature of the flow of oil entering the IDG fuel-oil heat exchanger 1004. Also in this way, the average temperature of the fuel leaving the IDG fuel-oil heat exchanger 1004 is higher than the average temperature of fuel entering the IDG fuel-oil heat exchanger 1004. The flow of oil is then conveyed to/back to an integrated drive generator 2006, where it lubricates and/or cools moving components and is heated up in the process. In some implementations, the oil may be used primarily as a coolant for the IDG 2006, and may do minimal or no lubrication. From the integrated drive generator 2006, the oil collects in a secondary sump 2008'. A secondary scavenge pump 2010' is configured to pump oil from the secondary sump 2008' back into the secondary oil tank 2002', ready for re-use. In some implementations, a refrigeration cycle apparatus may also be provided on the secondary oil loop system 2000'.

FIGS. 7 and 8 each illustrate a series flow path of oil, with all of the flow of oil passing sequentially through each component (although it will be appreciated that one or more unshown bypass pipes or recirculation pipes may be provided for the oil). In other implementations, the flow of oil may be split into two or more parallel flows, for example one flow through the main fuel-oil heat exchanger 1006 and one flow through an air-oil heat exchanger 2020 (as described below). It will be appreciated that whilst a bypass pipe technically provides a parallel arrangement, alternative, flow path, a branching path as described here with reference to parallel flows is different in that each branching route of the parallel arrangement comprises a heat exchanger, whereas the bypass pipe is simply a pipe with no (significant) heat exchange.

Figure 9:
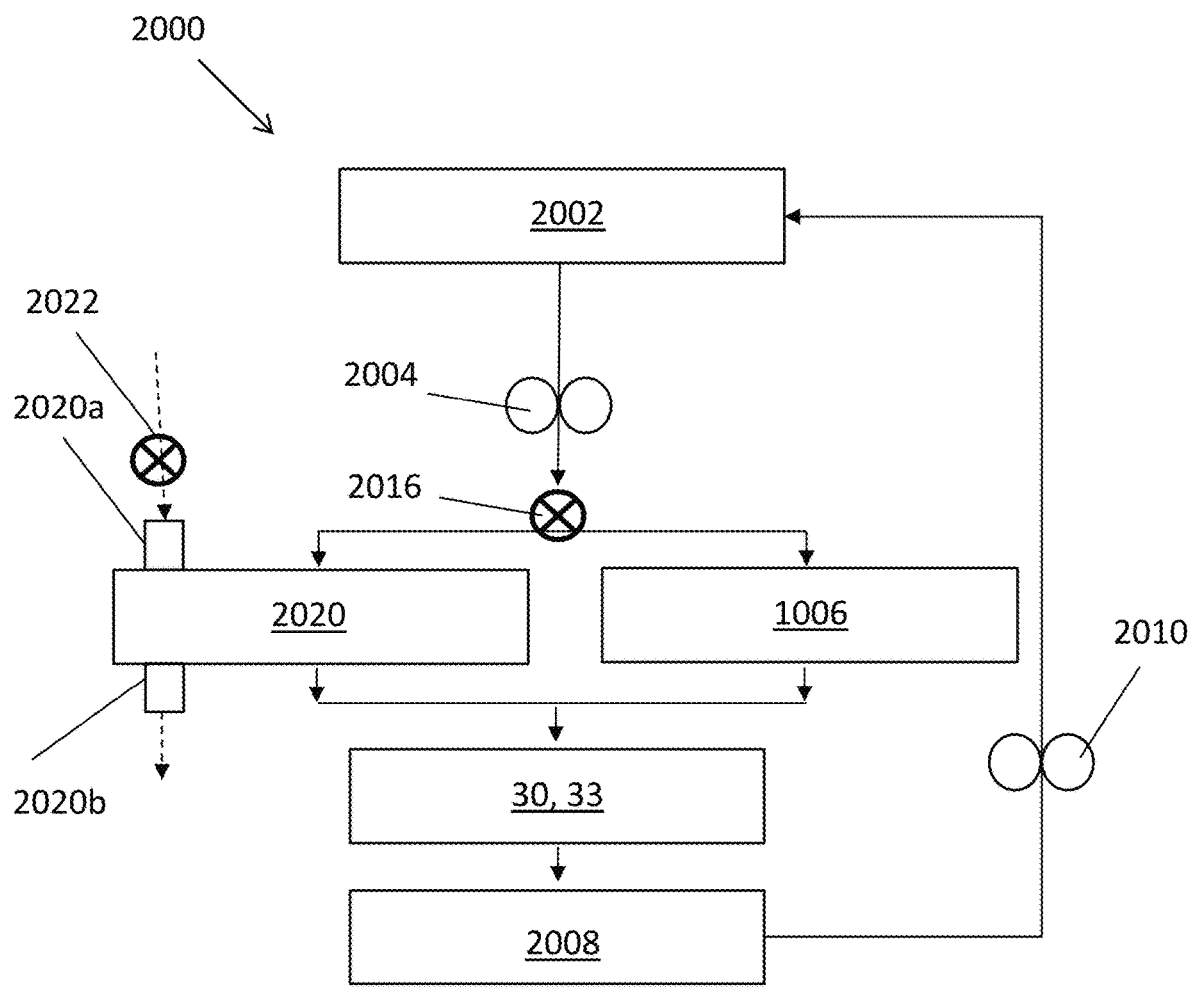
FIG. 9 is a representation of a portion of an alternative example recirculating oil system, also showing features of the air-oil heat exchanger.

FIG. 9 shows schematically an alternative example section of the primary closed loop oil system 2000 shown in FIG. 7. In this section a flow of oil is pumped by the feed pump 2004 through a valve 2016. The valve 2016 is operable to split the flow of oil between the main fuel-oil heat exchanger 1006 and a first air-oil heat exchanger 2020, where the first air-oil heat exchanger 2020 is arranged in parallel with the main fuel-oil heat exchanger 1006. The oil flow path may be described as branching, with the main fuel-oil heat exchanger 1006 on one branch and the first air-oil heat exchanger 2020 on the other branch, in a parallel configuration such that oil can flow via one branch or the other, but the same portion of oil cannot pass through both on the same cycle—the flow splits. The valve 2016 modulates the flow through the two heat exchangers 1006, 2020, and may therefore be described as a modulation valve 2016. The flows of oil are then recombined and conveyed to the power gearbox 30 and/or other engine components 33.

Any suitable percentage of oil may flow through each of the first air-oil heat exchanger 2020 and the main fuel-oil heat exchanger 1006. In some examples, the valve 2016 is operable to vary the flow of oil to the main fuel-oil heat exchanger 1006 and the first air-oil heat exchanger 2020 on demand. In various examples, an oil-oil heat exchanger 2030 (not shown in FIG. 7 but present in FIG. 11) may be provided, for example being arranged in series with the first air-oil heat exchanger 2020 on that branch of the parallel split. The oil-oil heat exchanger 2030 may allow for heat exchange between the primary and secondary closed loop oil systems 2000, 2000'.

FIG. 9 also illustrates details of the air-oil heat exchanger 2020 which are not shown in other figures for clarity, in particular indicating airflow with dashed arrows. The air-oil heat exchanger 2020 has an air inlet 2020a and an air outlet 2020b. The air inlet, or intake, 2020a may be arranged to capture air in the engine's bypass duct 22, downstream from an outlet guide vane of the fan 23. The heat exchanger exhaust/air outlet 2020b may be arranged to output air back into the bypass duct 22, downstream of the inlet 2020a, or directly to the external atmosphere (e.g. if provided with a dedicated outlet nozzle).

A valve 2022, referred to as an air valve, is used to control the flow rate of air through the air-oil heat exchanger 2020. In the example pictured, the air valve 2022 is provided at or near the inlet 2020a to the heat exchanger 2020, and may therefore be referred to as an air inlet valve 2022. In other implementations, the air valve 2022 may be provided at or near the outlet 2020b from the heat exchanger 2020, and may therefore be referred to as an air outlet valve. Any suitable position for the valve 2022 may be selected, provided that the valve 2022 can be adjusted to control airflow through the air-oil heat exchanger 2020. In the example being described, the air valve 2022 is continuously adjustable between a fully-closed position (no air flow through the heat exchanger) and a fully-open position (maximum air flow through the heat exchanger). In other examples, the air valve 2022 may be adjustable between a plurality of discrete positions rather than being continuously adjustable—for example, six, five, four, three, or two different positions. In implementations with only two valve positions for the air valve 2022, these positions may be "open" and "closed"—the valve 2022 may be repeatedly opened and closed to provide a pulsing airflow when an intermediate level of cooling is desired in some such implementations.

FIG. 10 shows an example arrangement and interaction of the first closed loop oil system 2000, second closed loop oil system 2000', and fuel system 1000, with fuel flow shown in thick black lines and oil flow in thinner black lines. The striped thick black line indicates a recirculation path 6011 taken by only a portion of the fuel. The combination of parts of the fuel 1000 and oil 2000, 2000' systems together form the heat exchange system 3000. The primary closed loop oil system 2000 of this example arrangement is arranged as shown in FIG. 7. The secondary closed loop oil system 2000' of this example arrangement is arranged as shown in FIG. 8. The fuel system 1000 of this example arrangement is arranged as shown in FIG. 5, but with an additional recirculation valve 6010 and pipe 6011 as described above. One or more bypass pipes 1005, 2005 may also be present, but are not shown for clarity.

In use, fuel is pumped from the fuel tank 50 by the low pressure fuel pump 1002. The fuel then flows through the secondary fuel-oil heat exchanger 1004. The secondary closed loop oil system 2000' is configured such that its recirculating flow of oil also flows through the secondary fuel-oil heat exchanger 1004. In standard operation of the engine 10, both at cruise conditions and at idle, the average temperature of the flow of oil entering the secondary fuel-oil heat exchanger 1004 is higher than the average temperature of the flow of fuel entering the secondary fuel-oil heat exchanger 1004. The secondary fuel-oil heat exchanger 1004 is configured such that heat is transferred from the flow of oil to the flow of fuel. In this way, the average temperature of the flow of oil on exit from the secondary fuel-oil heat exchanger 1004 is lower than the average temperature of the flow of oil on entry to the secondary fuel-oil heat exchanger 1004. In the same way, the average temperature of the flow of fuel on exit from the secondary fuel-oil heat exchanger 1004 is higher than the average temperature of the flow of fuel on entry to the secondary fuel-oil heat exchanger 1004.

The fuel then flows through the main fuel-oil heat exchanger 1006, and additionally through the refrigeration cycle apparatus 1007. The primary closed loop oil system 2000 is configured such that its recirculating flow of oil also flows through the main fuel-oil heat exchanger 1006 and the refrigeration cycle apparatus 1007. In standard operation of the engine 10, both at cruise conditions and at idle, the average temperature of the flow of oil entering the main fuel-oil heat exchanger 1006 is higher than the average temperature of the flow of fuel entering the main fuel-oil heat exchanger 1006. The main fuel-oil heat exchanger 1006 is configured such that heat is transferred from the flow of oil to the flow of fuel. In this way, the average temperature of the flow of oil on exit from the main fuel-oil heat exchanger 1006 is lower than the average temperature of the flow of oil on entry to the main fuel-oil heat exchanger 1006. In the same way, the average temperature of the flow of fuel on exit from the main fuel-oil heat exchanger 1006 is higher than the average temperature on entry from the main fuel-oil heat exchanger 1006.

The refrigeration cycle apparatus 1007, when active (i.e. when powered/turned on and in use to actively move heat from the oil to the fuel), may provide a further boost to the fuel temperature/further drop in the oil temperature, optionally raising the fuel to above the oil temperature. After flowing through the main fuel-oil heat exchanger 1006, the fuel flows to the engine fuel pump 1003, which is located downstream of the primary and secondary fuel-oil heat exchangers 1006, 1004 in the examples shown and is arranged to deliver fuel to the combustor 16 of the gas turbine engine 10.

At cruise conditions, the average temperature of the flow of oil flowing through the secondary fuel-oil heat exchanger 1004 may be lower than the average temperature of the flow of oil flowing through the main fuel-oil heat exchanger 1006. In this way, the fuel passes through the heat exchanger 1004 having a lower average oil flow temperature first, before passing through the heat exchanger 1006 having a higher average oil flow temperature.

In addition to the branching oil flows 2000, 2000', the heat exchange system 3000 may further comprise branching fuel return pathways 6020, such that fuel is returned to the main fuel path from where fuel enters the gas turbine engine 10 to the combustor 16 in at least two different places—for example upstream of, or downstream of, the main engine pump 1003, as shown in FIG. 6 with a branching path 6020 splitting off the main fuel flow pathway at the exit 1006b from the primary heat exchanger 1006 and re-joining the main fuel flow pathway downstream of the pump 1003. At least one valve (not shown) may be provided to control a split of fuel flow from the heat exchanger 1006 back to the main fuel pathway through the engine 10. The valve may be controlled based on fuel temperature—for example to send less of the fuel via the pump 1003/more fuel to a position downstream of the pump if the fuel temperature is relatively high and more likely to degrade the pump seals or other components. Control of fuel flow through the branching fuel return pathways may be based on fuel temperature measurement (e.g. using a temperature sensor at a location downstream of the heat exchanger 1006 and fuel, potentially also using a temperature measurement upstream of fuel-oil heat exchanger). A return of the recirculated fuel upstream of the fuel-oil heat exchanger 1006 may allow for a reduced heat transfer from the oil to fuel hence damping a transient overshoot that might otherwise occur at the beginning of the descent phase, for example, where for the same amount of heat is generated within the oil system, but fuel flow is reduced, so typically resulting in a temperature spike.

Figure 11:
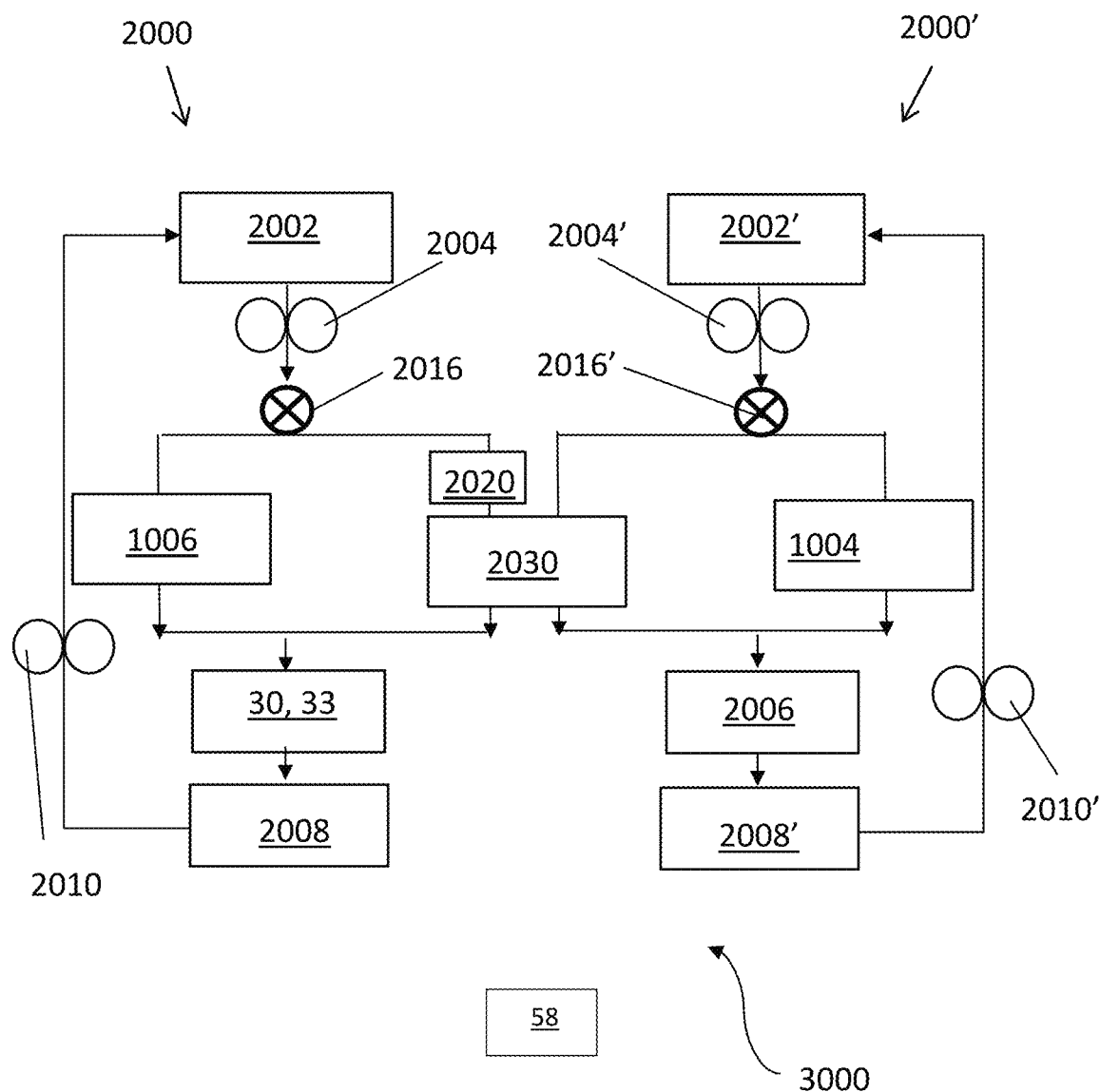
FIG. 11 is a representation of a further alternative example recirculating oil system, illustrating all the main components of a heat exchange system.

FIG. 11 shows schematically an example configuration of the primary closed loop oil system 2000 and the secondary closed loop oil system 2000' where the two independent recirculating flows of oil are brought into a heat exchange relationship through an oil-oil heat exchanger 2030. Both oil loop systems 2000, 2000' have a branched arrangement of parallel pipes/heat exchangers in this example.

In the example shown in FIG. 11, the primary closed loop oil system 2000 is configured such that the recirculating flow of oil is pumped by the feed pump 2004 through a valve 2016, which may be referred to as a modulation valve. The valve 2016 is operable to split the flow of oil such that a portion of the flow of oil goes to each of the main fuel-oil heat exchanger 1006 and a first air-oil heat exchanger 2020. The valve 2016 may be controllable to adjust the proportion of oil sent via each heat exchanger. In the implementation shown, the first air-oil heat exchanger 2020 is in series with the oil-oil heat exchanger 2030, and the air-oil 2020 and oil-oil heat exchanger 2030 arrangement is in parallel with the main fuel-oil heat exchanger 1006. The modulation valve 2016 determines what proportion of the oil travels through each branch of the parallel arrangement. In various implementations, any suitable portion of the flow of oil may be diverted between the main fuel-oil heat exchanger 1006 and the first air-oil heat exchanger 2020. In some examples, the valve 2016 is operable to divert a fixed portion of the flow of oil to each of the main fuel-oil heat exchanger 1006 and the first air-oil heat exchanger 2020. In other examples, the valve 2016 is operable to divert a variable portion of the flow of oil to each of the main fuel-oil heat exchanger 1006 and the first air-oil heat exchanger 2020, for example using data from a temperature sensor for feedback to control the variable portion, and/or based on one or more fuel characteristics, as described below. The valve 2016 may be adjustable between a discrete number of set positions, or continuously adjustable. In some implementations, for example where the fuel temperature on entry to the combustor 16 is relatively low compared to the fuel's maximum operational temperature (e.g. based on knowledge of the fuel's type, or thermal stability), no oil may be sent to the air-oil heat exchanger 2020, and all oil may be sent via the fuel-oil heat exchanger 1006.

After flowing through the heat exchangers 1006, 2020, 2030, the flow of oil in the primary closed loop system 2000 is then recombined and conveyed to the power gearbox 30 (and/or other engine components 33 such as the AGB) and then to the sump 2008. The scavenge pump 2010 then pumps the oil from the sump 2008 to the oil tank 2002, for re-use.

The flow of oil within the secondary closed loop oil system 2000' is arranged to be brought into a heat exchange relationship with the separate flow of oil within the primary closed loop oil system 2000 through the oil-oil heat exchanger 2030. In the oil-oil heat exchanger 2030 the flow of oil within the primary closed loop oil system 2000 does not mix with the flow of oil within the secondary closed loop oil system 2000'. The oil-oil heat exchanger 2030 is configured such that a transfer of heat may take place between the two separated flows of oil. In this way, heat from a hotter flow of oil may be transferred to the cooler flow of oil within the oil-oil heat exchanger 2030. No air-oil heat exchanger is shown in the pictured secondary closed loop oil system 2000', but an air-oil heat exchanger may be provided—e.g. in series with the oil-oil heat exchanger 2030 or on a third parallel branch—in other examples.

In the implementation shown in FIG. 11, the secondary closed loop oil system 2000' is configured such that the recirculating flow of oil is pumped by the secondary feed pump 2004' through a valve 2016', which may be referred to as a secondary modulation valve. The valve 2016' is operable to divert at least a portion of the flow of oil between the IDG fuel-oil heat exchanger 1004 and the oil-oil heat exchanger 2030, where the oil-oil heat exchanger 2030 is arranged in parallel with the IDG fuel-oil heat exchanger 1004. In other implementations, the secondary closed loop oil system 2000' may not have a branched configuration. For example, the IDG fuel-oil heat exchanger 1004 and the oil-oil heat exchanger 2030 may be arranged in series such that at least a majority of the oil passing through one also passes through the other in a given cycle.

In other implementations, an air-oil heat exchanger 2020 may be present on each closed-loop system, or only on the secondary closed loop system, and/or no oil-oil heat exchanger may be present.

In examples, any suitable portion of the flow of oil may be diverted between the IDG fuel-oil heat exchanger 1004 and the oil-oil heat exchanger 2030. In examples, the valve 2016' is operable to divert a fixed portion of the flow of oil to each of the IDG fuel-oil heat exchanger 1004 and the oil-oil heat exchanger 2030. In examples, the valve 2016' is operable to divert a variable portion of the flow of oil to each of the IDG fuel-oil heat exchanger 1004 and the oil-oil heat exchanger 2030. The valve 2016' may be adjustable between a discrete number of set positions, or continuously adjustable. After flowing through the heat exchangers 1004, 2030, the flow of oil is then conveyed to the integrated drive generator 2006 and then to the secondary sump 2008'. The secondary scavenge pump 2010' then pumps the oil from the secondary sump 2008' to the secondary oil tank 2002', for re-use.

One or more temperature sensors 1009 may be provided, for example arranged to sense fuel temperature on approach to the fuel pump 1003 or the combustor 16. Data from the one or more sensors, optionally in combination with other data (e.g. fuel characteristics as described above) may be used by a controller 58 of the heat exchange system 3000 to manage fuel and/or oil flows through and around the heat exchangers 1004, 1006, 2020, 2030, and/or to manage air flow through the air-oil heat exchanger 2020. The controller 58 may be a part of, or provided by, an EEC, or may be a separate unit. The control may be automated, for example by an EEC.

Figure 16:
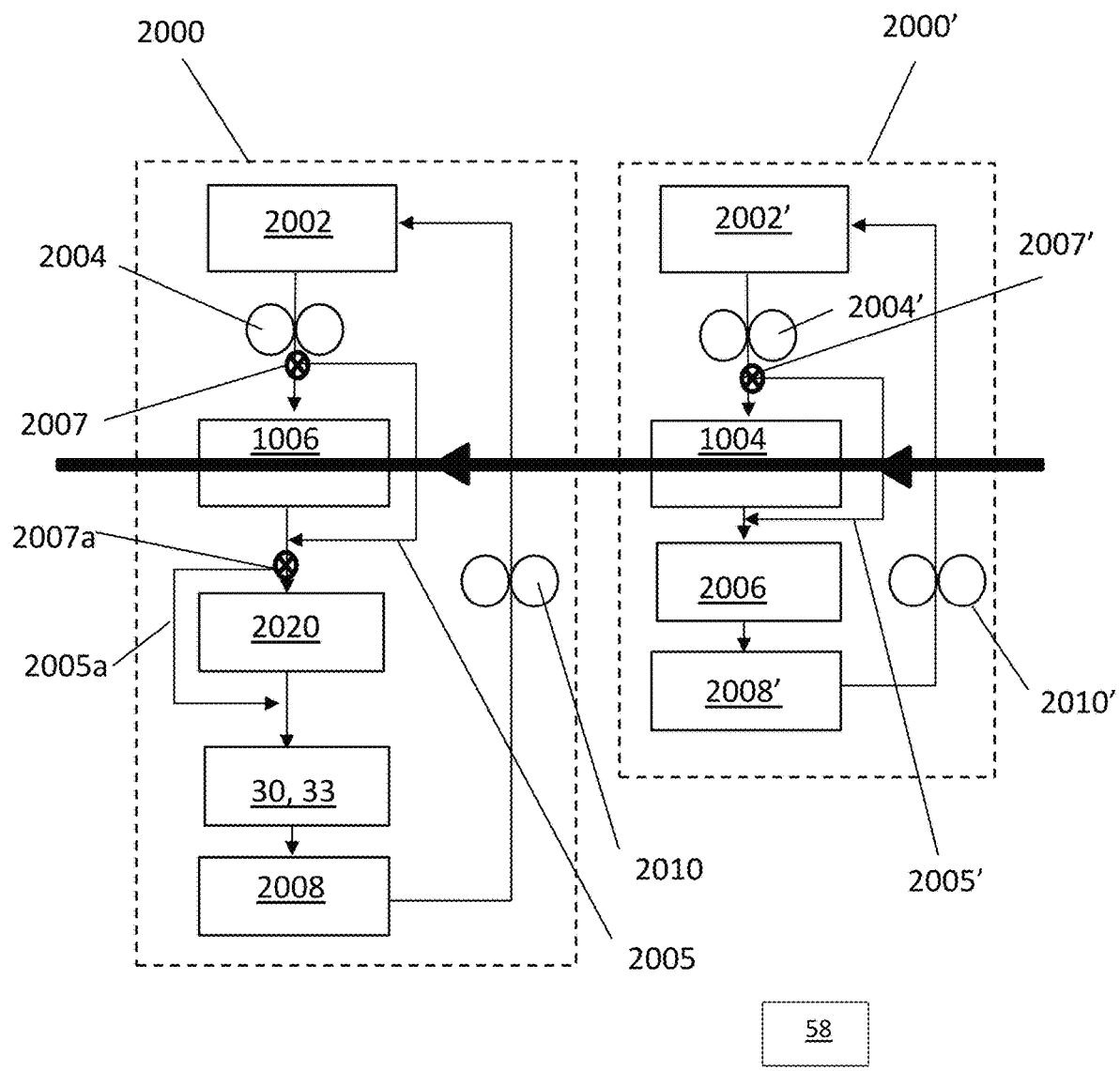
FIG. 16 illustrates a further example of as recirculating oil system for a gas turbine engine.

FIG. 16 shows a recirculating oil system comprising two loops 2000, 2000' but without heat exchangers arranged on parallel branches of either oil system, as is shown in FIG. 11. Instead, each oil loop 2000, 2000' provides a series main oil flow pathway through all heat exchangers in that loop. To adjust oil flow through the heat exchangers, one or more bypass pipes 2005, 2005', 2005a are provided instead of branching paths to different heat exchangers. It will be appreciated that a combination of parallel arrangements of heat exchangers and bypass pipes may be used in some implementations, and that FIG. 11 (both loops have parallel branches, no bypass pipes) and FIG. 16 (all heat exchangers in parallel, multiple bypass pipes) can be thought of as showing two different ends of a design spectrum.

In the example pictured in FIG. 16, fuel flow is shown with a thick black line to provide context for how the fuel and oil systems interact. The primary oil loop system 2000 pictured in FIG. 16 provides a series oil flow pathway from a tank 2002, through an oil pump 2004, onwards through the primary fuel-oil heat exchanger 1006 and then the air-oil heat exchanger 2020, before entering the gearbox 30 (and optionally also other components to be cooled and lubricated), and then being collected in a sump 2008 and then pumped back to the tank 2002 by oil pump 2010. The two heat exchangers 1006, 2020 are therefore in a series arrangement. The order of the two heat exchangers 1006, 2020 may be reversed such that the fuel-oil heat exchanger 1006 is after the air-oil heat exchanger 2020 in alternative implementations.

The primary oil loop system 2000 pictured in FIG. 16 comprises two oil bypass pipes 2005, 2005a. The first bypass pipe 2005 is arranged to allow a portion of the oil to bypass the fuel-oil heat exchanger 1006, and is controlled by a first bypass valve 2007. The first bypass pipe 2005 takes oil from upstream of the inlet to the primary heat exchanger 1006, and returns it to the main oil flow pathway before the air-oil heat exchanger 2020. The second bypass pipe 2005a is arranged to allow a portion of the oil to bypass the air-oil heat exchanger 2020, and is controlled by a second bypass valve 2007a. The second bypass pipe 2005a takes oil from upstream of the inlet to the air-oil heat exchanger 2020, and returns it to the main oil flow pathway before the path reaches the gearbox 30 (and optionally also other components to be cooled and lubricated). In implementations of the primary oil loop system 2000 with only one oil bypass pipe 2005a, the position chosen may be that of the second bypass pipe 2005a, such that there is a bypass for the air-oil heat exchanger 2020 and not for the fuel-oil heat exchanger 1006. This may facilitate sinking as much heat as safely possible from the oil into the fuel, and keeping the thermal efficiency of the engine high by reducing heat loss to the environment. In implementations with the air-oil heat exchanger 2020 before the fuel-oil heat exchanger 1006, oil flow rate through the air-oil heat exchanger 2020 may be adjusted so as to provide a suitable oil temperature for the fuel-oil heat exchanger 1006. Having a bypass pipe 2005 on the fuel-oil heat exchanger 1006 may facilitate rapid adjustment of the oil flow ratio if there is a risk of this dropping lower than desired (for example, depending on determined fuel characteristics, a lower limit for the ratio significantly above zero may be set).

Set temperature limits may be strict for some fuels (and indeed for some oils), depending on their characteristics, so rapid adjustment of flow rates may be needed to keep temperatures within desired bounds. Having a bypass pipe 2005, 2005a on both heat exchangers 1006, 2020 may protect the oil from getting too cold under certain conditions, to avoid a risk of excessive congealing of oil—it will be appreciated that this may be more of a concern at start-up or ground idle on a cold day than at cruise.

The secondary oil loop system 2000' pictured in FIG. 16 comprises a single heat exchanger 1004, which is the secondary fuel-oil heat exchanger, and a single bypass pipe 2005' arranged to allow a portion of the oil to bypass that heat exchanger 1004. In other implementations, no bypass pipe may be provided on the secondary oil loop system 2000', or more than one heat exchanger may be present (e.g. an air-oil and/or oil-oil heat exchanger in addition to the secondary fuel-oil heat exchanger 1004) and more than one bypass pipe may be provided, optionally one for each heat exchanger. A bypass valve 2007' is again provided to control oil flow through the bypass pipe 2005'.

The inventors appreciated that the use of fuels different from the traditional kerosene-based jet fuels, such as sustainable aviation fuels, may result in different fuel properties, and decisions on desired heat transfer—and correspondingly on set fluid flow rates through one or more heat exchangers—in operation may be adjusted to make use of the different fuel properties. In particular, the use of one or controllable valves to adjust oil and/or air flow, and the implementation of careful control of those valves, may allow for a method providing improved oil cooling (as the fuel may be able to take more heat) and may also improve the overall thermal efficiency of the engine, with less heat being lost to the surroundings, whilst still ensuring safe operation. The controllable heat exchange system 3000, and in particular one or more controllable valves 2016, 2022, 2007, 2007', 2007a, have a key role to play in managing fluid flow, and thereby heat transfer, in such engines 10.

Figure 12:
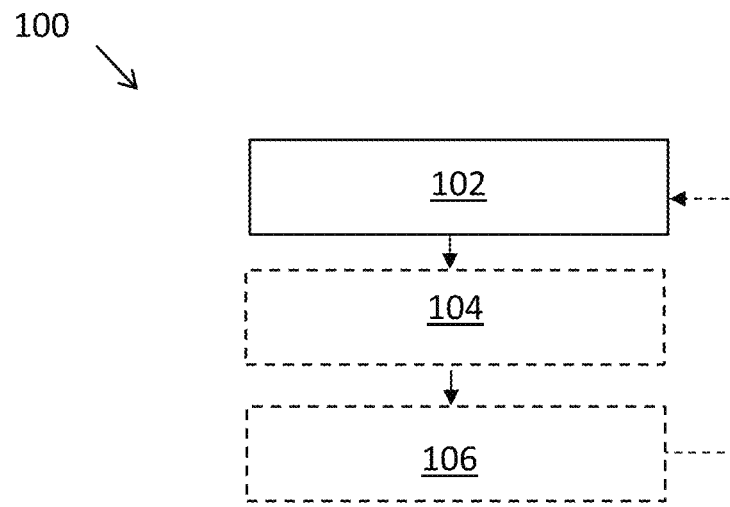
FIG. 12 illustrates an example method of operating a gas turbine engine.
Figure 13:
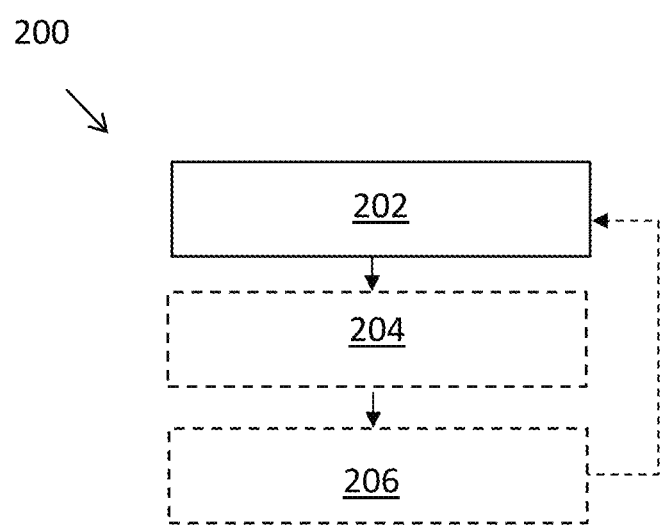
FIG. 13 illustrates a further example method of operating a gas turbine engine.

Further, whilst cruise conditions generally make up a much larger proportion of an aircraft engine's time in operation, the inventors appreciated that operation at idle is also significant—as the fuel mass flow rate is much lower at idle than at cruise, even a relatively small heat load to the fuel can result in a high temperature increase—the use of non-traditional fuels may therefore have an even greater effect on optimal approaches to heat management under idle conditions. The methods 100, 200 of FIGS. 12 and 13 address these two scenarios of aircraft operation. FIG. 12 illustrates a method 100 implementing these considerations at cruise conditions, and FIG. 13 illustrates a method 200 implementing these considerations at idle. This method 200 may be performed when the aircraft 1 is on the ground, i.e., at ground idle, e.g. whilst the aircraft is starting up, running whilst stationary during boarding, and taxiing (towards a runway or hangar, or between other ground-based locations), or at flight idle, e.g. when commencing descent.

Each method 100, 200 is arranged to be performed in a geared gas turbine engine 10 comprising an engine core 11 comprising a turbine 19, a compressor 14, a combustor 16 arranged to combust a fuel, and a core shaft 26 connecting the turbine to the compressor; a fan 23 located upstream of the engine core; a gearbox 30 that receives an input from the core shaft and outputs drive to the fan so as to drive the fan at a lower rotational speed than the core shaft; an oil loop system 2000 arranged to supply oil to the gearbox; and a heat exchange system 3000. The heat exchange system 3000 comprises an air-oil heat exchanger 2020 through which the oil in the oil loop system flows; a fuel-oil heat exchanger 1006 through which the oil in the oil loop system and the fuel flow such that heat is transferred between the oil and the fuel; and at least one valve 2016, 2007, 2007a (which may be referred to as an oil valve) arranged to allow a proportion of the oil sent via at least one of the heat exchangers 1006, 2020 to be varied.

The at least one oil valve 2016, 2007, 2007a is adjustable/controllable, and optionally controllable by a controller 58 which may form a part of/be provided by the aircraft's EEC. A controller 58 may therefore be provided to implement this control. The oil valve 2016, 2007, 2007a may be adjustable between a discrete number of set positions, or may be continuously adjustable.

The two heat exchangers 1006, 2020 may be arranged in the oil loop system 2000 in a parallel arrangement or in a series arrangement. Further, more than two heat exchangers may be provided in some implementations—for example with the oil loop system 2000 comprising multiple fuel-oil heat exchangers 1006, multiple air-oil heat exchangers 2020, and/or one or more additional heat exchangers, such as one or more oil-oil heat exchangers to exchange heat between separate oil loop systems 2000, 2000'.

In parallel arrangements, the oil loop system 2000 may branch such that a proportion of the oil can flow along each branch, and the air-oil 2020 and fuel-oil 1006 heat exchangers may be arranged in a parallel configuration on the different branches of the oil loop system, as shown in FIGS. 9 and 11. In such implementations, the at least one valve arranged to allow the proportion of the oil sent via at least one of the heat exchangers 1006, 2020 to be varied may be or comprise a modulation valve 2016 arranged to allow the proportion of the oil sent via each branch to be varied.

In series arrangements, such as that shown in FIG. 16, the oil loop system 2000 comprises one or more bypass pipes 2005, 2005a each arranged to allow a portion of the oil to avoid one or more heat exchangers. In such implementations, the at least one valve arranged to allow the proportion of the oil sent via at least one of the heat exchangers 1006, 2020 to be varied may be or comprise one or more bypass valves 2007, 2007a. It will be appreciated that bypass pipes 2005 and bypass valves 2007 may also be provided in parallel arrangements—in such implementations, the at least one valve arranged to allow the proportion of the oil sent via at least one of the heat exchangers 1006, 2020 to be varied may be or comprise a modulation valve 2016 and a bypass valve 2007, 2007a. The method 100, 200 may therefore comprise controlling 102, 202 multiple valves 2016, 2007, 2007a—for example one bypass valve 2007a and one modulation valve 2016, or two bypass valves 2007, 2007a, or two bypass valves 2007, 2007a and one modulation valve 2016. Further, the heat exchange system 3000 may comprise multiple separate oil loops 2000, 2000', and the method 100, 200 may further comprise controlling oil valves for additional heat exchangers 1004, 2030 of the second oil loop 2000', or in the case of an oil-oil heat exchanger 2030, of both loops.

In implementations in which a bypass pipe 2005a is provided across the air-oil heat exchanger 2020, the controlled bypass valve may be the valve 2007a for the bypass pipe 2005a across the air-oil heat exchanger 2020. In some such implementations, that bypass pipe 2007a may be the only oil bypass pipe in the primary oil loop system 2000—no bypass pipe may be provided for the fuel-oil heat exchanger 1006.

In alternative implementations such as that shown in FIG. 16, the heat exchange system 3000 comprises at least two oil bypass pipes, and optionally three or more, each bypass pipe 2005, 2005', 2005a being arranged to allow oil to bypass one of heat exchangers 1006, 1004, 2020. The method 100, 200 may comprise modulating the amount of oil sent via each bypass pipe 2005, 2005', 2005a. In implementations with multiple bypass pipes within the same closed-loop oil system (e.g. with two bypass pipes in the primary oil loop system 2000, as shown in FIG. 16), the same bypass valve 2007—which may be a three-way valve—may be used to control flow through both bypass pipes 2005, 2005a, or a different bypass valve 2007, 2007a may be provided for each as shown in FIG. 16.

In some implementations, the heat exchange system 3000 further comprises a refrigeration cycle apparatus 1007 arranged to provide thermal lift by transferring additional heat from the oil to the fuel beyond that transferred by the fuel-oil heat exchanger 1006. Oil flow through the refrigeration cycle apparatus 1007 may also be adjusted as part of the method 100, 200. In order to transfer heat from the oil to the fuel—and hence to exploit the increased thermal capacity of many newer aviation fuels—a positive thermal gradient is normally required between the oil and fuel (i.e. oil hotter than fuel). With the increased fuel thermal stability, newer fuels can potentially have suitable operation temperatures higher than the temperature reached by the oil on leaving the gearbox 30 or other components, so thermal lift might be desirable to further increase the fuel temperature. Thermal lift is the ability to transfer heat from a colder to a hotter fluid (generally via a refrigeration cycle).

In some implementations, the heat exchange system 3000 further comprises branching fuel return pathways 6020 and at least one valve controlling a split of fuel flow, as described above. The valve may be controlled based on feedback from one or more temperature sensors, and/or based on one or more fuel characteristics. The method 100, 200 may comprise adjusting the fuel flow along each branch based on the oil flow ratio and/or on the fuel temperature on leaving the fuel-oil heat exchanger 1006. The engine 10 may therefore have the ability to send heat (in the form of heated fuel) into the fuel system 1500 at different locations (e.g. upstream or downstream of the fuel pump 1003 or another component)—it will be appreciated that, as fuel temperature increases, fuel system component thermal capability/heat resistance may become a limiting factor, and that returning hot fuel to a main fuel flow path after a pump 1003, rather than before the pump 1003, may facilitate exploiting the increased thermal stability/higher useful operating temperature of new fuels.

Turning to the method 100 to be performed at cruise in particular, the method 100 comprises controlling 102 the at least one valve 2016, 2007, 2007a such that, under cruise conditions, an oil flow ratio of:

$$\frac{\text{rate of oil flow into air} - \text{oil heat exchanger } (m^3 s^{-1})}{\text{rate of oil flow into fuel} - \text{oil heat exchanger } (m^3 s^{-1})}$$

is in the range from 0 to 0.59, and optionally from 0 to 0.50, from 0 to 0.40, from 0 to 0.30, from 0 to 0.20, from 0 to 0.10, or from 0 to 0.05, and optionally from 0 to 0.01. Optionally, the oil flow ratio may be in the range from 0.05 to 0.55. The oil valve 2016, 2007, 2007a may be controlled such that the oil flow ratio is equal to zero—e.g. by preventing any oil flow into the air-oil heat exchanger 2020, in some implementations.

It will be appreciated that even for one specific engine 10 operating on a set fuel, it is usual to have a range of values for this ratio at cruise due to varying conditions, e.g. fuel temperature, atmospheric temperature, thrust demand, etc.—for example, an upper bound of the range may apply on a cold day (ISA-30 conditions) at low altitude (cruise: 35,000 ft), with low oil system heat generation, and a lower bound may apply on a hot day (ISA+40 conditions) at high altitude (cruise: 39,000 ft), with high oil system heat generation.

The method 100 may further comprise receiving 104 data to allow calculation or inference of the oil flow ratio, e.g. pump speed data, fuel flow rate data, and/or oil flow rate data. Such data may be received 104 by a controller 58 and used 106 to adjust the control 102 of the one or more oil valves at cruise, so as to maintain the oil flow ratio at a desired level or within desired bounds. This checking and adjustment/correction 106 may be performed at regular intervals, or in response to predetermined stimuli (e.g. a change in fuel or oil temperature or flow rate, or a change in engine operation—e.g. thrust demand or altitude). These steps 104, 106 may alternatively be considered as part of the controlling 102 of the one or more oil valves 2007, 2007a, 2016. The method 100 may also be arranged to make use of other information, e.g. temperature data (of oil, fuel, and/or ambient temperature of an environment around the aircraft 1), flow rate data (of oil and/or fuel), and/or one or more fuel characteristics, in determining 106 what control actions to take.

The step of controlling 102 the at least one valve 2016, 2007, 2007a so as to adjust the oil flow ratio comprises decreasing the amount of oil sent via the at least one air-oil heat exchanger 2020 when the oil flow ratio is too high in many implementations; optionally closing the valve/closing one pathway of a three-way valve completely in some implementations such that the oil flow rate into the air-oil heat exchanger 2020 drops to zero. In some implementations, a minimal but non-zero oil flow rate through the air-oil heat exchanger 2020 may be maintained throughout operation to prevent oil from congealing within the air-oil heat exchanger 2020.

In some implementations, one or more temperature sensors 1009 may be provided, and data relating to fuel temperature—optionally on entry to the combustor 16—may be used in fine-tuning control decisions. The method 100 may comprise controlling 102 the one or more oil valves 2007, 2007a, 2016 under cruise conditions such that the oil flow ratio is in the range from 0 to 0.35, and optionally 0 to 0.25 provided that the fuel temperature on entry to the combustor 16 is at least 140° C.; and/or such that the oil flow ratio is in the range from 0 to 0.20, and optionally from 0 to 0.15, provided that the fuel temperature on entry to the combustor 16 is at least 160° C.; and/or such that the oil flow ratio is in the range from 0 to 0.1, and optionally from 0 to 0.075, provided that the fuel temperature on entry to the combustor 16 is at least 180° C.

In some implementations, one or more fuel characteristics may be taken into account when determining how to control 102 the one or more oil valves 2007, 2007a, 2016 (the fuel characteristics may be determined using any of the approaches described above). For example, the method 100 may comprise controlling 102 the at least one oil valve 2007, 2007a, 2016 under cruise conditions such that the oil flow ratio is in the range from 0 to 0.20, and optionally from 0 to 0.15, provided that the fuel is at least 70% sustainable aviation fuel; and/or such that the oil flow ratio is in the range from 0 to 0.1 provided that the fuel is at least 80% sustainable aviation fuel.

Turning to the method 200 to be performed at idle in particular, the method 200 comprises controlling 202 the at least one oil valve 2016, 2007, 2007a such that, under idle conditions, an oil flow ratio of:

$$\frac{\text{rate of oil flow into air} - \text{oil heat exchanger } (m^3 s^{-1})}{\text{rate of oil flow into fuel} - \text{oil heat exchanger } (m^3 s^{-1})}$$

is in the range from 0.62 to 5.29, and optionally from 0.62 to 5.00, from 0.62 to 4.50, from 0.62 to 4.00, from 0.62 to 3.50, from 0.62 to 3.50, or from 0.62 to 2.50. Optionally, the oil flow ratio may be in the range from 0.67 to 4.67. The method 200 may comprise controlling 202 the at least one oil valve such that, under idle conditions, the oil flow ratio is above 1.0, and optionally above 1.5 or 2.0. A controller 58—optionally either a stand-alone unit or a part of an EEC—may be provided to implement this control 202.

As for the method 100 performed at cruise, the method 200 performed at idle may further comprise receiving 204 data to allow calculation or inference of the oil flow ratio, e.g. pump speed data, fuel flow rate data, and/or oil flow rate data. Such data may be received 204 by a controller 58 and used 206 to adjust the control 202 of the one or more oil valves 2007, 2007a, 2016 at idle, so as to maintain the oil flow ratio at a desired level or within desired bounds. This checking and adjustment/correction 206 may be performed at regular intervals, or in response to predetermined stimuli (e.g. a change in fuel or oil temperature or flow rate, or a change in engine operation—e.g. commencing taxi). These steps 204, 206 may alternatively be considered as part of the controlling 202 of the at least one oil valve 2007, 2007a, 2016. The method 200 may also be arranged to make use of other information, e.g. temperature data (of oil, fuel, and/or ambient temperature of an environment around the aircraft 1), flow rate data (of oil and/or fuel), and/or one or more fuel characteristics, in determining 206 what control actions to take.

Similarly, the step of controlling 202 the at least one valve 2016, 2007, 2007a so as to adjust the oil flow ratio may comprise decreasing the amount of oil sent via the at least one air-oil heat exchanger 2020 when the oil flow ratio is too high; optionally closing the valve/closing one pathway of a three-way valve completely in some implementations such that the oil flow rate into the air-oil heat exchanger 2020 drops to zero. In some implementations, a minimal but non-zero oil flow rate through the air-oil heat exchanger 2020 may be maintained throughout idle operation to prevent oil from congealing within the air-oil heat exchanger 2020, although it will be appreciated that, at ground idle, the ambient temperatures are generally warmer than at cruise altitude so this may not be needed as much, if at all at ground idle. Nonetheless, on cold days/for airports or runways in regions with cold climates, keeping oil flowing to reduce the chance of congealing may be desired. External/ambient temperature may therefore be used as an input in oil flow rate control, and one or more temperature sensors may be provided accordingly.

In some implementations, one or more temperature sensors 1009 may be provided, and data relating to fuel temperature—optionally on entry to the combustor 16—may be used in fine-tuning control decisions. The method 200 may comprise controlling 202 the one or more oil valves 2007, 2007a, 2016 under idle conditions such that the oil flow ratio is in the range from 0.62 to 4.0 or from 0.62 to 3.0 provided that the fuel temperature on entry to the combustor 16 is at least 160° C.; and/or such that the oil flow ratio is in the range from 0.62 to 3.0 or from 0.62 to 2.0 provided that the fuel temperature on entry to the combustor 16 is at least 180° C.

In some implementations, one or more fuel characteristics may be taken into account when determining how to control 202 the one or more oil valves 2007, 2007a, 2016 (the fuel characteristics may be determined using any of the approaches described above). For example, the method 200 may comprise controlling 202 the at least one oil valve 2007, 2007a, 2016 under idle conditions such that the oil flow ratio is in the range from 0.62 to 3.67, and optionally from 0.62 to 3.67, provided that the fuel is at least 70% sustainable aviation fuel; and/or such that the oil flow ratio is in the range from 0.62 to 2.67, or 0.62 to 1.67, provided that the fuel is at least 80% sustainable aviation fuel.

Figure 14:
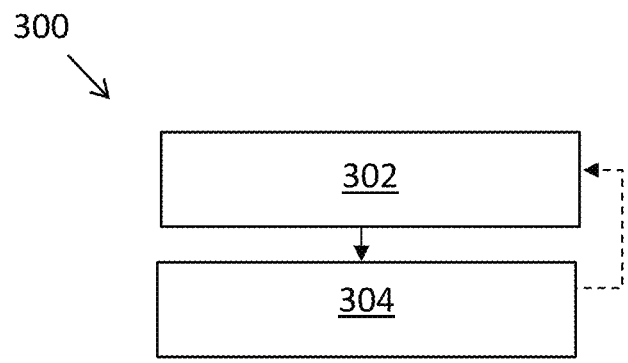
FIG. 14 illustrates a further example method of operating a gas turbine engine.

Whilst the methods 100, 200 described with respect to FIGS. 12 and 13 optionally make use of knowledge of one or more fuel characteristics to tailor the specific control 102, 202, other methods such as that 300 described with respect to FIG. 14 are more focused on the determination and use of fuel characteristics to improve performance of the engine 10, taking advantage of properties that vary between aviation fuels.

The method 300 shown in FIG. 14 is performed in a gas turbine engine 10 substantially as described for the preceding methods 100, 200, but the one or more controllable oil valve(s) 2007, 2007a, 2016 are replaced by, or provided in addition to, a controllable air valve 2022 arranged to control a flow rate of air through the air-oil heat exchanger 2020.

The method 300 comprises determining 302 at least one fuel characteristic of the fuel arranged to be combusted by the combustor 16. The at least one fuel characteristic may be or comprise any of the examples provided above—for example, aromatic content (e.g. xylene, toluene, benzene, and/or phenol content), paraffin content (e.g. iso paraffins, n-paraffins, cyclo-paraffins), heteroatomic species concentration (e.g. sulphur-based compounds/sulphur content and/or % nitrogen-based compounds such as anilines or indoles), % SAF, and hydrogen content (generally given as an H/C molar ratio). The determination 302 may be performed by any one or more of the approaches described above, e.g. by chemical and/or physical detection and determination, by analysing engine performance when using the fuel, and/or by receiving fuel data (for example electronically or by manual data input), optionally using a fuel composition determination module 57.

The method 300 then comprises controlling 304 the air valve 2022 based on the at least one fuel characteristic so as to adjust the flow rate of air through the air-oil heat exchanger 2020. The air valve 2022 may be adjustable between a discrete number of set positions, or may be continuously adjustable, in various implementations. The control 304 may therefore comprise discrete or continuous adjustment. A controller 58—which may be a dedicated controller for the valve 2022 and/or for the heat exchange system 3000 more generally, or a part of a more general EEC—may be provided to implement this control 302. The method 300 may also be arranged to make use of other information, e.g. temperature data (of oil, fuel, and/or ambient temperature of an environment around the aircraft 1), and/or flow rate data (of air, oil and/or fuel), in determining what control actions to take. The controller 58, or another processing module, may perform this determination of the suitable control action(s).

As indicated by the dashed line in FIG. 14, this method 300 may optionally be repeated. In some implementations, for example in implementations with only one fuel onboard the aircraft 1, the method 300 may be performed only once over a flight cycle—e.g. on refuelling or on reaching cruise altitude. In other implementations, however, for example in implementations with multiple fuel sources, the fuel supplied to the combustor 16 may vary over time during a flight. The determination 302 may therefore be performed more than once—e.g.:

(i) once for each fuel source 50, 53 on refuelling/at the start of a flight in implementations with multiple fuel sources of which only one or the other is ever used at any given time (and knowledge of from which fuel source fuel is being drawn may prompt selection of the appropriate stored fuel characteristic); or (ii) frequently during a flight, e.g. in response to a change in from which fuel source(s) fuel is being drawn (noting that the fuel provided to the combustor 16 may be a mixture of fuels from different sources, in some implementations), or at regular intervals.

The air valve 2022 may therefore be arranged to stay in a fixed position during operation of the engine 10, the fixed position being determined at start-up of the engine 10 based on the at least one determined fuel characteristic (option (i) above). Alternatively, the air valve 2022 may be arranged to have its position adjusted during operation, so changing air flow to the air-oil heat exchanger 2020 during operation of the engine 10 during a single flight (option (ii) above). The air valve 2022 may therefore be actively controlled to vary the airflow rate through the air-oil heat exchanger 2020, especially in implementations in which the aircraft 1 carries multiple different fuels in different tanks, and may change which fuel (or fuel mixture) is in use in flight. Active control of the air valve 2022 may be automated and implemented by the controller 58.

It will be appreciated that a fixed position of the air valve 2022 may not necessarily mean a fixed air flow rate, as air speed relative to the aircraft 1 may vary. In operation on the ground (e.g. at ground idle), any variation may be due to wind speed only. In flight, aircraft speed may also influence air flow rate into the air-oil heat exchanger 2020. In some implementations, a controller 58 may take into account wind speed and/or relative movement between the aircraft 1 and the surrounding air in determining a suitable air valve position. Air valve position may therefore be changed in order to keep the air flow rate more constant in some scenarios.

The method 300 may be performed at any point during operation of the aircraft 1, for example at ground idle, at flight idle, and/or at cruise.

The air valve 2022 may be controlled 304 so as to make relatively large reductions in air flow as compared to the valve 2022 being fully open, provided that the determination step 302 indicates that the fuel is suitable to receive the additional heat which is then no longer lost to the environment. For example, subject to suitability of the at least one determined fuel characteristic, the method 300 may comprise controlling 304 the air valve 2022 such that the rate of air flow into the air-oil heat exchanger 2020 is reduced to less than 60%, 50%, or 40% of what the flow rate would be with the valve fully open when the engine 10 is operating at idle conditions. Even larger reductions may be made at cruise—for example, the rate of air flow into the air-oil heat exchanger 2020 may be reduced to less than 20% of what the flow rate would be with the valve fully open when the engine 10 is operating at cruise conditions, provided that the fuel is suitable for taking the additional heat, and the air flow rate may even be reduced to zero (closing the valve 2022) when operating at cruise conditions. From the other perspective, if the engine 10 is then operated using a fuel less able to take the additional heat, correspondingly large changes may be made in re-opening the valve 2022. It will be appreciated that air flow rates are generally much lower at ground idle than at cruise or flight idle, and that the same percentage change in airflow may therefore correspond to a much larger difference in airflow whilst the aircraft 1 is in flight than when it is on the ground. Data on current aircraft operation mode (e.g. altitude, and/or aircraft speed), and optionally on the weather (e.g. windspeed) may therefore also be considered in the valve control.

In an example geared engine 10 in which the air-oil heat exchanger 2020 is located upstream of the fuel-oil heat exchanger 1006, with flow modulation on the air side only of the air-oil heat exchanger 2020 (i.e. no oil flow modulation), the following percentage air flow modulations may be typical, where "% of air flow modulation" is the percentage of the total air flow that would go through the heat exchanger 2020 were the valve 2022 fully open (or indeed were no valve present), simply based on the pressure ratio at the heat exchanger inlet 2020*a* and outlet 2020*b*:

At cruise, for fuel with a temperature limit of 120° C., the % of air flow modulation may be 20% or 17%. This may then be linearly decreased with increasing temperature limit to 0% (i.e. no air flow/valve closed for at least some of the time spent at cruise) for fuel with a temperature limit of 170° C. For fuel with a temperature limit of 260° C. or above, the % of air flow modulation may be 0% throughout cruise/the valve 2022 may be fully closed throughout cruise.

At idle, and in particular at ground idle, for fuel with a temperature limit of 120° C., the % of air flow modulation may be 58%. This may then be linearly decreased with increasing temperature limit to 38% once the fuel temperature limit reaches 250° C., and further linearly decreased with increasing temperature limit to 28% once the fuel temperature limit reaches 315° C.

The percentages may depend on the fuel temperature limit. The fuel temperature limit is the highest fuel temperature deemed safe for aircraft operation for that fuel, and that engine 10, and may depend on fuel characteristics such as thermal stability and also on heat tolerance of engine components.

In some implementations, the at least one fuel characteristic may be or comprise thermal stability, and, at cruise, the air valve 2022 may be adjusted to reduce air flow to less than 15% of what the flow rate would be with the valve 2022 fully open provided that the fuel is stable in operation at temperatures above 160° C., an/or to less than 5% of what the flow rate would be with the valve 2022 fully open provided that the fuel is stable in operation at temperatures above 180° C. In some implementations in which the valve 2022 is continuously adjustable, the air flow rate may be continuously changed in proportion to the thermal stability (optionally linearly with thermal stability).

In some implementations, the at least one fuel characteristic may be or comprise aromatic hydrocarbon content of the fuel, and the air valve 2022 may be adjusted to reduce air flow at cruise to less than 5% of what the flow rate would be with the valve fully open provided that the fuel has a molar percentage of aromatic hydrocarbons below 12%, and optionally below 10% or below 5%.

In some implementations, the at least one fuel characteristic may be or comprise percentage of sustainable aviation fuel—SAF—in the fuel, and the air valve 2022 may be adjusted to reduce air flow at cruise to less than 5% of what the flow rate would be with the valve fully open provided that the fuel has a SAF content above 60%, and/or to less than 2% of what the flow rate would be with the valve fully open provided that the fuel has a SAF content above 80%.

Auto-oxidation of conventional fossil fuel aviation fuels—which can lead to lacquering or coking up of combustor nozzles and other fuel passageways-generally starts to increase exponentially when the fuel temperature is somewhere in the range from 100° C. and 150° C. (depending on fuel specifics). The inventors appreciated that SAF-based fuels might offer the opportunity to go up to fuel temperatures above 150° C., and optionally of 200° C., or even 250° C. or higher, without significant auto-oxidation. The maximum fuel operating temperature will depend on fuel composition; hence the importance of determining 302 at least one fuel characteristic. Fuel blends comprising SAF with conventional fossil fuel will again have different thermal stabilities, and hence different temperature limits, depending on the particular characteristics of the blend. In tests of SAF blends with traditional aviation fuel Jet-A, an increase in % SAF mixed with the Jet-A was found to increase thermal stability, but in a non-linear way. Pre-set, discrete, levels may therefore be favoured rather than continuously changing the air flow rate in proportion to SAF content.

In some implementations, the at least one fuel characteristic may be or comprise calorific value of the fuel, and the air valve 2022 may be adjusted to reduce air flow at cruise to less than 4% of what the flow rate would be with the valve fully open provided that the fuel has a calorific value of at least 43.5 MJ/kg, optionally subject to suitability of another fuel characteristic (e.g. thermal stability).

In some implementations, multiple fuel characteristics may be reviewed in conjunction, for example with a lower threshold for one fuel characteristic being used when another fuel characteristic is within a specific range or above/below a specific threshold.

Typically, more air may be required, and the valve 2022 may be controlled 304 to be more open, when fuel thermal stability reduces, fuel sulphur concentration increases (an example of heteroatomic species concentration, which is generally linked to thermal stability in that an increased concentration generally reduces thermal stability), or if the fuel calorific value exceeds a threshold (for higher calorific value fuels, the flow rate is generally reduced to achieve the same level of thrust without wasting fuel—the fuel in the fuel-oil heat exchanger 1006 may therefore undergo an increased temperature rise due to its reduced flow rate. However, newer fuels (e.g. SAF) with higher thermal stabilities also have higher calorific values in many cases—the increased temperature rise due to the lower flow rate may therefore be acceptable in some scenarios; this demonstrates the utility of considering multiple fuel characteristics in conjunction rather than a single fuel characteristic alone).

The inventors appreciated that allowing unsuitable fuels to reach these higher temperatures could be deleterious to engine performance, however, and potentially even dangerous-excessive thermal decomposition of a fuel/deposition can cause safety issues by blocking passages and causing malfunction of components (e.g. valve sticking, and blocked nozzles, orifices, valves, etc.) which could result in loss of thrust control. The method 400 shown in FIG. 15 is therefore provided as a safety precaution.

Figure 15:
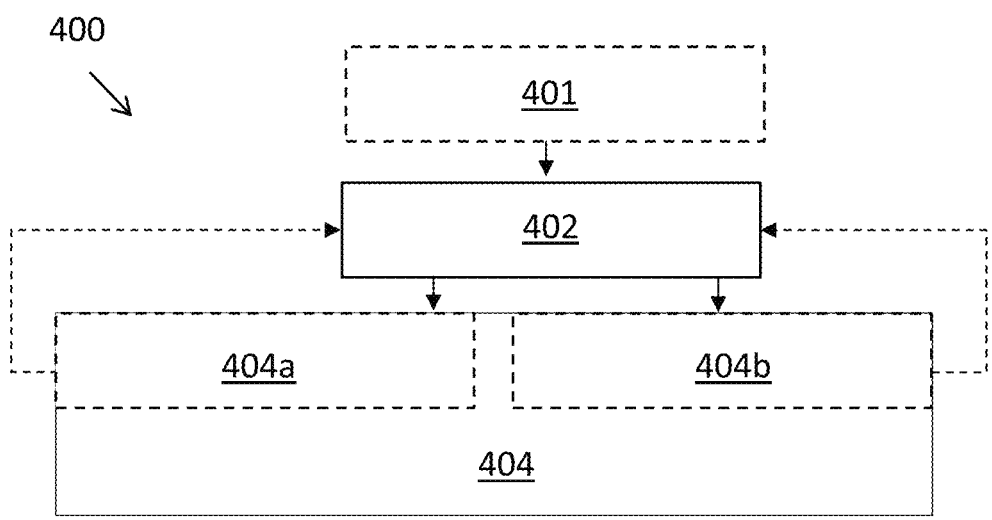
FIG. 15 illustrates a further example method of operating a gas turbine engine.

The method 400 shown in FIG. 15 may be performed in a gas turbine engine 10 substantially as described for the preceding methods 100, 200 of oil flow ratio control, but the one or more controllable oil valve(s) 2007, 2007*a*, 2016 arranged to allow a proportion of the oil sent via at least one of the air-oil heat exchanger 2020 and the fuel-oil heat exchanger 1006 to be varied are replaced by at least one controllable oil or air valve 2016, 2007, 2007*a*, 2022 arranged to allow at least one of oil flow rate and air flow rate through at least one of the air-oil heat exchanger 2020 and the fuel-oil heat exchanger 1006 to be varied. Air flow control, or oil flow control, or both, may therefore be provided. In implementations in which a controllable air valve 2022 is provided (optionally in addition to a controllable oil valve 2016, 2007, 2007*a*), the same engine 10 as used for the method 300 of airflow control may be used. The engine 10 for use with this method 400 also requires a temperature sensor 1009 arranged to provide an indication of fuel temperature—optionally on entry to the combustor 16. More generally, the sensor 1009 can be located anywhere downstream of the fuel-oil heat exchanger 1006 on the fuel side. This temperature sensor 1009 is generally located at or near an entrance to the combustor 16, and more specifically near a nozzle inlet of the combustor 16 so as to sense fuel temperature on entry to the combustor directly, although it will be appreciated that variations in fuel temperature between the outlet 1006*b* of the fuel-oil heat exchanger 1006 and the combustor 16 are likely to be small, and, if not deemed insignificant, calculable from knowledge of the engine 10 if the fuel temperature at a different location from the sensor 1009 is wanted. In some implementations in which the fuel temperature on entry to the combustor 16 is used, the sensor 1009 may be differently located and the fuel temperature on entry to the combustor may be calculated based on the temperature output and knowledge of the engine 10.

The method 400 comprises determining 402 if the fuel temperature has increased above a set threshold at cruise conditions, based on an output from the temperature sensor 1009. For example, a direct comparison may be made between data received from the temperature sensor 1009 and one or more temperature thresholds saved in memory. This determination 402 may therefore be performed automatically, optionally by a controller 58 (which may be or comprise a dedicated processing module, or may be provided by a more general EEC).

The method 400 further comprises, in response to determining that the fuel temperature has increased above the set threshold at cruise conditions, controlling 404 the at least one valve 2016, 2007, 2007*a*, 2022 so as to change the at least one flow rate (air or oil flow rate) through the at least one heat exchanger 1006, 2020 as appropriate to reduce the fuel temperature. For example, adjusting an oil valve 2016, 2007 so as to send less oil through the fuel-oil heat exchanger 1006. For example, the oil may be diverted away from a first branch of an oil loop system 2000 comprising the fuel-oil heat exchanger 1006 and sent via a parallel branch comprising an air-oil heat exchanger 2020 instead in parallel configurations (as shown in FIGS. 9 and 11), using a modulation valve 2016, or may be simply sent via a bypass pipe 2005 to pass the fuel-oil heat exchanger 1006 and recombine with the remaining oil that did go through the fuel-oil heat exchanger 1006 at or downstream of the oil exit from that heat exchanger 1006, using a bypass valve 2007, as shown in FIG. 16. In a parallel configuration as shown in FIG. 11, reducing oil flow through the fuel-oil heat exchanger 1006 by control of the modulation valve 2016 may automatically increase oil flow through the air-oil heat exchanger 2020 (unless a bypass pipe around the air-oil heat exchanger 2020 is present and used to compensate). Bypass 2007 and modulation 2016 valves may be used in conjunction in some implementations.

As indicated by the dashed line in FIG. 15, this method 400 may be repeated-frequent checks may be favoured for the sake of safety, optionally on a regular schedule, and/or when triggered by a change in engine operation (e.g. a change in altitude or thrust demand). The oil valve 2016, 2007, 2007*a* or air valve 2022 may therefore be actively controlled 404 to vary the oil or air flow rate through the respective heat exchanger 1006, 2020. Active control of the valve 2016, 2007, 2007*a*, 2022 may be automated and implemented by the controller 58. For example, active control of the modulation valve 2016 may be automated and implemented by a controller 58 of the heat exchange system 3000, which may be a dedicated controller or a part of a more general EEC. In various implementations, the control of the modulation valve 2016 may be closed-loop or open-loop, based on availability of in-line measurements—in particular, a closed-loop approach to control may be preferred when feedback data (e.g. from oil flow rate sensors) are available.

In implementations with both an air valve 2022 and an oil valve 2016, 2007*a*, air flow through the air-oil heat exchanger 2020 may be increased when more oil is sent via the air-oil heat exchanger 2020; the increase may be linear with increasing oil flow rate. In terms of % of air flow, the increase may be large—for example going from the air valve 2022 being fully-closed to fully open, or from a first position with 10% of the maximum air flow rate up to 90% or 100% of the maximum air flow rate when the fuel temperature is deemed to be too high. The method 400 may comprise, in response to determining 402 that the fuel temperature has increased above a set threshold at cruise conditions, controlling 404*a* the air valve 2022 so as to send more air through the air-oil heat exchanger 2020 as well as controlling 404*b* the oil valve 2016, 2007 to send less oil via the fuel-oil heat exchanger 1006. The control/adjustment 404*a* of the air valve 2022 may be performed simultaneously with the control/adjustment 404*b* of the oil valve 2016, 2007.

In some implementations, the airflow through the air-oil heat exchanger 2020 may not be actively controlled. In such implementations, the airflow is likely to naturally change at different operating conditions based on the pressure ratio between the heat exchanger air intake 2020*a* and the heat exchanger exhaust/air outlet 2020*b*. In this configuration, air will still flow through the air passages of the air-oil heat exchanger 2020 even when the air-oil heat exchanger 2020 is completely bypassed on the oil side/when the oil flow rate through the heat exchanger 2020 is zero. In alternative implementations, active control of the air flow through the air-oil heat exchanger 2020 is provided, for example as described for the method 300 shown in FIG. 14. For example, the air-oil heat exchanger 2020 and the fuel-oil heat exchanger 1006 may be in series, with no by-pass on the oil side of the air-oil heat exchanger 2020 but an air valve 2022 on the air side that controls the airflow (both an oil bypass valve 2007' and an air flow valve 2022 may be provided in other implementations). In such a series arrangement, the air-oil heat exchanger 2020 may be upstream or downstream of fuel-oil heat exchanger 1006 with respect to oil flow. In implementations with such a series arrangement, having the air-oil heat exchanger 2020 upstream of the fuel-oil heat exchanger 1006 with respect to oil flow may assist in not overheating the fuel—the oil may be cooled as much as desired by increasing airflow (and optionally also recirculating oil through the air-oil heat exchanger 2020) before it reaches the fuel-oil heat exchanger 1006.

In some implementations, an oil bypass pipe 2005*a* and corresponding control valve 2007*a* may be implemented for the air-oil heat exchanger 2020 only. Optionally, only oil flow rate through the air-oil heat exchanger 2020 may be actively controlled in the method 400 being described.

In various implementations:
A bypass pipe 2005*a* is provided on the oil side of the air-oil heat exchanger 2020 only (no oil bypass of the fuel-oil heat exchanger and no active air flow control);

A bypass pipe 2005a, 2005 may be provided for both the air-oil heat exchanger 2020 and the fuel-oil heat exchanger 1006 (no active air flow control); or.

Air flow rate through the air-oil heat exchanger 2020 may be controllable, and there may be no oil bypass pipes.

In general, having control of at least one flow through the air-oil heat exchanger 2020 may be deemed more important than having control of either flow through the fuel-oil heat exchanger 1006. An oil bypass pipe 2005 and/or fuel bypass pipe 1005 (and a corresponding control valve) may however be provided for the fuel-oil heat exchanger 1006 in some implementations, optionally in addition to one or more further controllable valves.

A combination of airflow control and oil flow control may be implemented in both parallel and series arrangements, but it will be appreciated that whilst all of the various control options may be used together, the increase complexity and number of components, and hence increased weight of the overall heat exchange system 3000, may not be desirable. A selection of a subset of the control options may therefore be preferred in many implementations—for example, either control of the airflow or control of the oil flow can be used to adjust heat transfer within the air-oil heat exchanger 2020, so control of both for a given heat exchanger 2020 may be deemed superfluous. Similarly, in implementation in which the oil flows through the air-oil heat exchanger 2020 before the fuel-oil heat exchanger 1006, oil temperature adjustment in the air-oil heat exchanger 2020 (by control of air- and/or oil-flow in that heat exchanger) may be used as an alternative to oil flow adjustment through the fuel-oil heat exchanger 1006 to change the amount of heat transferred to the fuel in the fuel-oil heat exchanger 1006.

Additionally or alternatively, in implementations in which the heat exchange system 3000 comprises a refrigeration cycle apparatus 1007 arranged to transfer additional heat from the oil to the fuel beyond that transferred by the fuel-oil heat exchanger 1006, the method 400 may further comprise controlling the refrigeration cycle apparatus 1007 so as to reduce the amount of additional heat transferred to the fuel in response to determining 402 that the fuel temperature has increased above the set threshold at cruise conditions. This control may be performed by reducing the oil flow through the refrigeration cycle apparatus 1007, or by reducing power to the refrigeration cycle apparatus 1007 (e.g. by reducing the flow rate of the refrigerant fluid), or by deactivating the refrigeration cycle apparatus 1007. The set threshold for deactivation of the refrigeration cycle apparatus 1007 may be lower than the set threshold for changing a flow rate of oil and/or air through a heat exchanger 1006, 2020.

Additionally or alternatively, in implementations in which the heat exchange system 3000 comprises a secondary oil loop system 2000' also comprising a fuel-oil heat exchanger 1004, the method may further comprise reducing oil flow through the secondary fuel-oil heat exchanger 1004 when the fuel temperature has increased above a set threshold (which may be different from the set threshold at which oil flow through the primary fuel-oil heat exchanger 1006 is reduced).

The set threshold for the controlling step 404 may be in the range from 140° C. to 300° C., and optionally from 200° C. to 300° C., and further optionally from 250° C. to 300° C. For example, the set threshold may be 140° C., 150° C., 160° C., 170° C., 180° C., 190° C., 200° C., 210° C., 220° C., 230° C., 240° C., 250° C., 260° C., 270° C., 280° C., 290° C., or 300° C.

The method 400 of some implementations further comprises determining 401 the set threshold, against which the temperature sensor output is compared. This determining 401 may be performed on-wing, and optionally in flight. The determination 401 may be or comprise calculating a threshold value, or identifying a suitable threshold value from a pre-stored set of threshold values stored in memory.

The inventors appreciated that knowledge of one or more fuel characteristics can be used in the determination 401 to ensure safety whilst still taking advantage of properties that vary between aviation fuels. The determination 401 may therefore be based on at least one fuel characteristic of the fuel. The at least one fuel characteristic may be or comprise any of the examples discussed above, for example thermal stability of the fuel, nitrogen content of the fuel, sulphur content of the fuel, and/or sustainable aviation fuel—SAF—content of the fuel (% SAF). The at least one fuel characteristic may be determined by any one or more of the approaches discussed above.

The step of determining 401 the set threshold may comprise increasing the set threshold, optionally linearly, with increasing thermal stability of the fuel. The set threshold used to control the heat modulation may therefore be increased linearly with the fuel thermal stability. Thermal stability is the temperature at which the fuel will start to breakdown and form deposits that can cause blockages and malfunction of components—it will be appreciated that this is generally not an instantaneous change on reaching a particular temperature; aviation fuels comprise various components that are liable to break down at different temperatures, and time spent at the high temperature is also a factor in fuel breakdown.

The threshold value may be set based on comparing a maximum allowed deposition rate from fuel breakdown to the thermal stability of the fuel in use. A fuel may be classed as stable at a given temperature if its rate of decomposition is below a certain threshold at that temperature. The method 400 may also comprise use of a clock or timer, or a fuel flow rate sensor—a higher fuel temperature may be acceptable at a higher pumping rate, for example, as the faster-moving fuel will spend less time at that temperature before being combusted.

Alternatively or additionally, the step of determining 401 the set threshold may comprise increasing the set threshold with increasing SAF content of the fuel (optionally linearly), for fuels with a SAF content of above 70%. As discussed above, an increase in % SAF mixed with a fossil-based aviation fuel was found to increase thermal stability, but in a non-linear way. Pre-set, discrete, thresholds based on % SAF may therefore be favoured rather than continuously changing the set threshold in proportion to SAF content, or a more complex (non-linear) but continuous relationship may be established.

Alternatively or additionally, the step of determining 401 the set threshold may comprise decreasing the set threshold with increasing heteroatomic species content of the fuel (optionally linearly). For example, the thermal stability of Jet-A was found to decrease with increasing nitrogen content (nitrogen content being a measure of the amount of nitrogen-containing species present). It is known that the interaction of sulphur-containing and nitrogen-containing species in fuel can be an important contributor to fuel decomposition rates, so consideration of the fuel composition with respect to multiple heteroatomic species may be implemented to take account of these interactions.

In some implementations, particularly in implementations in which a direct measure of thermal stability of the fuel is not available, multiple fuel characteristics may be determined and used in decisions on valve control. The one or more determined fuel characteristics may be in effect translated into a measure of thermal stability.

The inventors appreciated that, in addition to the careful control of heat exchangers 1004, 1006, 2020, 2030 as described above to manage heat transfer within an engine 10, incorporation of a refrigeration cycle 1007 into the heat exchange system 3000 can allow still further benefit to be obtained from newer fuels. In particular, thermal lift provided by a refrigeration cycle apparatus 1007 can be used to raise the fuel to a temperature above that of the oil, improving oil cooling and overall engine performance. It will be appreciated that a power input is required to move heat from a cooler fluid to a warmer fluid—an active evaporation and condensing process with powered components is therefore used in the implementation described. In particular, the oil loop system 2000 can be configured to transfer heat from the oil to the refrigerant fluid in an evaporator 1007a that evaporates liquid in the refrigerant fluid (which may be all liquid, or a liquid-gas mixture at this stage in the cycle) to form a saturated vapour.

A compressor 1007b is then provided to compress the saturated vapour to form a superheated vapour. This hot vapour is then sent to a refrigerant-fuel heat exchanger 1007c; the heat exchanger is a condenser 1007c and the transfer of heat from the compressed vapour to the fuel converts the superheated vapour at least partially back to a liquid (and optionally converts it into a saturated liquid). The cooler refrigerant is then returned to the evaporator 2007a, optionally passing via an expansion valve 2007d (between the condenser and the evaporator/interface with the oil) to convert the saturated liquid to a reduced temperature liquid and vapour mixture before it then returns to the evaporator 1007a.

Control of such a refrigeration cycle apparatus 1007 may allow the level of thermal lift provided to be adjusted as appropriate for the fuel and engine operating conditions.

Figure 17:
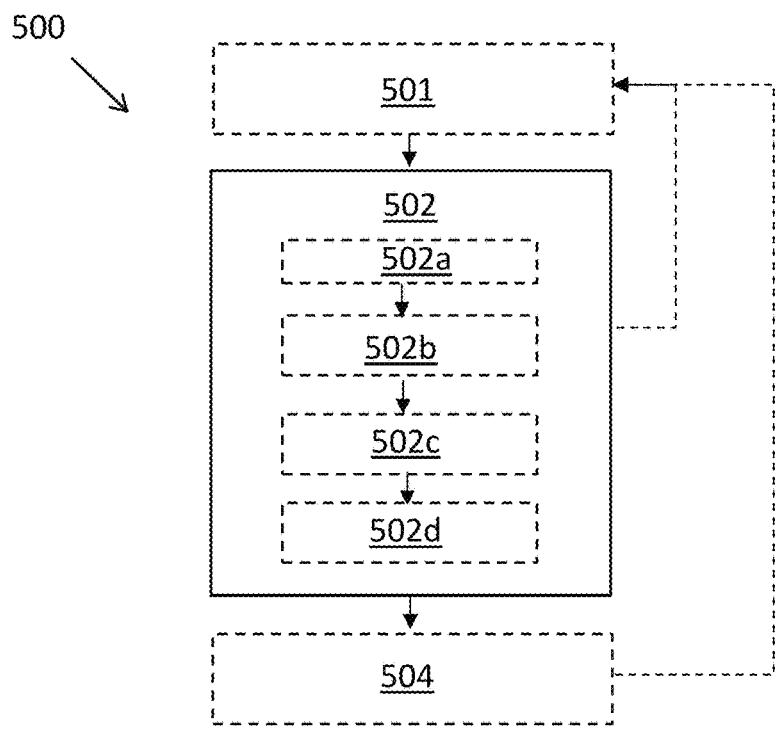
FIG. 17 illustrates a further example method of operating a gas turbine engine.

A method 500 of controlling a gas turbine engine 10 to take advantage of thermal lift in managing engine performance is depicted in FIG. 17. The method 500 is performed in an engine 10 substantially as described herein (noting that the same principles can be applied to a direct drive engine as well as to a geared engine) and having a refrigeration cycle apparatus 1007. The method 500 comprises controlling 502 the refrigeration cycle apparatus 1007 such that fuel temperature on entry to the combustor 16 is higher than a maximum oil temperature within the oil loop system 2000.

The control 502 may be performed at regular intervals—correcting heat transfer to the fuel when needed—or may be applied continuously to keep the fuel temperature above the highest oil temperature. The control 502 may be applied at any stage of engine operation—for example at idle and/or at cruise—and optionally throughout operation.

The control 502 may comprise transferring 502a heat from the oil to the refrigerant fluid using the evaporator 1007a. The flow rate of oil and/or of refrigerant through the evaporator 1007a may be adjusted as desired, generally using one or more valves. A bypass pipe and/or recirculation pipe around the evaporator 1007a may be provided for the oil such that oil flow rate through the evaporator 1007a can be adjusted without changing oil flow rate through other components. Alternatively or additionally, the evaporator 1007a may be located on a separate parallel branch of the oil system 2000 and the modulation valve 2016 may be used to adjust the proportion of oil sent through the evaporator 1007a. The pump speed of the oil pump 2004 may be adjusted to change oil flow rate in some implementations. The flow rate of refrigerant through the evaporator 1007a may be controlled by controlling a pumping rate of the refrigerant around the refrigerant cycle apparatus 1007.

The control 502 may then comprise compressing 502b the saturated refrigerant vapour generated in the evaporator 1007a to form a superheated vapour using the refrigerant compressor 1007b. Again, the flow rate of the refrigerant can be controlled by controlling a pumping rate of the refrigerant around the refrigerant cycle apparatus 1007—the compressor 1007b fulfils the role of pump in the implementation shown in FIG. 18, but a separate refrigerant pump may be provided in addition to the compressor 1007b in other implementations. The superheated vapour formed in the compressor 1007b is then sent to the condenser 1007c.

The control 502 may then comprise transferring 502c heat from the superheated vapour to the fuel using the condenser 1007c. As a result of this heat transfer, the refrigerant vapor is at least partially converted to a liquid (i.e. it condenses). A saturated liquid may be formed in the condenser 1007c.

In the implementation shown in FIG. 18, the refrigeration cycle apparatus 1007 further comprises an expansion valve 1007d located downstream of the condenser 1007c (from the perspective of refrigerant flow), and upstream of the evaporator 1007a. In such implementations, the method 500 comprises using 502d the expansion valve 1007d to convert the refrigerant from the condenser 1007c into a reduced temperature liquid and vapour mixture which is then returned to the evaporator 1007a. The expansion valve 1007d may be actively controlled 502d as a part of the control step 502.

In the implementation shown in FIG. 18, the engine 10 comprises a temperature sensor 1009 arranged to sense the temperature of fuel downstream of the refrigeration cycle apparatus 1007 (i.e. on its approach to the combustor 16), and a temperature sensor 2009 arranged to provide an indication of the maximum temperature of oil within the oil loop system 2000 (e.g. located immediately downstream of the furthest downstream engine component cooled by the oil). The method 500 may further comprise comparing 501 the oil and fuel temperatures and adjusting the control 502 of the refrigeration cycle apparatus 1007 based on the comparison. For example, if the fuel temperature is lower than the maximum oil temperature, the pump speed of the refrigeration cycle apparatus 1007 (and therefore the refrigerant flow rate) may be increased and/or the proportion of oil sent via the evaporator 1007a may be increased (e.g. by adjusting an oil valve).

The method 500 may also comprise controlling 504 one or more other components of the heat exchange system 3000—for example, fluid flow through the fuel-oil heat exchanger 1006 may be adjusted 504 so as to increase heat transfer to the fuel by increasing oil flow rate through the fuel-oil heat exchanger 1006 (e.g. using a bypass or modulation valve). Additionally or alternatively, fluid flow through the fuel-oil heat exchanger 1006 may be adjusted 504 so as to increase heat transfer to the fuel by recirculating fuel through the fuel-oil heat exchanger 1006 (e.g. using a recirculation valve 6010). Additionally or alternatively, heat transfer to the fuel in the fuel-oil heat exchanger 1006 may be increased 504 by reducing air-cooling of the oil before the oil enters the fuel-oil heat exchanger 1006 (e.g. using an air valve 2022). It will be appreciated that the opposite adjustments 504 may be made if the fuel temperature is too high. Whilst the control step 504 for components other than the refrigeration cycle apparatus 1007 is shown after the control step 502 for the refrigeration cycle apparatus 1007 in FIG. 17, it will be appreciated that these steps 502, 504 can be performed in either order, or simultaneously. Further, only the refrigeration cycle apparatus 1007 may be controlled 502 in response to comparing 501 the fuel and oil temperatures in some implementations.

The temperature comparison step 501 may be performed at regular intervals throughout operation, or in response to certain stimuli—e.g. a change in engine operation mode, a change in altitude, a change in thrust demand, a change of fuel, or a change in fuel or oil temperature.

In various implementations, the method 500 comprises controlling 502 the refrigeration cycle apparatus 1007 such that the fuel temperature on entry to the combustor 16 is higher than the maximum oil temperature within the oil loop system 2000 by at least 2° C., and optionally by at least 5° C., 10° C., 15° C., 20° C. or 25° C. The refrigeration cycle apparatus 1007 may be controlled 502 such that the fuel temperature on entry to the combustor 16 is higher than the maximum oil temperature within the oil loop system 2000 by between 2° C. and 50° C.

The method 500 may comprise controlling 502, 504 the engine 10 so as to run with a fuel temperature on entry to the combustor 16 higher than the maximum oil temperature for at least 10%, 20%, 30%, or 50% of the time at cruise. In some implementations, the fuel temperature on entry to the combustor 16 may be kept higher than the maximum oil temperature throughout cruise.

In some implementations, the control 502 is based on one or more fuel characteristics of the fuel (for example any of the example fuel characteristics described above, which may be determined by any of the methods described above).

The method 500 may comprise controlling 502 the refrigeration cycle apparatus 1007 (and optionally also controlling 504 one or more other components of the heat exchange system 3000) such that the fuel temperature on entry to the combustor 16 is higher than the maximum oil temperature within the oil loop system 2000 by an amount determined based on the one or more fuel characteristics of the fuel. For example, a larger increase in fuel temperature above the oil temperature may be provided when the fuel's thermal stability and/or calorific value is higher. Two or more fuel characteristics may be assessed in conjunction in some implementations. The method 500 may therefore comprise obtaining one or more fuel characteristics and adjusting the control 502, 504 based on those characteristics, optionally in addition to other data—e.g. mode of operation, altitude, ambient temperature, oil type, oil—and/or fuel-flow rates, refrigerant type, etc.

The method 500 is engine architecture-independent and may be applied in both geared gas turbine engines 10 and direct drive gas turbine engines. The oil loop system is arranged to supply oil to cool, and optionally also lubricate, one or more engine components—in geared engines 10 the one or more engine components cooled may be or comprise the power gearbox 30. In geared or direct drive engines, the one or more engine components cooled may be or comprise an auxiliary gearbox 33, one or more bearings (e.g. for a shaft), power electronics, one or more components of an integrated drive generator, and/or any other parts of the engine which are to be cooled.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of operating a gas turbine engine, the gas turbine engine comprising:
   an engine core comprising a turbine, a compressor, a combustor arranged to combust a fuel, and a core shaft connecting the turbine to the compressor;
   a fan located upstream of the engine core;
   a gearbox that receives an input from the core shaft and outputs drive to the fan so as to drive the fan at a lower rotational speed than the core shaft;
   an oil loop system arranged to supply oil to the gearbox; and
   a heat exchange system comprising:
      an air-oil heat exchanger through which the oil in the oil loop system flows;
      a fuel-oil heat exchanger through which the oil in the oil loop system and the fuel flow such that heat is transferred between the oil and the fuel; and
      at least one valve arranged to allow a proportion of the oil sent via at least one of the heat exchangers to be varied,
   the method comprising controlling the at least one valve such that, under cruise conditions, an oil flow ratio of:

$$\frac{\text{rate of oil flow into air}-\text{oil heat exchanger } (m^3 s^{-1})}{\text{rate of oil flow into fuel}-\text{oil heat exchanger} (m^3 s^{-1})}$$

is in the range from 0 to 0.2 provided that the fuel temperature on entry to the combustor is at least 160° C.

2. The method of claim 1, wherein the oil loop system branches such that a proportion of the oil can flow along each branch and the air-oil and fuel-oil heat exchangers are arranged in a parallel configuration on different branches of the oil loop system, and wherein the valve arranged to allow the proportion of the oil sent via at least one of the heat exchangers to be varied is a modulation valve arranged to allow the proportion of the oil sent via each branch to be varied.

3. The method of claim 1, wherein the oil loop system further comprises at least one bypass pipe arranged to allow a proportion of the oil to bypass at least one of the air-oil heat exchanger and the fuel-oil heat exchanger, and wherein the valve arranged to allow the proportion of the oil sent via at least one of the heat exchangers to be varied is a bypass valve arranged to allow a proportion of the oil to bypass the at least one heat exchanger.

4. The method of claim 3, wherein the air-oil and fuel-oil heat exchangers are arranged in series in the oil loop system.

5. The method of claim 3, wherein the air-oil and fuel-oil heat exchangers are arranged in parallel, on different branches of the oil loop system, and wherein the method comprises controlling both the bypass valve and a modulation valve arranged to allow the proportion of the oil sent via each branch to be varied.

6. The method of claim 1, wherein the controlling the at least one valve so as to adjust the oil flow ratio comprises decreasing the amount of oil sent via the at least one air-oil heat exchanger when the oil flow ratio is too high.

7. The method of claim 1, wherein the method comprises controlling the at least one valve under cruise conditions such that the oil flow ratio is in the range from 0 to 0.1 provided that the fuel temperature on entry to the combustor is at least 180° C.

8. The method of claim 1, wherein, under cruise conditions, the method comprises controlling the at least one valve such that the oil flow ratio is in the range from 0 to 0.2 provided that the fuel is at least 70% sustainable aviation fuel.

9. The method of claim 1, wherein the heat exchange system comprises a refrigeration cycle apparatus arranged to provide thermal lift by transferring additional heat from the oil to the fuel beyond that transferred by the fuel-oil heat exchanger, and wherein the method further comprises controlling the refrigeration cycle apparatus so as to adjust the amount of additional heat transferred to the fuel.

10. The method of claim 1, wherein the heat exchange system comprises multiple bypass pipes each arranged to allow oil to bypass one heat exchanger, and wherein the step of controlling the at least one valve comprises controlling at least two bypass valves.

11. A gas turbine engine for an aircraft comprising:
an engine core comprising a turbine, a compressor, a combustor arranged to combust a fuel, and a core shaft connecting the turbine to the compressor;
a fan located upstream of the engine core; and
a gearbox that receives an input from the core shaft and outputs drive to the fan so as to drive the fan at a lower rotational speed than the core shaft;
an oil loop system arranged to supply oil to the gearbox; and
a heat exchange system comprising:
an air-oil heat exchanger through which the oil in the oil loop system flows;
a fuel-oil heat exchanger through which the oil in the oil loop system and the fuel flow such that heat is transferred between the oil and the fuel; and
at least one valve arranged to allow a proportion of the oil sent via at least one of the heat exchangers to be varied, and wherein
the at least one valve is arranged to be controlled such that, under cruise conditions, an oil flow ratio of:

$$\frac{\text{rate of oil flow into air} - \text{oil heat exchanger } (m^3 s^{-1})}{\text{rate of oil flow into fuel} - \text{oil heat exchanger} (m^3 s^{-1})}$$

is in the range from 0 to 0.2 provided that the fuel temperature on entry to the combustor is at least 160° C.

12. The gas turbine engine according to claim 11, wherein the heat exchange system further comprises a refrigeration cycle apparatus arranged to provide thermal lift by transferring further heat from the oil to the fuel such that the fuel temperature is raised above the oil temperature.

13. The gas turbine engine according to claim 11, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

14. The gas turbine engine according to claim 11, wherein the heat exchange system further comprises branching fuel return pathways and at least one valve controlling a split of fuel flow, the branching pathways being arranged to return fuel from the heat exchange system to at least two different places along a main fuel path from where fuel enters the gas turbine engine to the combustor.

15. A method of operating a gas turbine engine, the gas turbine engine comprising:
an engine core comprising a turbine, a compressor, a combustor arranged to combust a fuel, and a core shaft connecting the turbine to the compressor;
a fan located upstream of the engine core;
a gearbox that receives an input from the core shaft and outputs drive to the fan so as to drive the fan at a lower rotational speed than the core shaft;
an oil loop system arranged to supply oil to the gearbox; and
a heat exchange system comprising:
an air-oil heat exchanger through which the oil in the oil loop system flows;
a fuel-oil heat exchanger through which the oil in the oil loop system and the fuel flow such that heat is transferred between the oil and the fuel; and
at least one valve arranged to allow a proportion of the oil sent via at least one of the heat exchangers to be varied,
the method comprising controlling the at least one valve such that, under cruise conditions, an oil flow ratio of:

$$\frac{\text{rate of oil flow into air} - \text{oil heat exchanger } (m^3 s^{-1})}{\text{rate of oil flow into fuel} - \text{oil heat exchanger} (m^3 s^{-1})}$$

is in the range from 0 to 0.1 provided that the fuel temperature on entry to the combustor is at least 180° C.

* * * * *